(12) United States Patent
Wieder

(10) Patent No.: US 8,396,800 B1
(45) Date of Patent: Mar. 12, 2013

(54) ADAPTIVE PERSONALIZED MUSIC AND ENTERTAINMENT

(76) Inventor: James W. Wieder, Ellicott City, MD (US)

(*) Notice: Subject to any disclaimer, the term of this patent is extended or adjusted under 35 U.S.C. 154(b) by 3 days.

(21) Appl. No.: 12/910,139

(22) Filed: Oct. 22, 2010

Related U.S. Application Data

(63) Continuation-in-part of application No. 11/161,710, filed on Aug. 12, 2005, now Pat. No. 8,001,612, and a continuation-in-part of application No. 10/605,879, filed on Nov. 3, 2003, now Pat. No. 7,884,274.

(51) Int. Cl.
G06F 21/00 (2006.01)

(52) U.S. Cl. .......................................................... 705/50

(58) Field of Classification Search ................... 705/50; 84/604
See application file for complete search history.

(56) References Cited

U.S. PATENT DOCUMENTS

| | | | |
|---|---|---|---|
| 4,788,675 A | 11/1988 | Jones et al. | |
| 5,592,511 A | 1/1997 | Schoen et al. | |
| 5,616,876 A | 4/1997 | Cluts | |
| 5,664,046 A | 9/1997 | Abecassis | |
| 5,719,786 A | 2/1998 | Nelson et al. | |
| 5,732,216 A | 3/1998 | Logan et al. | |
| 5,734,719 A | 3/1998 | Tsevdos et al. | |
| 5,801,747 A | 9/1998 | Bedard | |
| 5,848,396 A | 12/1998 | Gerace | |
| 5,894,119 A | 4/1999 | Tognazzini | |
| 5,913,204 A | 6/1999 | Kelly | |
| 5,918,213 A | 6/1999 | Bernard et al. | |
| 5,926,624 A | 7/1999 | Katz et al. | |
| 5,945,988 A | 8/1999 | Williams et al. | |
| 5,963,916 A | 10/1999 | Kaplan | |
| 5,973,250 A | 10/1999 | Zirille et al. | |
| 5,973,612 A | 10/1999 | Deo et al. | |
| 5,977,964 A | 11/1999 | Williams et al. | |
| 6,005,597 A | 12/1999 | Barrett et al. | |
| 6,020,883 A | 2/2000 | Herz et al. | |
| 6,112,181 A | 8/2000 | Shear et al. | |
| 6,232,539 B1 | 5/2001 | Looney et al. | |
| 6,246,672 B1 | 6/2001 | Lumelsky | |
| 6,247,130 B1 | 6/2001 | Fritsch | |

(Continued)

FOREIGN PATENT DOCUMENTS

| EP | 03104970.3 | 7/2005 |
|---|---|---|
| WO | WO0162065 | 8/2001 |

(Continued)

OTHER PUBLICATIONS

Apple's plan to offer music hits right note. Lincoln Journal Star, May 21, 2003; p. 7.

(Continued)

*Primary Examiner* — James Trammell
*Assistant Examiner* — Daniel L Greene
(74) *Attorney, Agent, or Firm* — James W. Wieder

(57) ABSTRACT

A method and system for providing a personalized entertainment experience that is customized for each user. User actions and user control actions may be associated with each played composition and captured as user feedback about each composition. A targeted time between playbacks of a composition may be determined by using said control actions. A customized sequence of compositions may be automatically generated for each user by utilizing a history of the user actions and/or control actions. The personalized sequence may automatically adapt to changing user preferences and feedback over time. The user's collection of compositions may be automatically integrated with the generated customized sequence. Additional compositions and samples, that are new to a user, may be automatically chosen based on the prior user feedback/history and may be added to the user's collection when indicated by user action(s).

38 Claims, 36 Drawing Sheets

U.S. PATENT DOCUMENTS

| | | | |
|---|---|---|---|
| 6,248,946 | B1 | 6/2001 | Dwek |
| 6,253,237 | B1 | 6/2001 | Story et al. |
| 6,295,555 | B1 | 9/2001 | Goldman |
| 6,317,722 | B1 | 11/2001 | Jacobi et al. |
| 6,349,329 | B1 | 2/2002 | Mackintosh et al. |
| 6,385,596 | B1 | 5/2002 | Wiser et al. |
| 6,389,467 | B1 | 5/2002 | Eyal |
| 6,410,837 | B2 | 6/2002 | Tsutsumi |
| 6,423,892 | B1 | 7/2002 | Ramaswamy |
| 6,430,573 | B1 | 8/2002 | Pachet et al. |
| 6,438,752 | B1 | 8/2002 | McClard |
| 6,452,083 | B2 | 9/2002 | Pachet et al. |
| 6,460,036 | B1 | 10/2002 | Herz |
| 6,484,199 | B2 | 11/2002 | Eyal |
| 6,496,802 | B1 | 12/2002 | van Zoest et al. |
| 6,502,194 | B1 | 12/2002 | Berman et al. |
| 6,507,764 | B1 | 1/2003 | Parrella et al. |
| 6,519,648 | B1 | 2/2003 | Eyal |
| 6,529,584 | B1 | 3/2003 | Ravago et al. |
| 6,539,395 | B1 | 3/2003 | Gjerdingen et al. |
| 6,552,254 | B2 | 4/2003 | Hasegawa et al. |
| 6,555,738 | B2 | 4/2003 | Hughes et al. |
| 6,570,080 | B1 | 5/2003 | Hasegawa et al. |
| 6,594,699 | B1 | 7/2003 | Sahai et al. |
| 6,609,096 | B1 | 8/2003 | De Bonet et al. |
| 6,609,105 | B2 | 8/2003 | Van Zoest et al. |
| 6,647,417 | B1 | 11/2003 | Hunter et al. |
| 6,662,231 | B1 | 12/2003 | Drosset et al. |
| 6,701,355 | B1 | 3/2004 | Brandt et al. |
| 6,721,954 | B1 | 4/2004 | Nickum |
| 6,735,628 | B2 | 5/2004 | Eyal |
| 6,941,275 | B1 | 9/2005 | Swierczek |
| 6,941,324 | B2 | 9/2005 | Plastina et al. |
| 6,990,453 | B2 | 1/2006 | Wang et al. |
| 7,139,723 | B2 | 11/2006 | Conkwright et al. |
| 7,146,329 | B2 | 12/2006 | Conkwright et al. |
| 7,194,421 | B2 | 3/2007 | Conkwright et al. |
| 7,197,472 | B2 | 3/2007 | Conkwright et al. |
| 7,236,941 | B2 | 6/2007 | Conkwright et al. |
| 7,627,477 | B2 | 12/2009 | Wang et al. |
| 2002/0002897 | A1 | 1/2002 | Pachet et al. |
| 2002/0077985 | A1 | 6/2002 | Kobata et al. |
| 2002/0078029 | A1 | 6/2002 | Pachet |
| 2002/0103796 | A1 | 8/2002 | Hartley |
| 2002/0120564 | A1 | 8/2002 | Strietzel |
| 2002/0120577 | A1 | 8/2002 | Hans et al. |
| 2002/0166440 | A1 | 11/2002 | Herberger et al. |
| 2003/0001978 | A1 | 1/2003 | Smith et al. |
| 2003/0014436 | A1 | 1/2003 | Spencer et al. |
| 2003/0046213 | A1 | 3/2003 | Vora et al. |
| 2003/0046244 | A1 | 3/2003 | Shear et al. |
| 2003/0187953 | A1 | 10/2003 | Pearson et al. |
| 2004/0024688 | A1 | 2/2004 | Bi et al. |
| 2004/0054923 | A1 | 3/2004 | Seago et al. |
| 2004/0064209 | A1 | 4/2004 | Zhang |
| 2004/0254883 | A1 | 12/2004 | Kondrk et al. |
| 2004/0254957 | A1 | 12/2004 | Hyotyniemi et al. |
| 2005/0227674 | A1 | 10/2005 | Kopra et al. |
| 2007/0050360 | A1 | 3/2007 | Hull et al. |

FOREIGN PATENT DOCUMENTS

| | | |
|---|---|---|
| WO | WO02067447 | 8/2002 |
| WO | WO02102079 | 12/2002 |
| WO | WO/2005/066735 | 7/2005 |

OTHER PUBLICATIONS

Cohen, Peter. "iTunes 3.0.1 released." Macworld, Sep. 18, 2002.

Fanning, David. "Review: iTunes 3.0.1." Macworld, Apr. 1, 2003.

Week in Review. Los Angeles Times, May 4, 2003; p. C2. Automatic Music Selection for Changing Driving Patterns available @ http://www.priorartdatabase.net/IPCOM/000153848/, last accessed Jan. 22, 2008.

Home (Computer) Terminal Musical Program, IBM Technical Disclosure Bulletin, Dec. 1, 1980.

Wahid, Sa "How Habits are Formed by Our Mind." Oct. 27, 2006. EzineArticles.com. last accessed Sep. 19, 2008 @ <http://ezinearticles.com/?How-Habits-are-Formed-by-Our-Mind&id=339888->.

Name That Tune—Wikipedia, the free encyclopedia, pp. 1-12, available @ http://en.wikipedia.org/w/index.php?title=Name.sub.--That.sub.--Tune&prin- table=yes, last accessed Sep. 26, 2008.

Csinger et al. AI Meets Authoring: User Models for Intelligent Multimedia, available online at http://www.cs.ubc.ca/labs/lci/papers/docs1995/csinger-air.pdf, last accessed Dec. 18, 2010.

Claudine Conrado, et al; Privacy in an Identity-based DRM System; IEEE Proceedings of the 14th Internatl Workshop on Database and Expert Systems Applications (DEXA'03), Mar. 2003.

Kyung-Ah Chang, et al; Multimedia Rights Management for the Multiple Devices of End-User, IEEE Proceed. of 23rd Interntl Conf on Distributed Computing Systems (ICDCSW'03), Mar. 2003.

Jonker, et al; Digital Rights Management in Consumer Electronics Products; IEEE Signal Processing Magazine, Mar. 2004.

Koenen, et al; The Long March to Interoperable Digital Rights Management; Proceedings of the IEEE, vol. 92, No. 6, Jun. 2004.

Takanori Senoh, et al; DRM Renewability & Interoperability; IEEE 2004 p. 424-429.

Niels Rump; Can Digital Rights Management Be Standardized?, IEEE Signal Processing Magazine, Mar. 2004 p. 63-70.

David Geer; Digital Rights Technology Sparks Interoperability Concerns; IEEE Computer Magazine, Dec. 2004.

Walt Rocks: Rating the New Muisc Sites; Wall Street Journal, Oct. 22, 2003.

With the Web Shaking Up Music, A Free-for-All in Online Songs; Wall Street Journal, Nov. 19, 2003.

New Web Music Stores Offer Unique Features, and One is a Winner; Wall Street Journal, Apr. 1, 2004.

Claudine Conrado, et al; Privacy in an Identity-based DRM System; IEEE Proceedings of the 14th Internatl Workshop on Database and Expert Systems Application, 2003.

Kyung-Ah Chang, et al; Multimedia Rights Management for the Multiple Devices of End-User; IEEE Proceed. of 23rd Interntl Conf on Distributed Computing Systems, 2003.

"To Catch a Chorus: Using Chroma-Based Representations for Audio Thumbnailing"; Bartsch & Wakefield; Oct. 21-24, 2001.

MusicMatch Delivers Breakthrough Music Personalization Service in New MusicMatch Jukebox, PR Newswire, New York, NY, Feb. 22, 2000, retrieved from ProQuest on Feb. 19, 2010.

http://www.sonicspot.com/musicmatchjukebox/musicmatchjukebox.html, The Sonic Spot: MusicMatch Jukebox, retrieved on Feb. 19, 2010.

http://www.oldapps.com/musicmatch.php, OldApps.com, retrieved Feb. 19, 2010.

Fig. 5

| User History: | | | | | | | | | |
|---|---|---|---|---|---|---|---|---|---|
| Comp # | Usage-Rights Tokens | Avail locally ? | Current enjoyment | Peak enjoyment | Times heard | Play History. Last heard. | Targeted Time between playbacks | User Control Actions. Feedback History. | Likeability Curves, Functions |
| 854108 | per | y | 100 | 100 | 5 | | | | |
| 35139 | | y | 35 | 65 | 27 | | | | |
| 33865 | u | n | 5 | 85 | 47 | | | | |
| 894185 | n | y | 65 | 65 | s2 | | | | |
| | | | | | | | | | |

Number of Times Heard (e.g., play-count)

Number of Times Heard (e.g., play-count)

Current Enjoyment / Peak Enjoyment

Fig. 9

| Aggregate One-to-One Likeability Index: | | | | |
|---|---|---|---|---|
| If Like Comp # | Also liked Comp # | # Users Sampled | # Users Liking both | % Users liking both |
| 854108 | 883491 | 21,603 | 19,226 | 89 |
|  | 103293 | 34,885 | 30,349 | 87 |
|  | 527177 | 22,673 | 17,004 | 75 |
|  | …… |  |  |  |
| 854109 | 1429108 | 1,852 | 1,555 | 84 |
|  | …… |  |  |  |
| 854110 |  |  |  |  |
|  | …….. |  |  |  |

Fig. 10

| Aggregate Many-to-One Likeability Index: | | | | | | |
|---|---|---|---|---|---|---|
| If user likes these | | | | | | |
| Comp # | Comp # | Comp # | Also liked Comp # | # Users Sampled | # Users Liking all | % Users liking both |
| 854108 | 883491 | 107389 | 230845 | 19,176 | 15,533 | 81 |
| | | | 632952 | 1,456 | 1,150 | 79 |
| | | | 428503 | 11,062 | 8,628 | 78 |
| | | | ………. | | | |
| 854108 | 883491 | 35139 | 843004 | | | |
| | | | | | | |

Fig. 11

| Action by a User: | Current Time between Playbacks: | Updated Time between Playbacks: |
|---|---|---|
| User action "j" | 2 hours | 1.5 hours |
| User action "j" | 4 hours | 2 hours |
| User action "j" | 7 hours | 2.5 hours |
| User action "j" | 10 hours | 3 hours |
| User action "j" | 18 hours | 4 hours |
| User action "j" | 2 days | 7 hours |
| User action "j" | 5 days | 15 hours |
| User action "j" | 12 days | 28 hours |
| User action "j" | 24 days | 48 hours |
| User action "j" | 64 days | 96 hours |
| User action "j" | 128 days | 1 day |
| User action "j" | 256 days | 2 days |
| User action "j" | 512 days | 4 days |
| User action "j" | 1024 days | 8 days |
| User action "j" | 2048 days | 16 days |
| User action "j" | 4096 days | 32 days |
| User action "j" | 8192 days | 64 days |
| User action "j" | never | 128 days |
|  |  |  |

Fig. 16

```
Play-History:
    Anonymous-ownerID.   1304
    Composition-ID.   1603
    Record-of-Play 1     1604
    Record-of-Play 2     1604
    Record-of-Play 3     1604
        ….
    Record-of-Play "m"    1604
    Last Record.   1605
    Number of times played.  1606
    Average % played.   1607
    Validation Hash (digital signature).   1608
```
1601

Fig. 17

```
Record-of-Play "n":
    Date & Time played.   1702
    Experience-Provider.   1703
    % played.   1704
    Usage-rights TokenID used.   1705
    Likeability indicators    1706
    How initiated.   1707
    Reporting status   1708
    Validation Hash (digital signature).   1709
```
1604

Fig. 24a

Adjustments to composition rating of a user (100 point scale):

| Action by a User: | Adjustment to Rating of User: |
|---|---|
| User searches to find composition and then requests composition to be played and does not forward-past during its playback. | +25 |
| User requests that composition be played and does not forward-past during its playback. | +20 |
| User requests that composition be played but then forwards-past during its playback. | -5 |
| User requests/views visual information about composition while it is playing. | +15 |
| User activates "back" control to replay composition (within 0 to 3 seconds after composition finished playing). | +20 |
| User activates "back" control to replay composition (within 3 to 15 seconds after composition finished playing). | +15 |
| User activates "back" control to replay composition (more than 15 seconds after composition finished playing). | +10.5 |
| User activates "back" control multiple times (back multiple compositions) to replay composition | +13 |
| User activates "scan backward" control to re-play portion of composition. | +8 |
| User requests that full composition be played while highlight (sample) of composition is playing or recently finished. | +15 |
| User recommends the composition to another user(s). | +15 |
|  |  |
|  |  |

Fig. 24b

Adjustments to composition rating of a user (100 point scale):

| Action by a User: | Adjustment to Rating of User: |
|---|---|
| User increases sound volume during playback. | +3 |
| User sings along with more than 10% of composition. | +5 |
| User sings along with more than 20% of composition. | +8 |
| User sings along with more than 40% of composition. | +11 |
| User sings along with more than 60% of composition. | +15 |
| User sings along with more than 80% of composition. | +20 |
| User increases sound volume during playback. | +5 |
| User activates a "like" button/indicator. | +25 |
| User activates a "like" button/indicator two times. | +35 |
| User activates a "like" button/indicator three or more times. | +45 |
| User requests the "identification" of a composition originating external to the user's user-device. | +15 |
| User requests the "identification" and shows interest in a composition originating external to the user's user-device. | +25 |
| User requests the "identification" of a composition originating external to the user's user-device and purchases composition. | +35 |
|  |  |

Fig. 24c

Adjustments to composition rating of a user (100 point scale):

| Action by a User: | Adjustment to Rating of User: |
| --- | --- |
| User presses "dislike" (thumbs-down) button while composition is playing. | -50 |
| User "forwards past" (skips-past) composition within 2 seconds of experiencing composition. | -35 |
| User "forwards past" composition within 2 to 5 seconds of experiencing composition. | -25 |
| User "forwards past" composition within 5 to 15 seconds of experiencing composition. | -20 |
| User "forwards past" composition within 15 seconds to beginning 20% of experiencing composition. | -17.5 |
| User "forwards past" composition within the beginning 20% to 40% of experiencing composition. | -15 |
| User "forwards past" composition within the beginning 40% to 70% of experiencing composition. | -13.5 |
| User "forwards past" composition within the beginning 70% to 90% of experiencing composition. | -10 |
| User "forwards past" composition during last 10% of composition. | -8 |
| | |
| | |
| | |
| | |

Fig. 24d

Adjustments to composition rating of a user (100 point scale):

| Action by a User: | Adjustment to Rating of User: |
|---|---|
| User "forwards past" (skips-past) composition within 2 seconds of experiencing highlight (sample) of composition. | -35 |
| User "forwards past" composition within 2 to 5 seconds of experiencing highlight (sample) of composition. | -28 |
| User "forwards past" composition within 5 to 15 seconds of experiencing highlight (sample) of composition. | -24 |
| User "forwards past" composition within 15 to 30 seconds of experiencing highlight (sample) of composition. | -17.5 |
| User "forwards past" composition after more than 30 of experiencing highlight (sample) of composition. | -15 |
|  |  |
|  |  |
|  |  |
|  |  |

Fig. 25a

Adjustments to composition rating of a user (100 point scale):

| Newer Action by a User: | Prior Actions by a User: | Adjustment to Rating of User: |
|---|---|---|
| User action "m" (like indicator) | 4 or more positive actions | +22 |
| User action "m" (like indicator) | 3 positive actions | +19 |
| User action "m" (like indicator) | 2 positive actions | +16 |
| User action "m" (like indicator) | 1 positive action | +13 |
| User action "m" (like indicator) | No prior actions | +10 |
| User action "m" (like indicator) | 1 negative action | +10 |
| User action "m" (like indicator) | 2 negative actions | +8 |
| User action "m" (like indicator) | 3 negative actions | +6 |
| User action "m" (like indicator) | 4 negative actions | +5 |
| User action "m" (like indicator) | 5 or more negative actions | +4 |
| User action "m" (like indicator) | Play-count < 8 | +15 |
| | | |
| | | |

Fig. 25b

Adjustments to composition rating of a user (100 point scale):

| Newer Action by a User: | Prior Actions by a User: | Adjustment to Rating of User: |
| --- | --- | --- |
| User action "m" (like indicator) | None | +10 |
| User action "m" (like indicator) | One User action "m" | +15 |
| User action "m" (like indicator) | Two User action "m" | +22 |
| User action "m" (like indicator) | Three User action "m" | +35 |
| User action "m" (like indicator) | One User action "q" | -15 |
| User action "m" (like indicator) | Two User action "q" | -20 |
| User action "m" (like indicator) | Three User action "q" | -25 |
|  |  |  |
|  |  |  |
|  |  |  |

Fig. 26a

| Action by a User: | Adjustment to Time between Playbacks (for user): |
|---|---|
| User requests that composition be played and then not forwarded-past during its playback. | Decrease by 3x |
| User requests that composition be played but then forwards-past during its playback. | Increase by 2x |
| User searches to find composition and then requests composition to be played. | Decrease by 3.5x |
| User requests/views visual information about composition while it is playing. | Decrease by 1.3x |
| User activates "back" control to replay composition (within 0 to 3 seconds after composition finished playing). | Decrease by 3x |
| User activates "back" control to replay composition (within 3 to 15 seconds after composition finished playing). | Decrease by 2x |
| User activates "back" control to replay composition (more than 15 seconds after composition finished playing). | Decrease by 1.8x |
| User activates "back" control multiple times (back multiple compositions) to replay composition | Decrease by 1.6x |
| User activates "scan backward" control to re-play portion of composition. | Decrease by 1.5x |
| User requests that full composition be played while highlight (sample) of composition is playing or recently finished. | Decrease by 2x |
| User recommends the composition to another user(s). | Decrease by 1.7x |
|  |  |
|  |  |

Fig. 26b

| Action by a User: | Adjustment to Time between Playbacks (for user): |
|---|---|
| User presses "dislike" (thumbs-down) button while composition is playing. | Increase by 20x |
| User "forwards past" (skips-past) composition within 2 seconds of experiencing composition. | Increase by 10x |
| User "forwards past" composition within 2 to 5 seconds of experiencing composition. | Increase by 8x |
| User "forwards past" composition within 5 to 15 seconds of experiencing composition. | Increase by 7x |
| User "forwards past" composition within 15 seconds to beginning 20% of experiencing composition. | Increase by 6x |
| User "forwards past" composition within the beginning 20% to 40% of experiencing composition. | Increase by 5x |
| User "forwards past" composition within the beginning 40% to 70% of experiencing composition. | Increase by 4x |
| User "forwards past" composition within the beginning 70% to 90% of experiencing composition. | Increase by 3x |
| User "forwards past" composition during last 10% of composition. | Increase by 2x |
|  |  |
|  |  |
|  |  |
|  |  |

Fig. 26c

| Action by a User: | Prior Actions by a User: | Adjustment to Time between Playbacks (for user): |
|---|---|---|
| User action "t" (a dislike indicator) | 4 or more positive actions | Increase by 1.3x |
| User action "t" (a dislike indicator) | 3 positive actions | Increase by 1.6x |
| User action "t" (a dislike indicator) | 2 positive actions | Increase by 2x |
| User action "t" (a dislike indicator) | 1 positive action | Increase by 3x |
| User action "t" (a dislike indicator) | No prior actions | Increase by 5x |
| User action "t" (a dislike indicator) | 1 negative action | Increase by 6x |
| User action "t" (a dislike indicator) | 2 negative actions | Increase by 9x |
| User action "t" (a dislike indicator) | 3 negative actions | Increase by 12x |
| User action "t" (a dislike indicator) | 4 or more negative actions | Increase by 15x |
|  |  |  |
|  |  |  |
|  |  |  |
|  |  |  |

Fig. 26d

| Action by a User: | Prior Actions by a User: | Adjustment to Time between Playbacks (for user): |
|---|---|---|
| User action "u" (like indicator) | None | Decrease by 1.3x |
| User action "u" (like indicator) | One User action "m" | Decrease by 1.5x |
| User action "u" (like indicator) | Two User action "m" | Decrease by 2x |
| User action "u" (like indicator) | Three User action "m" | Decrease by 2.5x |
| User action "u" (like indicator) | One User action "q" | Decrease by 1.6x |
| User action "u" (like indicator) | Two User action "q" | Decrease by 1.8x |
| User action "u" (like indicator) | Three User action "q" | Decrease by 2x |
| User action "u" (like indicator) | One user action "e"; One user action "f" | No change |
| | | |
| | | |
| | | |
| | | |
| | | |

Fig. 28

| Action by a User: | Current Time between Playbacks: | Updated Time between Playbacks: |
|---|---|---|
| User action "j" | 2 hours | 1.5 hours |
| User action "j" | 4 hours | 2 hours |
| User action "j" | 7 hours | 2.5 hours |
| User action "j" | 10 hours | 3 hours |
| User action "j" | 18 hours | 4 hours |
| User action "j" | 2 days | 7 hours |
| User action "j" | 5 days | 15 hours |
| User action "j" | 12 days | 28 hours |
| User action "j" | 24 days | 48 hours |
| User action "j" | 64 days | 96 hours |
| User action "j" | 128 days | 1 day |
| User action "j" | 256 days | 2 days |
| User action "j" | 512 days | 4 days |
| User action "j" | 1024 days | 8 days |
| User action "j" | 2048 days | 16 days |
| User action "j" | 4096 days | 32 days |
| User action "j" | 8192 days | 64 days |
| User action "j" | never | 128 days |
| | | |

ADAPTIVE PERSONALIZED MUSIC AND ENTERTAINMENT

CROSS REFERENCE TO RELATED APPLICATIONS

This application is a continuation-in-part (CIP) of U.S. application Ser. No. 11/161,710 filed on Aug. 12, 2005 entitled "Distributing Digital-Works and Usage-Rights to User-Devices"; and is a continuation-in-part of U.S. application Ser. No. 10/605,879, filed on Nov. 3, 2003, entitled "Adaptive Personalized Music and Entertainment". These earlier applications, in their entirety, are incorporated by reference into this specification.

BACKGROUND

Existing methods for entertaining a listener (or viewer) with music or music videos (or other entertainment) have numerous limitations that result in a less than an ideal user experience.

A major limitation with broadcast media such as radio and television is that the user has no control over the channel stream. If the listener does not like the current composition, the listener's only option is to change to another station or channel. However, there are typically a limited number of alternate channels of music suitable for the user. In addition, to switch quickly to a suitable alternative channel requires the user to have found and pre-selected the alternate channels of interest. When the user does switch channels, the new channel will most likely be somewhere in the middle of a composition, advertisement or other audio presentation. Recently commercial-free radio is being offered via satellite radio (e.g., XM Radio) and some internet radio stations, but the music is not customized to each user. Another major limitation of broadcast is that there is no link between the broadcast stream and the user's music collection. If the listener does hear a song they would like to add to their music collection, they typically need to remember the artist, album and song so it can be located or acquired at some later time. Often, the information needed to acquire a song (artist, album, title, etc) is not available at broadcast time when the listener is interested in it.

A major limitation of purchased albums on media such as CD's, DAT, tapes, and DVD's is that the user must expend considerable effort to be able to identify what they want and then to locate the media at a vendor and then purchase it. In order to purchase a media, the listener must be able to identify the specific album desired by artist and album name. Each purchased media may include many compositions that the user does not want. Sometimes the listener may purchase the wrong album by mistake. Once purchased, the listener must provide physical storage for the media and then later locate and insert the media to playback the compositions. To playback a particular song, the user must remember the particular media (e.g., CD) the song is located on and then be able to find that specific media among perhaps 100's of similar looking media. The user must also coordinate and physically transport the media between the user's various locations and user-devices (e.g. home, car, portable player, etc). Often, a desired album's media may not be at the desired user's location. In addition, media players hold only a limited of number of media so the user is limited to a playback stream from a limited number of albums at any one time. For certain locations, such as in an automobile, the locating, handing and inserting the media may be a safety distraction. The order of playback is limited to the composition order on the media, the random ordering of the media compositions and/or perhaps a playlist the user manually defines. The media is subject to scratching or other physical damage, requiring the user to create backup copies or purchase replacement copies. The physical media may have a physical lifetime which is much shorter then the users. In addition, due to the rapid rate of technological change, vendor support for a given media format may be less than the user's lifetime.

An emerging technology is the storage and management of the user's music collection on the user's personal computer (PC). With compression technology (such as MP3 or WMA formats), approximately 2500 (near CD quality) songs can be stored per 10 Gbyte of hard disc capacity. Since PC's with 30 to 100+ Gbyte discs are now commonly available, now or in the near future, PC's will have sufficient capacity to hold a user's full music collection in compressed format. The user's collection is typically managed on the PC by interactive windows driven software, which the user must install and learn to use. The user must expend a significant effort to build their collection of compositions. The user may expend significant effort to convert their previously purchased media (such as CD's) into suitable compressed files on the PC hard drive. Even using high read/write rate drives, such a conversion could take 3 to 10 minutes per CD and 5 to 16 hours for a collection of 100 CD's. The quality of the compressed file is determined by the user's ability to operate the compression software and select the appropriate compression settings for each composition.

An emerging way of building a music collection on the user's PC is the purchase and down load of songs in a suitable compressed format across the internet. The major providers of downloadable songs include PressPlay, AOL MusicNet, FullAudio MusicNow, and MusicMatch. Users use the PC to locate, purchase and download new songs over the internet. A major limitation of this approach is that the user must be able to identify the artist, album and song by name. Disadvantages include that the user must manually locate each song within the catalog of songs in the provider's database, by typically either reading through an alphabetical list of songs by musical category (genre), artist, album; or alternatively by performing a search for each song via a search tool. They may have to navigate a separate set of web pages to locate and download the composition. In some cases, a web page may provide a short sample of a song which may be heard before purchasing and downloading the full song. The user may have to wait while the download is occurring, in order to verify it downloaded correctly. An additional disadvantage is that the additional cost of the PC may exceed the cost of the user-devices. In addition, the user must learn to use the PC and its software. The user must manage the downloaded composition once it's been downloaded. The user may have to manually create playlists and later relocate the user created playlists by the playlist name.

Some users have built a portion of their collection via music piracy and file sharing software, often using peer-to-peer networks across the internet. The user faces ethical and legal issues. The user faces additional security and privacy issues associated with the peer-to-peer networks and the associated software such as viruses, worms, spyware, and stealth software. In addition, the quality of each music file is unknown and not guaranteed, since there are multiple good, marginal, bad and bogus versions of each song out on the network. The user must expend effort to locate the artist, album and song. Then, after waiting for the download to complete, the user must determine if the quality of the downloaded song is acceptable, and begin the process again if the quality is insufficient. The quality of the pirated song may be well below the quality of the original version.

Once the collection is built, the user must manage their collection of songs on the PC storage device. Using windows driven software on the PC, the user must manually select among the songs in their collection to create one or more playlists. In addition, the user must periodically back-up their collection on the PC to protect against loss due to drive failure, fire, damage or theft. For large collections, this is so inconvenient and time consuming; it is often not done frequently enough or not done at all, placing at risk of loss all of the user's efforts in building their collection. There are many competing file formats (MP3, WMA, AAC, etc), which only operate with certain vendor's hardware and/or software. The formats are constantly evolving and may have a limited vendor support lifetime. The user's collection in a particular format may no longer be supported at some point in time, requiring considerable user effort to convert the collection into another supported format, if a conversion is even possible.

Several new types of music players, including portable players, have emerged that are capable of handling compressed storage formats. The user's collection and playlists for these devices are typically managed via interactive windows software on the user's PC. For players with limited storage capacity (e.g., SonicBlue Rio MP3 player), PC software is used to select a limited portion of the user's collection, which is then sent to the player's memory over a cable or loaded onto memory media or a memory device which the user can insert into the portable player. Some recent players (such as Apple's iPod, Creative's Nomad Jukebox Zen, or PhatNoise's PhatBox) have large enough hard disc storage (10 to 30 Gbyte) to hold a collection of up to 2000 to 8000 songs. Some players (e.g., the Apple iPod) auto-synchronize with the PC by plugging into a high rate interface cable. The PhatBox player, intended for installation in automobiles has a removable hard disk cartridge that attaches to a PC cradle (USB 2.0 cable) for content management. The user's collection and the creation of user playlists are managed on the PC via interactive windows based software.

Another emerging technology is user customized radio via streaming across the internet, such as Yahoo LaunchCast. An automatically generated sequence of songs, custom selected based on the user's profile, is generated remotely at the service providers server. The stream is forwarded to the user across the internet to a player application located on the user's PC. Each user creates a unique profile using an interactive windows application on the PC in-order to select music categories and artists the user likes. The user also may provide additional profile feedback, while a composition is playing or by accessing the user's library, to rate each song, album and artist on a rating scale. A major disadvantage of LaunchCast is that there is no link between the user's radio profile information and the user's music collection [i.e., the user's usage-rights (e.g., listening-rights) to particular compositions]. Because there is no link with the user's usage-rights, the LaunchCast user does not have the ability to go "backward" or to repeat a song or cause a particular song to play. If the user wishes to add a composition that is playing to their collection, they are only provided with a link to a web page where the CD may be purchased. A disadvantage of streaming is the skipping or jumps that occur if the continuous virtual bandwidth is interrupted by other network traffic. Another disadvantage of streaming is its limited tolerance to insufficient network latency, which can result in delays in the radio program, especially when the user decides to "forward" or "skip" over the currently playing song.

Other interactive internet based streaming services allow the user to create a custom playlist or multiple playlists of favorites, by selecting each song to include from a catalog of compositions provided by the service. A major limitation is that the user must be familiar enough with the composition to be able to identify the artist, album and song by name. In addition, the user must expend considerable effort to manually locate each song within the catalog of songs in the provider's database or the user's library, by typically either reading through an alphabetical list of songs by genre, artist, album or performing a search for each song by using a search tool. The user must continually and manually update all this as their musical tastes change over time. To generate a stream of songs, the user may then have to choose a group or order of particular songs to form a user's custom playlist. Another limitation is the user does not own the music collection and does not own usage-rights to the music. In addition, it is not integrated to other usage-rights the user already has purchased.

In some internet services, the user may indicate the relative likeability of each of the songs in their custom playlist. Typically, the user manually rates each composition based on a scale, such as 1 to 100. Which requires the user to manage in their mind the relative rankings of songs by rating number so one song has a higher number relative to another. In addition, the user must manually change their ratings and their playlists as their taste for songs changes over time. This typically requires a significant amount of visual interaction from the user, often with a PC windows based display, which is not suitable while driving an automobile or for many other activities.

The Apple iTunes system is currently one of the most popular methods for purchasing music on-line. When a user makes an on-line purchase, the usage-rights and composition is typically downloaded and then stored locally on the hard disk of a user's personal computer (PC). With Apple iTunes, a user may only be allowed to download the composition once (or a limited number of times) per purchase. A user may lose their purchased usage-rights if this local user-device (typically a personal computer) is damaged, destroyed, lost, stolen, etc. If lost, the iTunes song must be purchased a second time before it can be downloaded again.

To protect their iTunes collection from loss, users are responsible for backing up their collection of compositions by copying them from the personal computer to an external storage device or media. Without a backup copy, any damage or loss of the personal computer's hard disk will result in an unrecoverable loss of the user's collection and the user would be required to repurchase and rebuild their collection again from scratch. Many users do not perform regular backups because of the time and effort involved. Even when backups are done, users often keep their backup copies in close proximity to their computer hard drive, which may not protect against loss or damage from a fire or theft.

With Apple iTunes, a purchased song may be authorized for use on only 5 user-devices (of an authorized type) at a time. The user is required to perform a complicated procedure to transfer a song and obtain authorization to use the song on each new user-device. In order to authorize the use of a song on a new user-device, the user may be required to enter the Apple-ID and password used to purchase the song. When the 5 user-device limit is reached, the user is also required to manually de-authorize a song on one user-device so it can be authorized on another user-device. The user must also remember to de-authorize their computers and user-devices whenever they are sold, given away or are serviced.

Transfers of iTunes usage-rights to other user-devices (such as a portable player) are typically accomplished by a cable or local area wireless connection between the PC and the second device. This typically requires the other user-devices to be brought near the PC or local media server where the user's usage-rights are stored. In addition, the user must plan and coordinate bringing the devices together whenever a transfer of usage-rights is desired. Such transfers are particularly difficult when the user-devices are at different physical locations (such as home, work, automobile, etc.) or are not easily portable.

Overall, an iTunes user must expend significant time and effort to acquire, download, backup, and transfer songs between their user-devices and to authorize/de-authorize their collection of songs at each user-device.

Today, a given user-device is typically compatible with only one or a limited number of the many different file formats, compression-decompression algorithms and content-protection methods. Vendors such as Microsoft, RealNetworks and Apple may use proprietary or industry standard (MP3, MPEG-4) approaches. These are often not interoperable. Digital content packaged for one vendor's user-devices (e.g., Apple) may not be playable on another vendor's user-devices (e.g., Microsoft Windows Media). In addition, new, different and improved formats, compression-decompression algorithms and content-protection methods are expected to be introduced in the future.

Today, the content-protection methods are typically based on proprietary digital rights management (DRM) approaches that are unique to each vendor's user-devices. Examples of DRM solutions include InterTrust (Rights System), RealNetworks (Media Commerce Suite), Windows Media (Rights Manager) and Widevine Cyper.

When the user purchases digital content (e.g., a composition) today, it may only play on the user-devices from a single vendor. For example, if a user purchases a song from the Apple iTunes Music Store, it can only be played using an iTunes jukebox (Apple software) on the user's PC or using an Apple hardware device such as an Apple iPod portable player.

Today, the large number of incompatible choices confuses consumers and reduces sales because consumers are uncertain about what to buy and are afraid of buying soon-to-be obsolete products. Consumers recognize that many different media products that are introduced in the marketplace quickly die (for example, Beta VCR tapes). Consumers are also concerned that new technology will be introduced in the near future that will make their purchased user-devices and composition formats obsolete (for example, vinyl LP records). Today, many consumers may decide to delay purchases of user-devices and their corresponding compatible digital-content (e.g., digital-works) until a technology approach becomes the established industry standard.

More generally, the above discussion may also apply to any type of digital-work including music, music videos, multimedia, artwork, pictures, audio, sound, short films, movies, video clips, television programs, audio versions of books, talks, speeches, voice content, lectures, software, software plug-ins and any other type of digital-work. In some cases, the media formats will differ (DVD's or other formats instead of CD's), but the limitations discussed are generally applicable.

SUMMARY

A method and system for providing a personalized entertainment experience that is customized for each user. User actions and user control actions may be associated with each played composition and captured as user feedback about each composition. A targeted time between playbacks of a composition may be determined by using said control actions. A customized sequence of compositions may be automatically generated for each user by utilizing a history of the user actions and/or control actions. The personalized sequence may automatically adapt to changing user preferences and feedback over time. The user's collection of compositions may be automatically integrated with the generated customized sequence. Additional compositions and samples, that are new to a user, may be automatically chosen based on the prior user feedback/history and may be added to the user's collection when indicated by user action(s).

There are many objects and advantages of the disclosed embodiments, when compared with the existing state of the art. The objects and advantages may vary with each embodiment. The objects and advantages of each of the various embodiments may include different subsets of the following objects and advantages:

Provide a simplified way providing an entertainment experience that is customized for each user.

Allow the user to experience both different and new compositions, more easily and at a faster rate.

Simplify the process of finding and acquiring a larger variety of pleasing compositions for each user's collection.

Simplify the purchase and delivery of compositions to create a user's collection.

Not require the user to identify and select compositions based upon knowledge of the composition such as composition title, artist's name, or album name.

Protect a user's collection of compositions against the theft or loss.

Eliminate all user efforts and concerns with backing-up and storing their personal collection of compositions (digital-works).

Preserve a user's profile, history and collection even if user-devices are lost, stolen, broken or destroyed.

Eliminate user efforts of knowing, locating or converting different file formats for different user-devices and future user-devices.

Allow each user's profile, history and collection to be available to all the user-devices wherever they are located or used. Allow each user's profile, history and collection to be immediately available to any user-device not previously used by the user (a new purchase, a friend's, etc.).

Automatically manage the user's collection of compositions. Allow user's compositions to be usable anywhere the user is. Automatically distribute, as needed, the user's compositions (collection) to any user-device where the user is active. Eliminate all user efforts to transfer their compositions between user-devices.

Allow each user's profile, history and collection of compositions to be usable with all experience-providers. Allow the user to easily switch between experience providers.

Maintain privacy and anonymity of each user's profile, history and collection of compositions.

Adapt to each individual user's control actions, representing real-time feedback of likes and dislikes of compositions while they are played.

Adapt to changing user tastes, such as when a user becomes tired of a given composition.

Utilize the prior experiences of other similar users, to improve each user's experience.

Allow aggregate real-time information collected from the many users to influence decisions made by the experience-providers, composition-providers and composition creators.

Provide a simple and intuitive user interface that is similar to existing user-devices that users are already familiar with.

Allow users to share a favorite composition or their current list of favorites with each other.

Protect compositions against piracy.

Provide such a superior experience and ease of use (compared with pirated alternates) that user's will prefer to pay for such convenience.

BRIEF DESCRIPTION OF DRAWINGS

FIG. 5 illustrates an embodiment of a user history database.

FIG. 9 illustrates an embodiment of an Aggregate Common Likeability Database.

FIG. 10 illustrates an alternate embodiment of an Aggregate Common Likeability Database.

FIG. 11 shows examples of relationships of "updated time between playback" versus the "prior time between plays" and "user action".

FIG. 16 illustrates an example of the contents of a playback history.

FIG. 17 illustrates an embodiment of the contents of a record of a single playback.

FIG. 24a-24d shows examples of the relationships between a rating and action by a user.

FIG. 25a-25b shows examples of the relationships between a rating; and both newer action by a user and prior action(s) by a user.

FIG. 26a-26b shows examples of the relationships between the "time between playbacks" and action by a user.

FIG. 26c-26d shows examples of the relationships between the "time between playbacks"; and both newer action by a user and prior action(s) by a user.

FIG. 28 shows examples of relationships of "updated time between playbacks" versus the "prior time between plays" and "user action".

DETAIL DESCRIPTION

Although some of the following detailed embodiments are illustrated or described in terms of audio or musical compositions, the disclosed concepts and embodiments are more generally applied to any type of composition, digital-work or digital-content including recorded-music; music videos; multi-media; artwork; pictures; audio; sound; short films; movies; video clips; television programs; audio versions of books; talks; speeches; voice content; lectures; software; software plug-ins; and any other type of digital-work.

In general, where the word "composition" is used in the description, "digital-work" or "digital-content" may be substituted in its place. Where the words "playback-device" or "player" or "media-player" is used in the description, "user-device" may be substituted in its place. Where the word "composition-provider" is used in the description, "digital-work-provider" or "digital-content-provider" may be substituted in its place.

Figure 2:
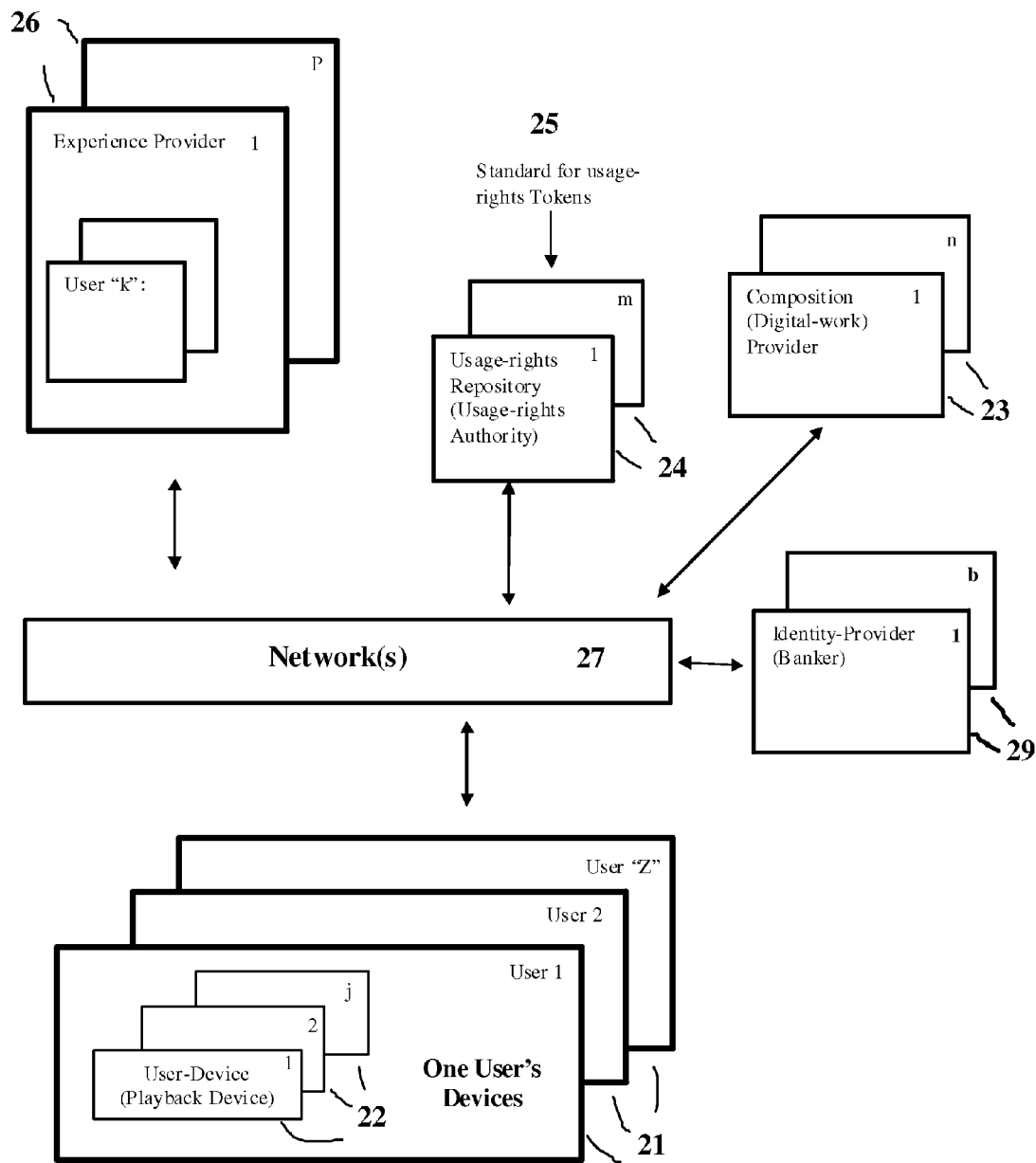
FIG. 2 illustrates the functional flow between user-devices, experience-providers and composition-providers and (optional) identity-providers.

Distribution of Compositions:

FIG. 2 illustrates the functional flow between user-devices 21, composition-providers 23, experience-providers 26 and usage-rights repositories (usage-rights authorities) 24 across one or more networks 27.

As shown in FIG. 2, there may be a plurality of possible users 21 (user1, user2, . . . , user"z"). Each user may operate one or more user-devices 22 at different times and different locations such as at home(s), work(s), automobile(s), portable(s), etc. A user-device 22 is capable of utilizing one or more types of digital-works. User-devices may also be incorporated into other products such as a cell phone, television or home entertainment system. The user-devices may be mobile and portable. Some user-devices (i.e., a personal player) may be used by only a single individual user. Other user-devices (i.e., an automobile player) may be operated by different individuals at different times. The user-devices may be manufactured by many different vendors. Any given user-device 22 may only be able to handle only certain types of digital-works and may only be able to handle a subset of the available composition formats.

There may be many composition-providers 23 that each provide their own catalog of compositions for which they control the intellectual property rights. A composition-provider 23 may control the compositions for a single composition creation entity [i.e., the creative artist(s) or group] or many composition creation entities.

There may also be many different experience-providers 26. An experience-provider 26 is responsible for providing the adaptive personalized entertainment sequence that is customized for each user and is integrated with the user's collection of compositions. The experience-provider 26 may automatically introduce the user to appropriate new compositions over time and automatically adopt the personalized program sequence as a user's tastes change. The experience-provider 26 automatically distributes the user's collection and also automatically collects and maintains the user's profile and history across all the user-devices. The user's collection is made available to any user-device 22 that the specific user is operating.

There may also be one or more usage-rights repositories (usage-rights authorities) 24. The usage-right repository utilizes a common "standard for usage-rights tokens" 25 so that a user's collection of compositions, represented by the set of usage-rights tokens a user acquires, may be recognized and usable with all experience-providers. Each usage-rights token may be defined to limit use to only a specific individual user or a group of specific users (e.g, a family). The tokens representing the compositions in a user's collection may be easily transferred between and used with any of the experience-providers. The usage-rights repository may maintain a database of all issued tokens so a user's collection (usage-rights tokens) may be preserved even if all the user-devices of a user were to be lost or damaged.

Portions of the network(s) 27 may be wired or wireless. In some embodiments, a wireless interface between user-devices and the network 27 may be preferred, since the wireless connection may be established and maintained more automatically and with minimal user efforts.

Most users may typically utilize many different players at different locations throughout the day and from day-to-day such as in different rooms of the home, at different homes, at different work locations, in different automobiles, or various portable user-devices. In addition, there are many user-devices that the user may only temporarily use, such as user-devices located at a hotel, a rental home, a rental car, on loan from a friend, etc. It is desired that the user's history and profile be interoperable and automatically synchronized between all these user-devices so the user history collected at each user-device is available to all other user-devices. An experience-provider 26 may automatically perform the required level of synchronization between all of the user-devices and storage locations on the network(s).

In one embodiment, the user history and user profile information is stored redundantly at multiple locations distributed across a network(s), such as the internet, so that the user's information has a high availability (even if some network nodes/paths are down) and is robustly protected from loss. Periodic back-up or archiving of the information may also be utilized to provide an additional protection against loss of the user's information. In one embodiment, this storage function is provided by the experience-provider. Alternatively, a separate storage provider may provide storage, backup, archiving and protection of the user's history and library on the network. In-order to protect user privacy, user information stored on the network may be stored in an encrypted form for which the storage provider does not hold the decryption keys. Encryption mechanisms may be utilized to keep a user's history private and not accessible to human prying.

In some embodiments, there may also be one or more identity-providers 29. An identity-provider 29 may be optionally used to provide an anonymous ownership of usage-rights so that the actual owner of a composition remains hidden and is protected against disclosure to others. In some embodiments, the identity-provider 29 may also perform banking functions in-order to maintain user anonymity and to protect the actual user's identity from disclosure to others.

Experience-Providers:

An experience-provider 26 is responsible for providing the adaptive personalized music (or entertainment) program that is customized for each user and is integrated with the user's collection of compositions. The experience-provider 26 may coordinate the following functions automatically without requiring any significant user action:

- Provide a sequence of compositions, highlights and other material that is customized for each user based upon the prior history of user control actions and feedback.
- Provide copies of compositions, highlights and other material to all user-devices as needed.
- Manage, store, backup and make available the user's collection so that it is available to all the user-devices. The user's collection may be represented by a set of user usage-rights tokens.
- Manage, store, backup and update the user's history (including control actions, feedback, play history, profile) across all of the user-devices in-order to adapt to the user's changing tastes.
- Recommend new compositions and highlights likely to be appealing to each specific user. Automatically incorporate the new compositions and highlights into the user's program sequence and the user's collection.
- Provide pre-customized channels for each user (representing different categories, genre or moods of music) that may then be further optimized for each user based on user control actions and feedback.
- Provide additional advertisements, news, or weather presentations in the user's program stream that are customized for each user based on user control actions, feedback or user profile.
- Provide software updates for user-devices.
- Obtain usage-rights for compositions that are made available to the user. Pay royalties to composition owners based on the user's usage.
- Bill users for composition purchases, usage and other services.
- Provide a "capture" mode capability to enable user's to identify and later experience and evaluate a composition they may be hearing from a non-user-device.
- Provide a "share" mode capability to enable a user to share a list of compositions with other users.

Although all of the above functions may be performed by the user's experience-provider, they may be performed by separate entities that are under the coordination of the user's experience-provider. In one embodiment, the user may have many experience-providers to choose between and may be able to easily (instantaneously) switch, with low/no switching costs from one experience-provider 26 to another.

In one embodiment, the user's collection may be easily shared and utilized with all experience-providers 26 and all user-devices 22. This may be accomplished with user usage-rights tokens that are issued by usage-right authorities 24 or composition-providers 23 that are universally recognized by all experience-providers 26. This eliminates problems with tokens issued by each experience-provider 26 but which are not recognized by other experience-providers and hence are not transferable and not interoperable.

In some embodiments, an industry standard for universally recognized usage-rights may be adopted that is available for use by all industry participants. Experience-providers may automatically translate a universal usage-right of an individual user into an experience-providers proprietary usage-right that is compatible with the proprietary digital rights management (DRM) system(s) used by the experience-provider. For example, a universal usage-right may be automatically translated into a usage-right which is compatible with the proprietary digital rights management (DRM) system used by the Apple iTunes/iPod systems. In this way, a user no longer needs to be concerned that their purchases of usage-rights for a composition will only be usable with a single vendor's proprietary system (such as only Apple iTunes/iPod). By eliminating this user concern, users may be more comfortable and hence more likely/willing to increase their purchases of usage-rights for compositions since their usage-rights are no longer being locked to a single vendor. Universal usage-rights may also reduces the pressure on the industry to provide compositions without DRM protections (e.g., in non-DRM protected formats). Hence, universal usage-rights may enable the industry to continue to use DRM to protect against piracy, while still enabling users to use their purchases of compositions (usage-rights) at all user-devices and with all experience-providers.

The experience-provider's costs for the library storage and management functions may be effectively amortized across a large number of users. All transfers of information between the experience-providers repository (or depository) and the user-devices may occur automatically without requiring any user knowledge or action. Concurrency of user data in the currently active user-device(s) 22 and the usage-rights repository 24 may occur automatically across the network 27 without the user needing to be aware of it or taking any action.

Prior to a user-device 22 shutting down, all the latest user feedback and user history may be forwarded to the usage-rights repository 25 for later use by other user-devices. The user-device's user display may optionally include an indicator that is activated during user-device 22 shutdown, to indicate whether concurrency with the repository has been completed. Optionally, the user-device 22 may include an automatic capability of periodically trying to establish a network 27 connection for upload in-order to complete concurrency with the repository prior to concluding shutdown.

In some embodiments, user-devices will be able to operate with intermittent or temporarily unavailable network 27 connections. When a network connection is not available, the user-device 22 may utilize compositions and highlights that were previously transferred to the local storage in the user-device. New highlights and new compositions may be temporarily limited to what was locally stored during previous network connections. In addition, timely information such as news and weather may not be available when the network connection is lost.

News, weather, traffic, etc may also be customized for the user based upon factors such as the day of week, time of day, or the location of user. Customization of weather and traffic reports to the day of week and time of day. Reports may be automatically adapted to the current physical location of the user.

Since the entertainment-program is customized for each user, in some embodiments, only one entertainment-program may need to be active for each user at any one time. In some other embodiments, the user may want the same entertainment-program to be available at multiple locations, such as in multiple rooms in a house. The experience-provider 26 may impose limitations on the number of simultaneously active user-devices and/or the maximum physical separation of user-devices that may be simultaneously active.

Figure 3:
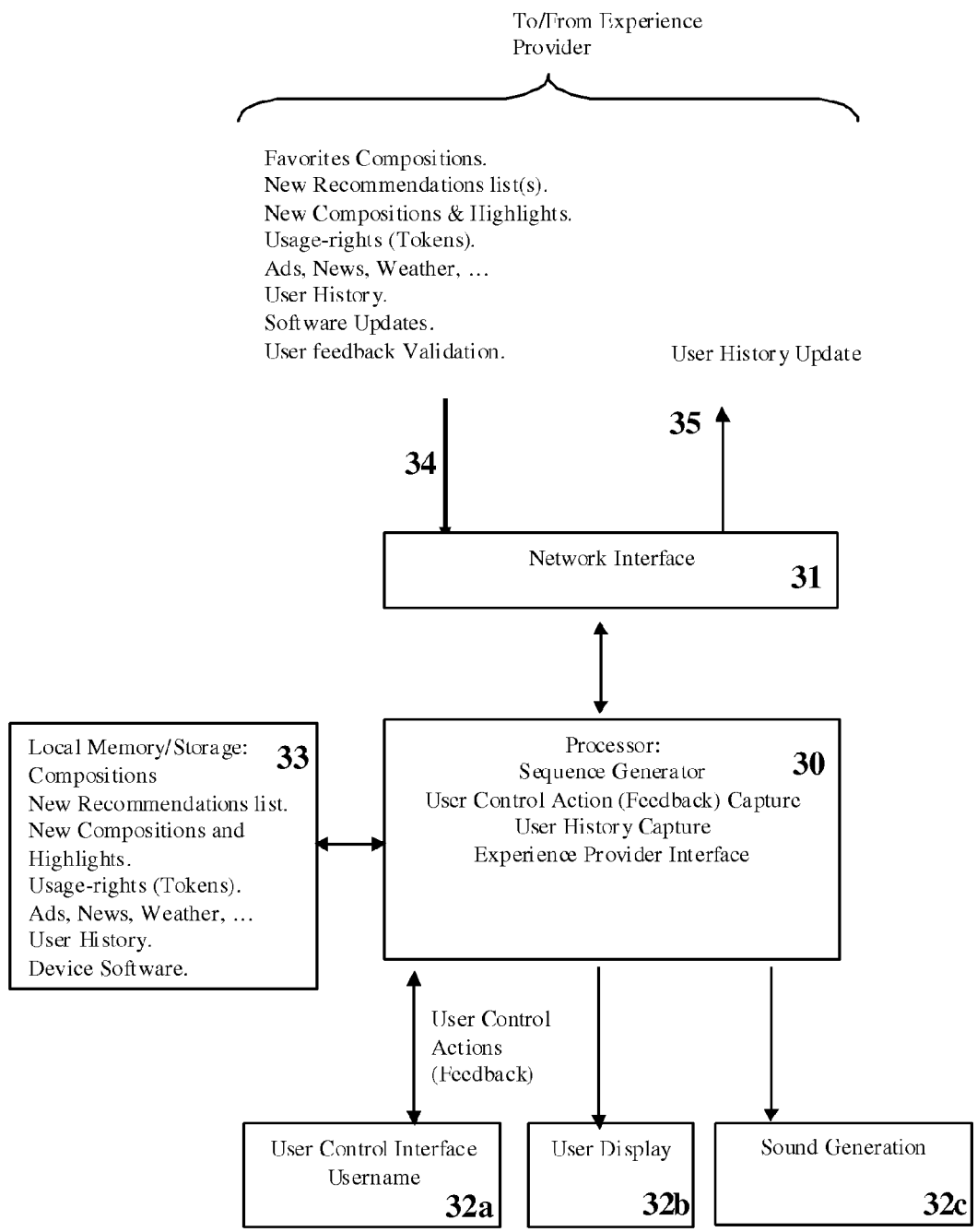
FIG. 3 is a functional diagram of a user-device such as a personalized music player.

User-Device:

FIG. 3 is a functional diagram of a user-device 22 for generating an adaptable personalized entertainment experience. The user-device 22 includes a "user control interface" 32a for accepting user control actions. The user-device 22 may include one or more means for determining the individual user that is active at the user-device. The user-device 22 may include a "user display" 32b for presenting visual information for the current composition or user-device 22 status. The user-device 22 also includes "sound generation" capabilities 32c or an interface to an external sound generation apparatus so the user may hear the customized sequence of compositions and other program information. The user-device 22 includes storage (e.g., memory) 33 to hold information locally that may include: 1) Compositions. 2) New recommendations list(s). 3) New compositions and highlights. 4) Usage-rights (tokens). 5) Advertisements, news and/or weather. 6) User history 7) user-device software and updates. The memory storage 33 may utilize non-volatile memory or media so the contents are maintained even when the user-device is un-powered.

The "network interface" 31 receives information 34 from the experience-provider 26 and sends information 35 to the experience-provider. Most transfers to and from the experience-provider 26 occur automatically without requiring the user to specifically initiate them. Information received 34 may include: 1) Favorite compositions. 2) New recommendations list(s). 3) New compositions and highlights. 4) Usage-rights tokens. 5) Ads, news and weather. 6) User history. 7) Software updates. 8) User feedback validation. Information sent 35 to the experience-provider 26 may include the user's history and updates to the user's history. User history and updates to user history may include: 1) User profile information. 2) User control actions. 3) User feedback. 4) User playback history. 5) User content restrictions.

The user-device 22 also includes a processor 30. The processor performs the user functions such as 1) Sequence Generation. 2) User control action (feedback) capture. 3) User history capture and update. 4) Experience-provider 26 interface transfers.

Identifying the Specific User:

Each user-device 22 may determine the specific user that is active at the user-device. Identification of the user at the user-device 22 allows 1) using the user's usage-rights at the user-device; 2) customization of the entertainment program for the individual user; and any other user specific capabilities.

In one embodiment, each time the user-device 22 is re-started or powered-up the user may be re-determined so that multiple users may intermittently share the same user-device, yet experience a customized program. Voice recognition of the user's voice or a unique verbal identifier or some combination of both may be used. Other possibilities include the recognition of the user via a camera image taken at startup, or various bio-metric sensing of the user such as a fingerprint sensor on the "on" control or other user-device controls.

The user-device 22 may also keep a secured/encrypted record of the login-info of prior user-device users that were previously validated by the experience-provider. This enables a prior user to login and utilize a user-device 22 when a network connection to the experience-provider 26 is (temporarily) unavailable. In some embodiments, the user-device 22 may need to periodically re-connect with an experience-provider, in-order to re-authorize another time-period for using the user-device 22 without a network connection to an experience-provider.

In some cases, the identification process may be defaulted or biased toward the most recent user(s). For user-devices that are typically used by only a single user, the user identity may be configured on initial use and not reconfigured unless a reconfiguration is specifically requested by the user. In one embodiment, the user identification process may require minimal or no special user actions.

Accuracy in identification of the user is important to prevent corruption of both the user's usage-rights and user history due to user identity errors, piracy or identity theft. Additionally, since the user's history and usage-rights are of considerable value to each user, user "identity theft" should be protected against. Methods for identity recovery may be employed, so a user's history may be restored to the state just prior to the occurrence of an identity theft. Software may be utilized by the experience-providers to monitor for unusual behaviors that are indicative of identity theft.

It is desirable to create a user experience so that it is in the user's interest to correctly identify them selves to the "system" and to protect themselves against identity theft or the loaning of their identity to others. Users will realize that the use of their identity by others, will corrupt their user feedback history and compromise their customized program experience. By protecting the user's collection and by providing a customized experience and continually introducing new compositions that are of high value to the user, users will be naturally compelled to correctly identify themselves and avoid loaning their identity to others.

Besides the everyday-userID (e.g., login-ID) used at the user-devices, a more hidden and secured user identity (e.g., anonymous-ownerID) may be maintained by the "system". This allows the user to re-establish a new everyday-userID if it becomes compromised.

User Interface:

The user-device 22 (i.e., personalized player) may be controlled by the user via numerous types of user interfaces including voice activated, manual controls, touch screens, interactive displays, remote control devices, and/or any other type of interactive and/or Human Machine Interface (HMI).

Figure 4:
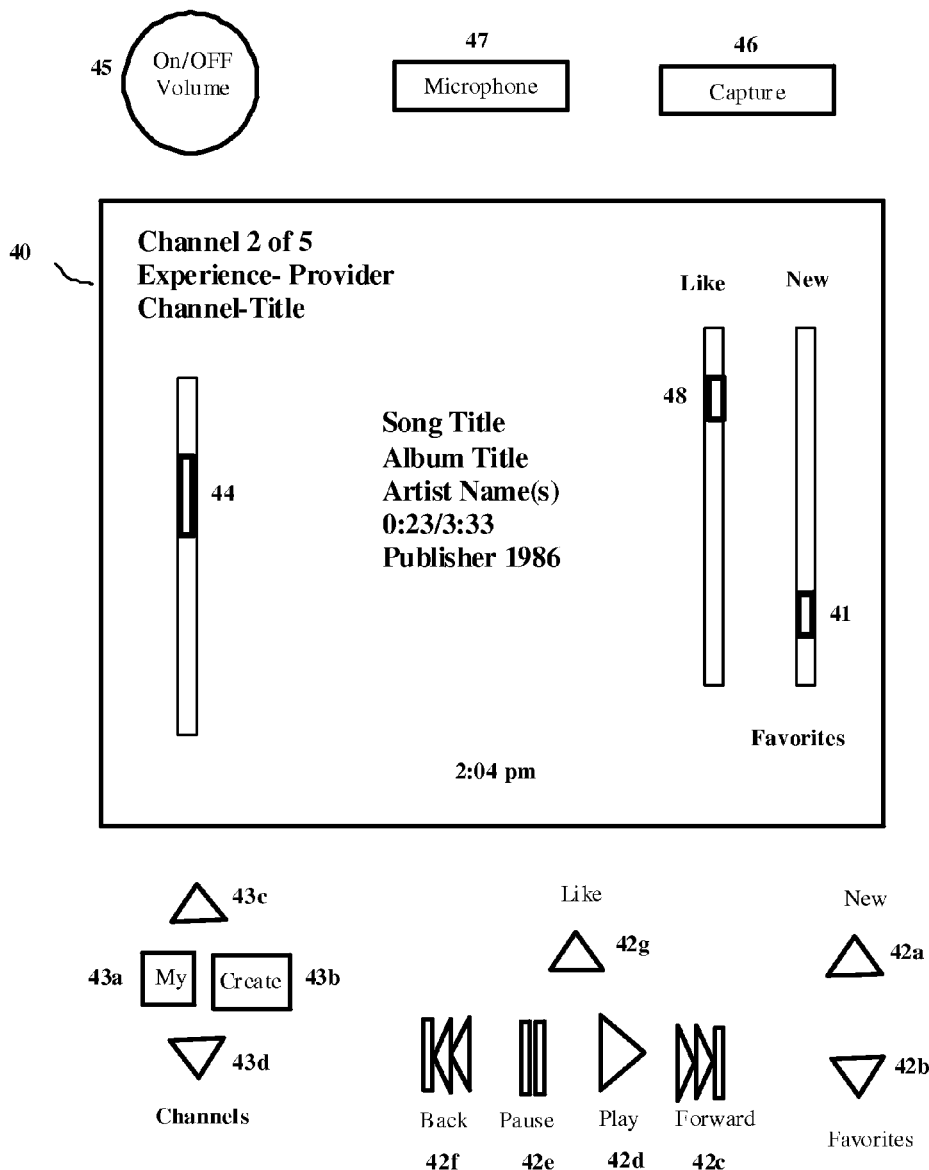
FIG. 4 illustrates an embodiment of a user interface for a user-device with manual controls.

FIG. 4 shows an example of a manual user interface for use where the user is within reach of the controls such as with a portable player, a remote control, or a user-device 22 located in an automobile within reach of the driver. Such controls may be implemented with electrical-mechanical controls such as push buttons, switches, sliders and knobs or with interactive touch screen control. In another embodiment, the controls of FIG. 4 may also be accomplished with voice commands.

The "Favorites-New" slider 41 is used to vary the percentage of new compositions that the user will hear. When the slider is at the "favorites" position (lowermost position) all compositions are selected among those most highly liked by the user. When the slider is positioned at the "new" position (uppermost position) the user is only exposed to new compositions he or she is not familiar with. The user may adjust the "Favorites-New" slider position by activating (pressing) the "New" 42*a* and "Favorites" 42*b* controls or in an alternative embodiment by dragging the slider indicator 41 upward or downward. As the slider 41 is positioned further away from "favorites" and closer to "new", the user will hear a greater percentage of new compositions and a lower percentage of favorites.

In another variation, highlights may be inserted at increasing frequency as the position of the "Favorites-New" slider is closer to the "new" position.

As shown in FIG. 4, the user-device 22 may include a display 40 to indicate information about the selected channel, composition being played (artist, title, etc), playtime, user-device status, etc. The user-device 22 may also include typical user controls such as "pause" 42*e*, "play" 42*d*, "forward" (or "skip") 42*c*, "back" 42*f*, and channel controls (43*a*, 43*b*, 43*c* and 43*d*).

In another optional enhancement, when a sequence of user commands indicate user difficulty or frustration, the user-device 22 may issue recommendations to the user on how to better utilize the user-device's capabilities. Such recommendations might be issued by voice synthesis or on the user-device display.

User Usage-Rights:

Rather than ownership of physical media, a user's collection may be defined by a set of tokens that define the usage-rights owned by one specific user or a specific set of users (e.g., a family). A usage-rights token may hold the usage-rights for a digital-work (e.g., a composition) for a specific individual user (or set of users) for a specific composition. Since the tokens are electronic, the usage-rights tokens may be easily shared or distributed to all user-devices that the specific user owns and/or uses. This allows the user's collection to be automatically available anywhere the user is located. In another embodiment, a usage-rights token may control a user's usage-rights for a group of compositions (e.g., all the compositions on an artist's album).

Over time, a user may purchase various usage-rights to particular compositions to form their collection.

The usage-rights may extend for any period of time (start/stop time) or for the user's lifetime or perhaps perpetual rights that may be transferred to another user. The usage-rights may be limited to a certain number of plays or may be for an unlimited number of plays. The usage-rights may be limited to certain format(s) or may be valid for all formats available. The usage-rights may also extend to future formats that may become available due to technology advancement. The usage-rights tokens may be upgradeable, when desired by the user, to expanded usage-rights. In some embodiments, the tokens may be recognizable by all user-devices. Explicit and/or implicit action(s) by the user may initiate the purchase or acquisition of tokens automatically on the user's behalf. Tokens may be automatically purchased or acquired on behalf of the user and added to a user's collection (of usage-rights and/or tokens).

Figure 12:
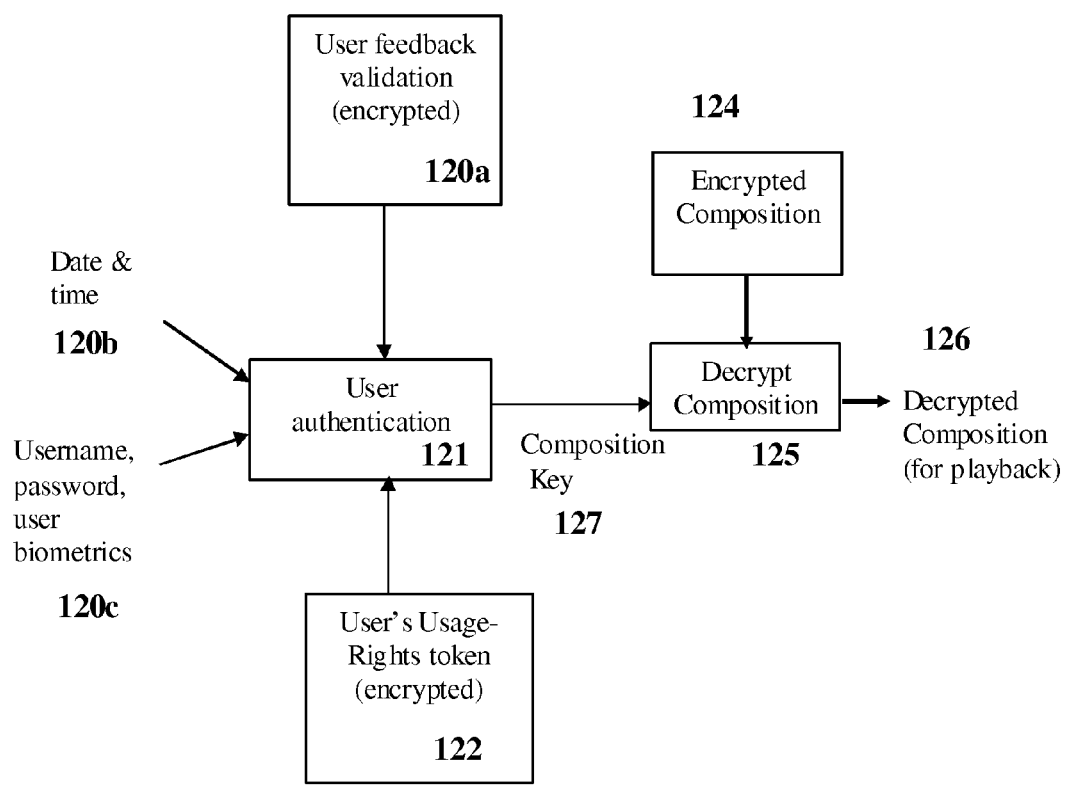
FIG. 12 is functional diagram of an embodiment of the user usage-rights management at a user-device.

The usage-rights token may be separate from the composition. As shown in FIG. 12, the compositions may be delivered and stored in an encrypted form 124 at the user-device 22. The usage-rights token 122 along with user ID/password/biometric information 120*c*, date/time 120*b* and "user feedback validation" information 120*a* may be used by the user-device 22 to decrypt the composition key. The composition key 127 may then be used by the user-device 22 to decrypt the composition 125 to generate the decrypted composition 126 for playback to the user. In some embodiments, reduced-capacity usage-rights tokens rather than the full usage-rights may be delivered to user-devices 22.

The "user feedback validation" 120*a* may be encrypted and represent a validation that the user has provided regular and consistent usage and history feedback to the experience-provider(s). If appropriate user feedback is not received from a user-device, the "user feedback validation" 120*a* may lockout usage of that user-device until such expected feedback is re-established. The "user feedback validation" 120*a* may also include (a secured) date and time information to protect against improper settings of the local clock by a user in-order to circumvent a token expiration date. The "feedback validation" 120*a* may also be used to inhibit user ID piracy or inhibit multiple users from using a single user's login-info (e.g., login-ID) by preventing an excessive number of user-devices from being simultaneously operated in widely different physical locations.

In one particular embodiment, users may easily switch between experience-providers 26; and a user's usage-rights tokens may be recognized and usable with all experience-providers 26 and user-devices. The usage-rights authorities 24 and/or composition-providers 23 are responsible for imposing a "standard for usage-rights tokens" 25 so the usage-rights may used by all experience-providers and user-devices. The usage-rights tokens may be issued by usage-rights authorities 24 or composition-providers 23 that are independent of but recognized by all experience-providers. In some embodiments, a composition and corresponding usage-rights provided to a user-device by one experience-provider; may be utilized at the user-device by any other (authorized) experience-provider.

The usage-rights authority 24 or composition-providers 23 may obtain an authorization from the owners of each composition, in-order to issue and/or sell usage-rights to users. A secure database of all issued tokens may be maintained in the usage-rights repository. The tokens may be distributed for use at any or all the user-devices and with all experience-providers. To eliminate user concerns about the loss of their tokens (representing their collection), a user's complete collection of tokens may be recovered by accessing the usage-rights repository token database. The user's collection of tokens may be robustly preserved against loss by distributing multiple copies at different physical locations across a worldwide network and periodically backed-up and archived on the network. In this manner, a user's collection may be robustly preserved no matter what happens to a user-devices or storage devices. In one embodiment, the user's tokens may be automatically preserved by a usage-rights authority, an experience-provider 26 and/or a storage provider without requiring user efforts.

The individual user's collection of compositions may be represented by a collection of usage-right tokens. In some embodiments, the management and handling of the tokens occurs automatically for the user-devices and does not require user action or knowledge.

In some embodiments, a copy of a token may be issued to users in a physical hardcopy form or in an electronic form. For example, a receipt representing a token ownership may be issued at the time of purchase. For privacy and security reasons, the format and contents of a usage-rights token issued to the owner may be different from tokens maintained on the network. In one embodiment, a token issued to an owner may be validate-able and convertible into an electronic token that may be used on the network. In some embodiments, issuing tokens to users may not be desirable, because the user becomes involved with the storage and management of such owner issued tokens and they are redundant to the tokens automatically maintained by the usage-rights repository 24.

In one embodiment, users may be allowed to exchange their previously purchased physical media such as a CD for usage-rights token(s). In one embodiment, previously used proprietary usage-rights (e.g., Apple iTunes) may be converted (perhaps for a conversion fee) into generalized usage-rights that may be usable with all vendors user-devices. The proprietary usage-rights may be then revoked or disabled in the proprietary user-device(s) via the revoke capabilities typically included within each vendor's proprietary DRM approach. The converted generalized usage-rights are then added to the usage-rights repository so they may be used for user-devices from all vendors and with all experience-providers.

The token ownership may also be optionally transferable to another user so a user may transfer a portion (or all) of their collection to another individual (e.g., upon the owner's death). In some embodiments, a nominal fee may be charged to transfer a token or a set of tokens to another ownership. To control piracy from extremely short-term exchanges, a limitation on the minimum time between such transfers may be imposed.

Usage-Rights Representations:

In one embodiment, the token may represent a receipt of ownership or allowable usage that may be understood and validated by any experience-provider 26.

The token may represent the user's ownership and/or usage-rights of any type of digital-work including music, music videos, multi-media, artwork, pictures, images, audio, sound, short films, movies, video clips, television programs, audio versions of books, a visual book, talks, speeches, voice content, lectures, software program, software plug-ins and any other type of digital-work.

In some embodiments, the token may be defined to be valid for all available (network interface-able) user-devices and their corresponding formats. This is a major convenience for user's since they no longer need to be concerned with the details of user-device formats, format translations and compatibility problems. The user is guaranteed that their token will be good for use with all their user-devices.

In other embodiments, the token may only be valid for a specified subset of user-devices and their corresponding formats (e.g., only Apple device formats). In other embodiments, tokens that are limited to only certain user-devices may be extensible so that they may be upgraded, possibly for a small fee, to be compatible with a wider set of user-devices or all user-devices.

Composition-Providers may decide to issue free tokens that allow a limited use of a composition (e.g., limited number of playbacks or use-time) in-order to interest a user in ultimately purchasing the composition. The offer of a free token may be based on indicators of customer reputation such as the user's (anonymous) credit rating, the quantity of prior user purchases and the user's payment history. Experience-providers, using projected estimates of a user's interest, may request such free tokens for specific compositions from a composition-provider 23 on a user's behalf.

For music, the token may represent usage-rights for only a specific version of a song by a specific artist (for example, the original studio recording).

In one embodiment, the token may be valid for all available digital formats (e.g., CD-format, MP3-format, etc), including different formats required by different user-devices and different quality formats. For example, the token may be valid for a cell-phone format that may have an inherently lower bandwidth/quality, a MP3 format and for an ultra quality user-device (such as Super Audio CD format) requiring greater storage and bandwidth (as well as all intermediate quality formats).

Tokens may also be used to represent usage-rights for composition highlights, for example a shorter version of the composition that contains especially compelling portions of a composition. There may be multiple highlight versions of different quality and format. A composition-provider 23 may issue for free to a certain user, a token that allows a certain number of plays of a composition highlight, in-order to generate user interest in eventually purchasing of usage-rights for the composition at some later time.

In the case of a book, the usage-rights may allow the book text and images to be by viewed on any user-device. For example, the data format for a mobile phone may be different from that for a PC or a tablet book-reading user-device. Their usage-right token may be valid for use on a mobile phone, a specialized book reader, a personal computer and any other user-devices. The experience-provider 26 may automatically deliver the appropriate format to whatever user-device 22 the user currently wants to view the book with. For a book, the free token may be limited to a certain amount of time or limited to only certain portions of the book in-order to allow a user to preview the book before deciding whether to purchase it.

Capturing and Utilizing User Control Actions:

The user's control actions (control history) from a user's various user-devices may be captured as user feedback about the compositions heard by the user. The user control history (feedback history) may then be utilized as input for the ranking of compositions by likeability and for the creation of a customized composition sequence (or entertainment program) for each individual user.

User feedback about each composition when it is playing may be obtained based on the user's usage of the "back" 42f and "forward" 42c ("skip") controls (or the equivalent voice controls). For example, a user's composition rating may be increased, whenever the user uses the "back" 42f control (or a series of "back" controls) to request that a recently played composition be repeated. For example, if the user uses the "back" control to immediately request that the currently playing composition be repeated, the user rating for that composition is significantly increased. Similarly, if the user uses a series of "back" controls to request that a recently played composition be replayed, then the user rating of the requested composition is significantly increased. If the user requests that a composition be played after searching for the composition in the user's favorites list, the user rating for that composition may be increased. If the user requests that a specific composition be played, the user rating for that composition may be increased.

Similarly, a user's composition rating is decreased, whenever the user uses the "forward" control 42c to request that the rest of a currently playing composition is to be skipped. The amount the user's composition rating is decreased may be dependent on how much of the composition has played before the user activates (presses) the "forward" control. For example, the rating may be decreased a smaller amount if the user skips forward near the end of a composition playback. The rating may be decreased a larger amount if the user skips "forward" near the beginning of the composition playback.

A user's composition rating may be changed by the "forward" or "back" controls, only when the composition has played for a long enough time for the user to recognize it (i.e., the playback time has exceeded a recognition threshold time). For example, if the user hits the "back" or "forward" control so quickly in a sequence that there is not enough time for the intermediate compositions to start playing and be heard by the user, then the ratings of the intermediately bypassed compositions may not be affected.

An additional method for indicating positive user feedback may be accomplished by a single action by the user, such as activating a single control (if manually controlled) or the speaking a single word (if voice controlled). For a user-device 22 (e.g., player) with manual controls such as in FIG. 4, a single control switch called "Like" 42g (or another suitable name) may be pressed by the user while a composition is playing in-order to indicate a desire that the composition be played more frequently. Optionally, different amounts of "like" may be indicated by the number of times the user activates (presses) the "Like" control 42g while the composition is playing. For example, if the user activates (presses) the "Like" control multiple times while a composition is playing, the user rating for that composition (and the frequency that the composition is played) would be significantly increased. Alternatively, the "Play" control 42d may be used (instead of the separate "Like" control) to indicate a user desire for the currently playing composition to be played more frequently. The user may activate the "Play" control one or more times to indicate a desire to hear the currently playing composition more frequently. The variation/distribution in the number of multiple "Like" pushes typical for a given user may be used to calibrate the appropriate adjustment of the user's composition rating versus number of "Like" pushes. Such calibrations may be adjusted over time so that the rating change associated with each different number of "Like" pushes, may adapt to each user over time.

Similarly, a compositions rating may be increased when a composition "highlight" segment is playing and the user hits the "Play" control 42d, in-order to immediately hear the full composition.

Although, a "dislike" control (or voice command) may be similarly utilized to indicate a negative feedback, in some embodiments, it may not be needed since use of the "forward" (skip) control while a composition is playing, is itself a sufficient indicator of "dislike".

Figure 7A:
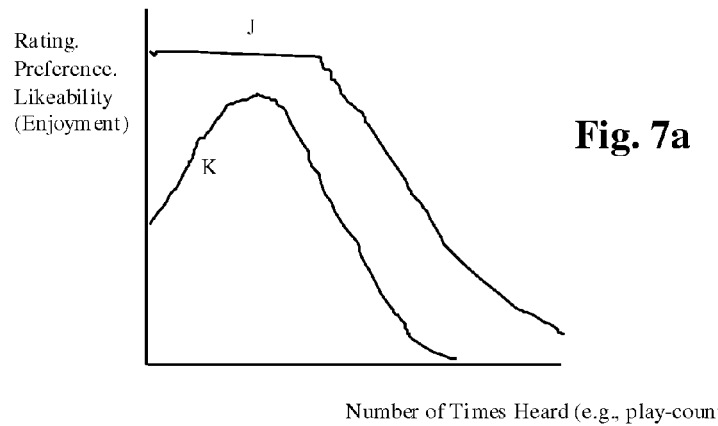
FIG. 7a illustrates typical relationships of "user likeability or enjoyment (rating/preference)" versus the "number of times heard (play-count)".

Even if the user does not provide any feedback on a composition during a playback, the user's rating may be automatically adjusted lower (or higher) based on an estimated change in likeability as a function of the number of times heard by the user. FIG. 7a show examples of likeability of a composition as a function of "number of times heard". The data illustrated by these curves may be generated based upon the aggregate feedback to the composition from other users considered similar to the user. Curve J in FIG. 7a, is an example of a high initial likeability for many playbacks followed by an eventual decline in likeability. Curve K in FIG. 7a, is an example of medium high initial likeability followed by an initial increase in likeability with times played, then followed by an eventual decline in likeability from the peak likeability. Although curves are shown for illustration purposes, the actual embodiment, may utilize look-up tables, databases, functions, equations, formulas; etc.

If the user has had a lot of recent forwards (skips) over prior favorite compositions, the favorites-new setting 41 may be automatically adjusted more towards the "new" mode so that the user is exposed to a larger number of new compositions. In this case, the favorites-new indicator (41 in FIG. 4) may be automatically adjusted to be closer to the "new" position.

By utilizing the normal user control actions as feedback on each currently playing composition, the users rating may automatically adapt to the user's evolving preferences and tastes over time without requiring special actions by the user to specifically rate compositions. A user's composition rating may be re-adjusted each time a composition is played or selected, so the rating adapts gradually and automatically. User feedback on each composition while it is playing occurs automatically based on the user's normal control actions.

In some embodiments, the user does not need to know the artist, title or anything else about the composition; only whether he or she likes what is currently playing. The user does not need to take special action to rate compositions on a rating scale. The user also does not need to be aware of a rating number system (e.g., 1 to 100) or adjusting the relative number rating of one composition versus another and to manually re-adjust such ratings as the user's tastes change over time. The user is not required to navigate a set of windows or menus to rate the composition. The user is not required to manually select from a catalog of compositions in-order to create composition playlist(s).

Figure 1:
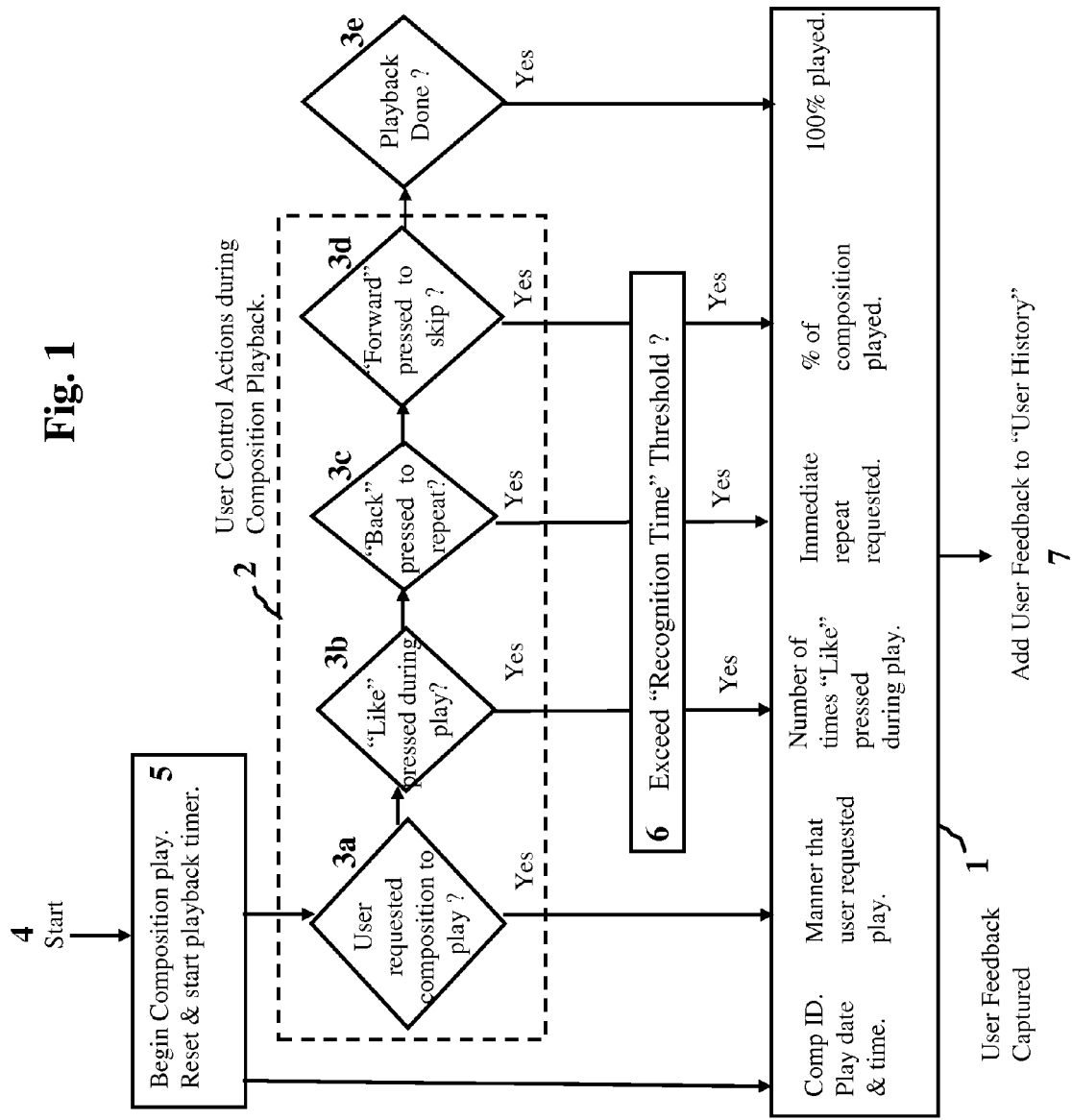
FIG. 1 illustrates the capture of user control actions representing user feedback about a currently playing composition.

FIG. 1 illustrates the capture of user control actions representing user feedback about a currently playing composition. "Start" 4 occurs with the "Begin composition Play" and the "Reset and start of the playback timer" 7. The playback timer records how long each composition has been playing. When the user control action (while the composition is playing) is a "Forward" pressed to skip" 3*d* (i.e., stop currently playing composition and go to next one), the timer may be used to determine the percentage of the composition that was played, which may be representative of the amount of user dislike for the composition (a negative feedback). Typically, the lower the percentage that a composition was played through, the greater the user dislike for the composition. When the user control action is a "Back" pressed to repeat" 3*c* (while the composition is playing or has just finished), an "Immediate repeat request" (a positive feedback) is generated for the composition. When the user control action is a "Like" pressed during play" 3*b*, the number of times the "Like" was pressed during composition playback (a positive feedback) is captured for the composition. If the user took specific action(s) to play the composition, such as "User requested composition to play" 3*a* (a positive feedback), the manner that the user requested play is captured. For example, the user may have searched his favorites to request that the specific composition be played. When a complete playback has occurred 3*e*, a "100% played" may be captured as user feedback.

In some embodiments, the user-device(s) may have a "play more often" or "play more frequently" button/control, instead/in-place of a "like" button/control. The user may then activate this button to indicate to the system that they want to experience the composition more frequently then the system has been providing the composition. The number of times the presses/activates the "play more often" or "play more frequently" button/control may allow the user to indicate the amount of additional frequency that the user desires. For example, pressing the button once may indicate a desire to experience the composition twice as often. While pressing the button twice might indicate a desire to experience the composition three (or four) times as often.

Note that the composition playback may be required to have played for at least a "Recognition Time" threshold 6 before certain user control actions are captured. The "Recognition Time" threshold represents the minimum amount of time that a composition must played in-order for a user to hear it and form an opinion. The threshold may be used to filter out user control actions that occur too soon after a composition starts playing, to be true feedback about the composition. When a composition playback begins, the composition ID, date and time may also be captured. Note that there are many "user control actions during composition playback" 2 that may generate "User Feedback" 1. The "User Feedback" 1 is then "added to the User History" 7.

User Actions:
User actions may be divided into three general types:
User directly inputs their preference for a composition.
Control actions that imply a user's preference for a composition.
Detecting implicit user re-actions to a composition.
Each of these types of user actions, are discussed in more detail in sections that follow.

User Directly Inputs their Preference for a Composition:
In this case, the user manually inputs their preference for a composition. For example, the user may press a "thumbs-up" or thumbs-down" button to directly input their preference for a composition. Or, the user may select/input a rating for a composition on a rating scale (e.g., 3.5 stars out of 5 stars) to manually indicate their current preference for a composition. The user input their preference while viewing an interactive display and/or experiencing the composition. A major problem is that the user must be bothered (take the time) to manually input their preference for each composition (100's or 1000's). In addition, the user must manually change or update their preferences as their tastes change over time. Manual inputting a preference may be a significant interruption and inconvenience for the user.

Examples of a User Directly Inputting the Preference for a Composition Include:
User presses a "thumbs-up" button.
User may presses "thumbs-down" button.
User activates a "like" button/indicator while composition is playing.
User activates/presses "dislike" (thumbs-down) button/control while composition is playing.
User presses a "play more frequently" button (one or more times) while a composition is playing.
User selects on an interactive display the number of stars (e.g., 3.5 stars out of 5 stars) to indicate their preference.
User inputs/selects on an interactive display their preference on a 0 to 100 point scale (input a value of 85).

Control Actions that Imply a User's Preference for a Composition:
Examples of actions by a user that may indicate a likeable preference for a composition include:
User searches to find composition and then requests composition to be played and does not forward-past during its playback.
User requests that composition be played and does not forward-past during its playback.
User requests/views visual information about composition while it is playing.
User activates "back" control to replay composition (within 0 to 3 seconds after composition finished playing).
User activates "back" control to replay composition (within 3 to 15 seconds after composition finished playing).
User activates "back" control to replay composition (more than 15 seconds after composition finished playing).
User activates "back" control multiple times (back multiple compositions) to replay composition
User activates "scan backward" control to re-play a portion of composition.
User requests that full composition be played while highlight (sample) of composition is playing or has recently finished.
User recommends the composition to another user(s).
User increases sound volume during playback.

User requests the "identification" of a composition originating external to the user's user-device.

User requests the "identification" and shows interest in a composition originating external to the user's user-device.

User requests the "identification" of a composition originating external to the user's user-device and adds to the user's collection of compositions.

User requests the "identification" of a composition originating external to the user's user-device and purchases composition.

Examples of actions by a user that may indicate a user's dislike for a composition include:

User "forwards past" (skips-past) composition within 2 seconds of experiencing composition.

User "forwards past" composition within 2 to 5 seconds of experiencing composition.

User "forwards past" composition within 5 to 15 seconds of experiencing composition.

User "forwards past" composition within 15 seconds to beginning 20% of experiencing composition.

User "forwards past" composition within the beginning 20% to 40% of experiencing composition.

User "forwards past" composition within the beginning 40% to 70% of experiencing composition.

User "forwards past" composition within the beginning 70% to 90% of experiencing composition.

User "forwards past" composition during last 10% of composition.

User "forwards past" (skips-past) composition within 2 seconds of experiencing highlight (sample) of composition.

User "forwards past" composition within 2 to 5 seconds of experiencing highlight (sample) of composition.

User "forwards past" composition within 5 to 15 seconds of experiencing highlight (sample) of composition.

User "forwards past" composition within 15 to 30 seconds of experiencing highlight (sample) of composition.

User "forwards past" composition after more than 30 of experiencing highlight (sample) of composition.

These control actions by a user may be used to determine/influence the rating/preference of a user for a composition and/or the "time between playbacks" of the composition.

Detecting Implicit User Re-Actions to a Composition:

Sensors may be located in the environment around a user or sensors may be worn by a user to implicitly detect a user's re-action(s) to a composition. For example, sensors may be embedded in user devices; worn by the user; or embedded in the user's clothing. The responses detected by these sensors may be analyzed and to determine how a user is responding to a composition. As with other user action(s), these implicit actions by a user may also be used to determine/influence the rating of a composition and/or the "time between playbacks" of the composition.

For example, a microphone (or other sound sensor) may be in the user's environment; in user-device(s); and/or worn by a user. For example, microphone 47 in a user-device (FIG. 4) may be used to capture the sound of a user singing along with a composition which may be a "like" indicator of user for that composition.

For example, a camera in the user environment; in a user-device(s); or worn by the user may monitor the user's facial expressions and/or the user's eye pupil dilation; in-order to determine the user's reaction to a composition (e.g., frowning; smiling; etc). Or the camera may detect dancing by a user.

Additionally, micro-miniature (e.g., semiconductor) accelerometers, gyroscopes; inertial measurement units; magnetic field sensors may be used to detect user orientation and user actions.

Additionally, sensors (pulse detectors; skin conductivity; electromyography; etc) may be body-worn and/or embedded in the clothing of the user to also detect changes to the inner body functionality and/or internal state of a user.

Some examples of implicit user actions (in response to a composition) include:

User "sings along" with more than 10% of composition.

User "sings along" with more than 20% of composition.

User "sings along" with more than 40% of composition.

User "sings along" with more than 60% of composition.

User "sings along" with more than 80% of composition.

Change in user's facial expression (e.g., smiling; looking happy; etc).

Change in user's facial expression (frowning; etc).

Dancing or other movement in response to the composition.

Change in user's pulse.

Change in user's heart (electrocardiography).

Change in user's breathing.

Change in user's breathing rate.

Change in user's galvanic skin response (skin conductivity).

Change in user's muscle activity (electromyography)

Change in user's muscular tensions.

Change in user's eye pupil dilation.

Identifying Other Users that May be "Similar" to a User:

There are many different methods of identifying other users that are "similar" to a user.

Other users that are "similar" to a user may be identified by using the aggregate "likeability" mapping analysis; to identify other users that like the same compositions as the user. Examples of aggregate likeability mapping and likeability indexes are shown in FIGS. 9 and 10, and are described elsewhere in this specification (and its parent specifications).

Alternatively, in some embodiments, other users that are demographically (age; sex; education; location; ethnicity; etc) "similar" to a user may be determined by using the prior history/feedback of the user and other users. As an example, other users that are similar to a user may be determined using the methods disclosed in U.S. Pat. No. 7,146,329 (Conkwright, et al), which is incorporated herein by reference.

Alternatively, in some embodiments, other users that have interests (e.g., like certain genre/categories; artists; etc) that are "similar" to a user may be determined by using the prior history/feedback of the user and other users. As an example, the interests of a user may be determined using the methods disclosed in U.S. Pat. No. 5,732,216 (Logan, et al), which is incorporated herein by reference.

Rating/Preference of a User for a Composition:

For each individual user, a unique rating/preference may be associated with each composition.

Depending on the embodiment (or situation/case), the user's rating or preference for a given composition: may be manually input/entered by the user, and/or may be automatically determined (e.g., calculated) for the user by monitoring user actions (i.e., control actions by the user or implicit re-actions of the user).

In some embodiments, it may be preferred that only automatically determined (e.g., calculated) ratings/preferences may be used, so that the user will not have to manually enter any ratings for compositions.

Depending on the embodiment, if a manually and a calculated rating/preference are both available, then one of these may be predefined to be automatically used to determine the time between playbacks of a given composition. In some embodiments, if the automatically determined (e.g., calculated) rating/preference is based upon a least a defined minimum number control action events, then that value for the rating/preference may be assumed to be valid and is used.

Determining a Rating/Preference of a User for a Composition, by Using User Actions:

Depending on the embodiment, the values of the rating/preference may be expressed in integers (e.g., 0 though 100) or as decimal numbers (e.g., a rating of 45.2). As known by those skilled in the art, there are many scales that may be used to reflect the magnitude of a rating/preference of a user including a number of stars (e.g., 0 stars to 5 stars) and fractions of stars (e.g., 2.25 stars). For purposes of illustrating concepts in this specification, a scale of 0 to 100 is arbitrarily used in portions of the discussions.

Figure 22:
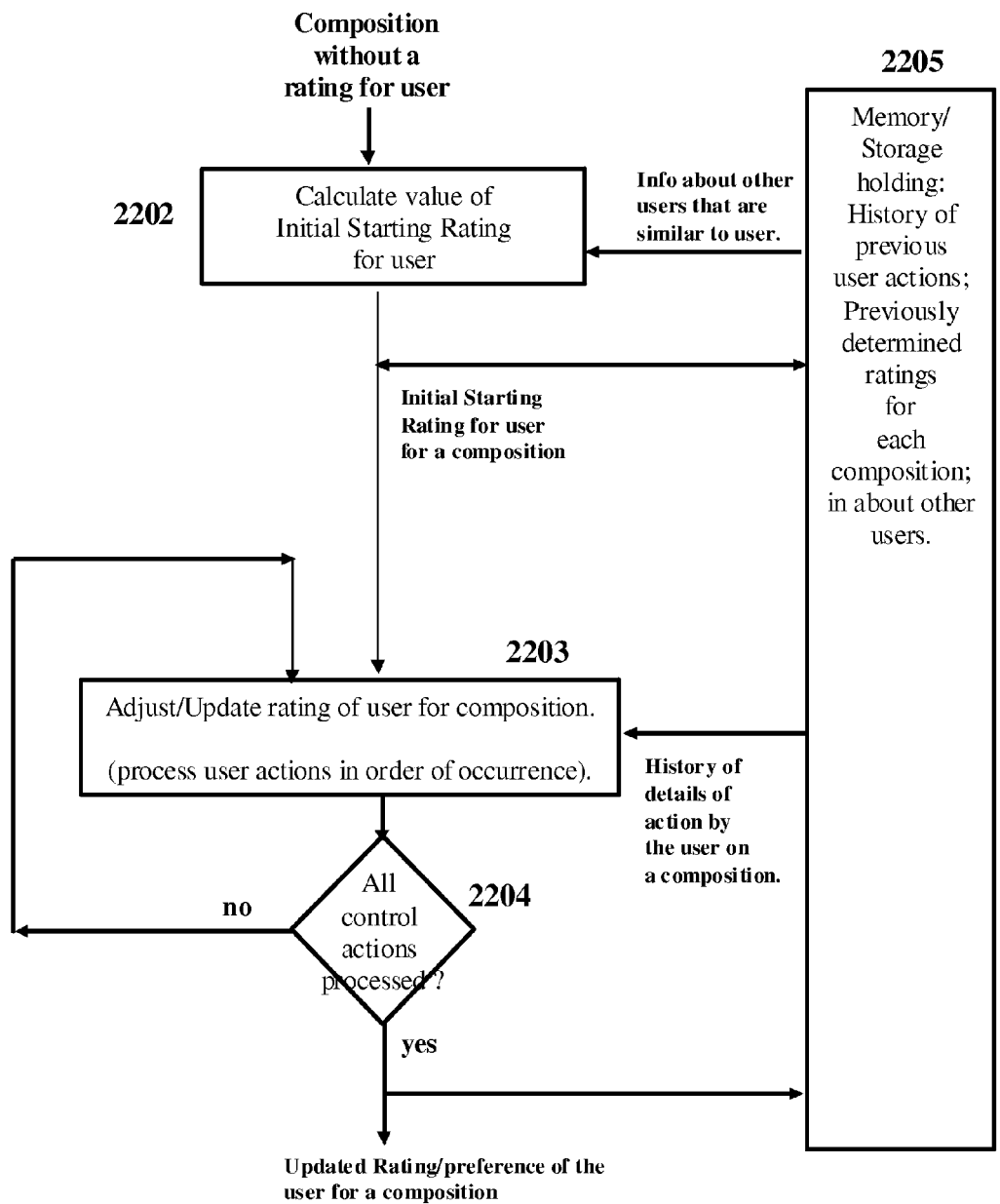
FIG. 22 shows a flow chart of one embodiment for automatically determining the magnitude of the rating of a user for a specific composition by using actions by the user.

FIG. 22 shows a flow chart of one embodiment for automatically determining the magnitude of the rating of a user for a specific composition by using actions by the user which are associated with the composition.

When there have not yet been any user control actions by a user for a composition, an initial starting value may be determined/used. In some embodiments, a (common) default value (e.g., 50 on 100 point scale) may be used for the starting value. In other embodiments, a unique initial starting value may be determine/used for each composition for a user. In some embodiments, the starting value may be determined by using the prior history/feedback of other users that are considered "similar" to a user. Methods of identifying "similar" users are described elsewhere in this specification.

FIG. 22 element 2202 shows an example of calculate/determine an "initial starting rating for the user" by using "info about other users" that were determined to be "similar" to the user". In some embodiments, the current value for the rating/preference for a specific composition for other users that are determined/considered to be "similar" to a user may be averaged to establish an initial starting value for the user who has not yet experienced the composition. Alternatively, the value for the rating/preference for a specific composition that other "similar" users had when they initially experienced the composition (e.g., when they had a play-count of around 5 to 10) may be averaged to establish an initial starting value for the user who has not yet experienced the composition. Alternatively, the peak value for the rating/preference for a specific composition for other "similar" users; may be averaged to establish an initial starting value for the user who has not yet experienced the composition. Alternatively, a defined fraction (e.g., 80%) of the peak value for the rating/preference for a specific composition for other "similar" users; may be averaged to establish an initial starting value for the user who has not yet experienced the composition. Many other similar/equivalent methods may be used by those skilled in the art to establish an initial starting rating for a user.

As shown in FIG. 22 element 2203, the rating of user for a composition may then be adjusted/updated; by processing all of the user actions that are associated with the specific composition; in the order of their occurrence (where the first occurrence in time may be processed first). The prior value for the rating/preference may be adjusted higher or lower based upon a positive or negative adjustment value, which depends on each "action by the user". FIGS. 24a to 24d show numerous examples of "adjustment to the rating of a user for a composition" versus different "actions by a user". The examples in FIG. 24a-24d assume that the rating/preference is a positive preference where the higher the rating value the more the user prefers the composition. The examples in FIG. 24a-24d also assume that the rating is scaled into a range of 0 (total dislike) to 100 (maximum like). As an example, as shown in FIG. 24a, if the "action by a user" was a "user request that composition be played" (an indication of user likeability for that composition) then the value of the rating/preference of that user for the composition would be increased by "+20".

If an update/adjustment were to result in a rating/preference value to go outside/beyond the defined range (for example, 0 to 100) the rating/preference may be clamped so it will not go outside the range being used. For example, if a rating/preference from prior actions was equal to 85 and a new control action by the user had an adjustment value of +20, then the updated rating/preference will be limited/clamped to 100 (and not 105) so it will remain inside the defined range.

As shown in FIG. 22, element 2204, when all the user actions for a specific composition have been processed; then the most recent rating for that specific composition may be established and saved into memory 2205.

Note that the prior values of the rating/preference of the user may be saved/stored in a memory 2205 (FIG. 22), so that an updated rating may be determined by using the stored rating value and only needing to process the newer actions by the user that are not yet reflected (occurred later in time) than in the stored rating. The ratings may be stored in user-device(s) and/or in other memory/storage that is interconnected and/or networked with the user-device(s).

In some embodiments, the rating for a composition is automatically updated, each time after a composition has finished being played or when the user has taken new actions that are associated with the composition. This allows the new updated rating value to be used in the process of determining when that composition will be scheduled to be played again (described elsewhere in this specification).

Note that if a complete history of user actions is saved/stored in memory, then the rating may be re-calculated from scratch using a new algorithm or relationships/parameters. This may allow user ratings to be improved simply by processing the old/prior stored data with the new algorithm(s).

In some embodiments, an approximate rating/preference of the user for a composition may be determined/estimated by only using a limited number ("z") of the last control actions by the user. For example, only the last 6 or 10 (e.g., "z"=6 or 10) control actions by the user that are associated with a particular composition, may be used to determine the rating for the user for that composition.

Note that a user may make erroneous or unintended user actions (e.g., control actions). In addition, the system may misinterpret the user's meaning/intent of any single control action. Hence, it may be desirable that the magnitude of the adjustment to a user rating for a composition will not be excessively adjusted by a single user action by itself. Therefore, in some embodiments, the amount of adjustment to a rating due to new user action, may also depend on the extent that the newer user action is consistent with previous user action(s) for that composition. That is if a newer control action is consistent with prior user action(s) then the user's preference may be more confirmed, and hence the magnitude of the adjustment may be increased/larger. Alternatively, if a newer control action is inconsistent with prior user action(s) then the user's preference may be less certain, and hence the magnitude of the adjustment may be reduced.

FIG. 25a shows an (optional) embodiment were the amount of adjustment to a rating is dependent on the number of consistent or inconsistent that previously occurred for a composition. Assume that "user action m" is a like indicator (e.g., indicates the user has a positive desire-for/likes the composition). As shown in FIG. 25a, greater the number of prior positive user actions then the more the rating is increased/positively adjusted when user action "m" (like indicator) occurs. For example, if there were 3 prior positive user actions, then the rating adjustment for a newer 'm" user action is +19, rather than +10 if there were no prior actions (e.g., the composition is "new" to the user). Alternatively, if the 4 prior control actions were negative then the adjustment is only +5 (rather than +10) when a user action "m" occurs.

FIG. 25b shows another (optional) embodiment, where the amount of adjustment for a user action depends on both the newer user action, as well as what prior user action(s) occurred.

Determining a Rating/Preference of a User, by Using a Play-Count:

In another different embodiment, a user's rating/preference for a composition may be determined by using relationship(s) that define a user's preference (e.g., likeability) as a function of: the number of times the user has heard the composition (e.g., play-count) or the cumulative amount of time the user has heard the composition. In some embodiments, a unique relationship may be used for each composition or group of similar compositions. The number of times a composition has been heard by the user may sometimes be referred to as "play-count" by those skilled in the art.

FIG. 7a show examples of the variation of the rating/preference (likeability) of a composition as a function of "number of times heard" (e.g., play-count). Curve J in FIG. 7a, shows an example of a high initial likeability for many playbacks, followed by an eventual decline in likeability, as the user becomes tired of the composition. Curve K in FIG. 7a, is an example of medium-high initial likeability followed by an initial increase in likeability (as the user gains an appreciation of the composition) with times played, then followed by an eventual decline in likeability from the peak likeability, as the user becomes tired of the composition. Although curves are shown for illustration purposes, the actual embodiment, may utilize look-up tables, databases, functions, equations, formulas; etc.

The relationship(s) illustrated by these curves may be generated based upon the aggregate feedback to the composition from other users considered similar to the user. That is, users that are similar may have a similar variation in preference versus the play-count.

Note that a high value for a "play-count" (e.g., number of times played) by itself may not necessarily indicate that a user currently has a high likeability for a composition. Alternatively, a song with a high "play-count" may still remain one of the user's current favorites and the user still wants to hear it frequently. For example, a song with a high "play-count", may have been heard so many times by the user that the user is tired of hearing that song and may not want to hear that song again. In this case, the user may have had a high preference for the composition in the past (resulting in a high play-count) but may now be tired of the composition (e.g., current preference is low).

Hence, simply assuming that the high value of the play-count means that a user has a current high preference for that composition is flawed. This flawed assumption regarding the play-count is one of the problems with the "Smart Playlists" systems of the Apple iTunes and U.S. Pat. No. 6,941,324 (by Plastina). Another weakness of the Apple iTunes implementation is that: the "play-count" may only increment after a composition has finished playing completely and hence the Apple iTunes "play-count" parameter may not distinguish between user action to play a specific song (a strong indicator of user interest) and a non-user initiated playback of the song by a user playback device (a limited indicator by itself).

Another possible weakness of using a "play-count" parameter is that not all user-devices may capture/collect/forward a play-count. This may be compensated for by user-device(s) that a user may carry/wear or are in the user's environment, which can capture/identify/note compositions that the user is exposed to as the user goes about their daily life.

In some embodiments, it may be useful to carefully distinguish between several different "play-count" parameters such as: a) the number of times initiated; b) the number of times played completely; c) the number of times played partially; d) the number of times initiated by user action; e) the number of times initiated without user action due to a shuffle/random-playback mode) 0 the number of times initiated as part of a playlist g) the number of times initiated by a customized (to the user) music selector. Another alternative/additional parameter to "play count" (with similar distinguishable cases) is the "cumulative playback time" that the specific composition has been heard by the user (i.e., =sum of all the playback times for the user for that composition).

Determining the "Time Between Playbacks" of a Composition, by Using a Rating/Preference:

In some embodiments, a target or desired time between playbacks of a composition may be based upon the magnitude/amount of the user's rating and/or preference for that composition. In some embodiments, the "time between playbacks" of a given composition may be determined by using relationships(s) to user's rating/preference. In some embodiments, a target/desired "time between playbacks" of a composition may be automatically determined by using a relationship(s) where the "time between playbacks" varies with the magnitude/amount of the user's rating/preference for that composition.

FIGS. 7c-7i show examples of relationships where the "time between playbacks" ("time between plays") may vary based upon (e.g., as a function of) the "rating or preference" of the user. As shown in some of the examples, in general, when the "user rating or preference" for a specific composition is higher, then a shorter "time between playbacks" of that composition may be used, so that the user may experience the composition more frequently.

In some embodiments, a desired "maximum time between playbacks of a composition may be based upon the amount of the user's rating/preference for that composition. For certain compositions that have a high user "rating or preference", the user may want to hear these compositions more frequently, and hence it may be desirable to attempt to keep the time between playbacks below/less than a "maximum time between plays".

Figure 7B:
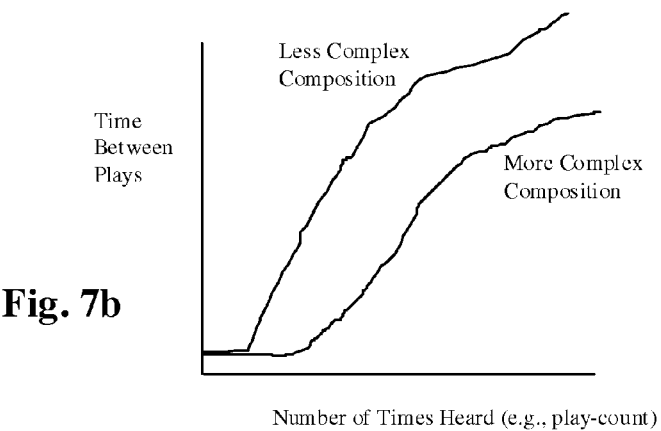
FIG. 7b illustrates typical relationships of "time between plays" versus the "number of times heard".
Figure 7C:
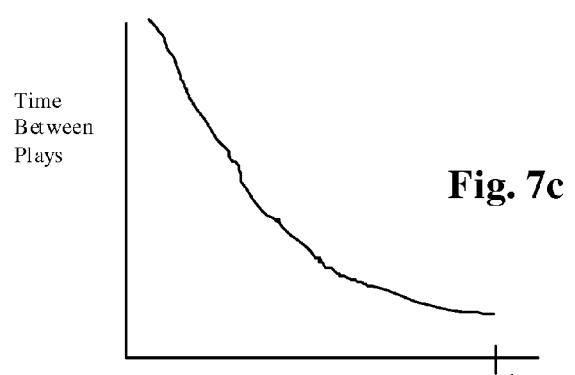
FIG. 7c illustrates a typical relationship of "time between plays" versus "(current enjoyment)/(peak enjoyment)".
Figure 7D:
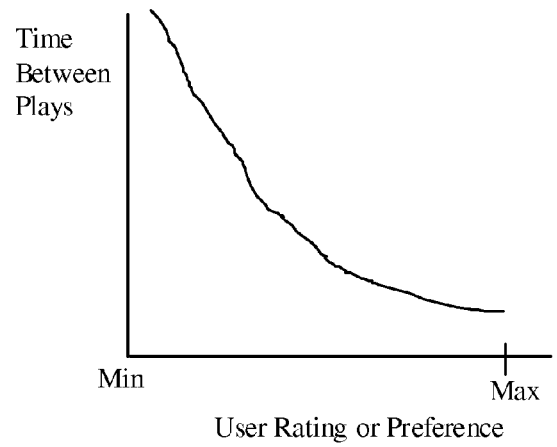
FIG. 7d illustrates a typical relationship of "time between plays" versus "user rating or preference".
Figure 7E:
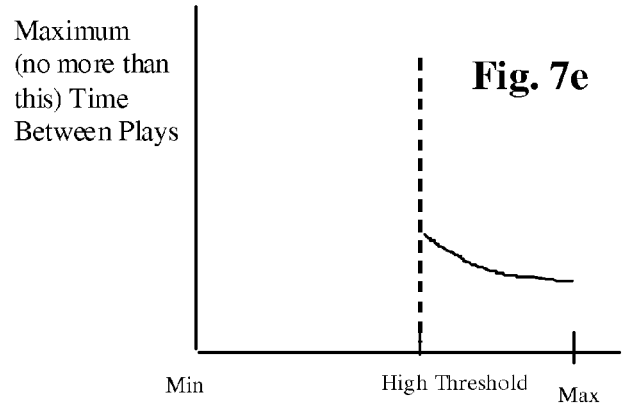
FIG. 7e illustrates a typical relationship of "maximum time between plays" versus "user rating or preference".

FIG. 7e illustrates an example of how the "maximum time between plays" may vary based upon (e.g., as a function of) the "rating or preference" of the user. As shown in the example of FIG. 7e, when the user "rating or preference" exceeds a "high threshold", then the "maximum time between plays" may be utilized by the system. In some embodiments, this feature may be used when the composition is "new" to the user and the users "rating or preference" for the composition is high. Note that if a user is (often) manually requesting a composition (or a "new" composition) to be played at shorter time between playbacks then: 1) the user rating or preference may be increased; and/or 2) the relationship [e.g., curve/function/etc] may be changed/adjusted to cause a reduction in the "maximum time between plays". By continually making adjustments based upon a user's control actions, the need for a user to manually take such action may be reduced over time.

Figure 7F:
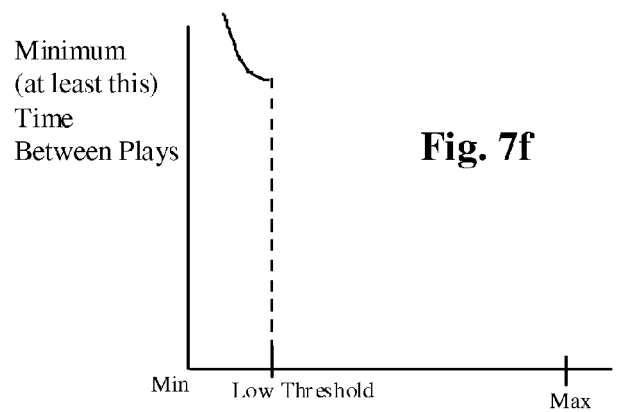
FIG. 7f illustrates a typical relationship of "minimum (at least this) time between plays" versus "user rating or preference".
Figure 7G:
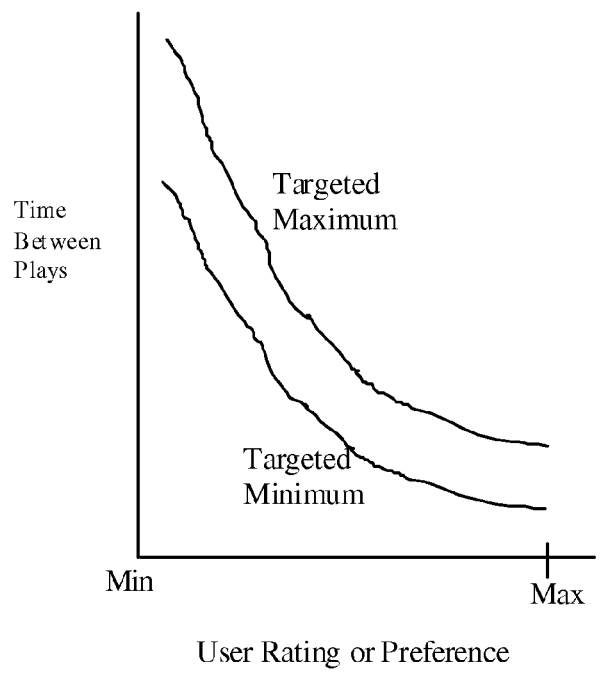
FIG. 7g illustrates a typical relationship of targeted minimum & maximum "time between plays" versus "user rating or preference".
Figure 7H:
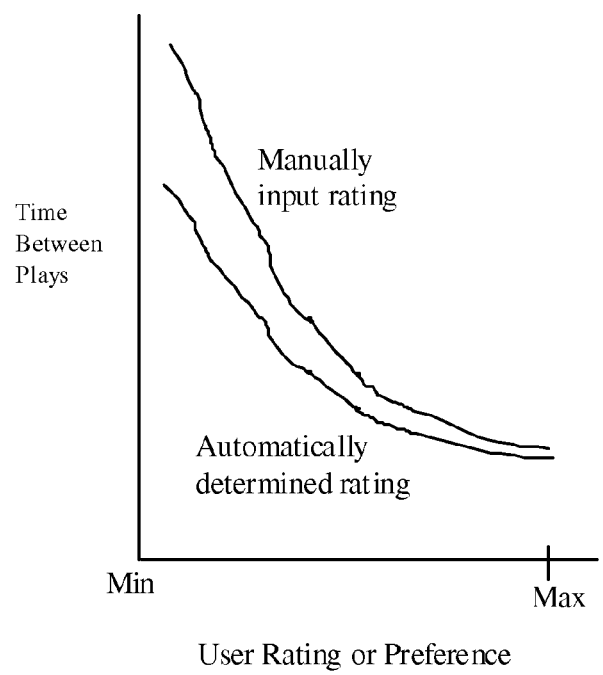
FIG. 7h illustrates a typical relationship of "time between plays" versus "user rating or preference" for manually input and automatically determined ratings.

In some embodiments, a desired "minimum (at least this) time between plays" of a composition may be based upon the amount of the user's rating and/or preference for that composition. For certain compositions that have a low user "rating or preference", the user may want to hear these compositions much less frequently, and hence it may be desirable to attempt to keep the time between playbacks greater than a "minimum (at least this) time between plays". As shown in the example of FIG. 7f, when the user "rating or preference" is below a "low threshold", then the "minimum (at least this) time between plays" may be utilized by the system. Note that if a user is (often) forwarding past a composition before it has completed playback then: 1) the user rating or preference may be decreased; and/or 2) the relationship [e.g., curve/function/ etc] may be changed/adjusted to cause an increase in the "minimum (at least this) time between plays".

In some embodiments, the "time between plays" may be determined or influenced by the ratio of "current likeability divided by peak likeability". As the example in FIG. 7c shows, the "time between plays" may increase as the "current likeability" decreases relative to "peak likeability".

It may also be useful to define different types of "time between plays". First, there may be a "no more than X time between plays" for new compositions that the user has indicated significant positive feedback and hence wishes to hear frequently. Second, there may be an "at least X time or greater between plays" for older favorites that the user still likes somewhat but no longer wants to hear as often.

Note that embodiments may be implemented using positive and/or negative measures of the user's rating or preference. For example, many of the examples in this specification are illustrated using a positive rating or preference, where the greater the user's likeability or want of a composition, the greater the magnitude of the user's rating or preference. Alternatively, those skilled-in-the-art, will realize that equivalent results may also be obtained by defining negative type parameters, which indicate the user's amount/magnitude of dislike/ desire-to-avoid the composition. For embodiments using these negative measures, the higher the negative-type rating, the more the user dislikes or desires to avoid the composition.

In some embodiments, a re-schedule queue 65 may be used to hold an ordering of compositions ordered by their next playback time.

Figure 20:
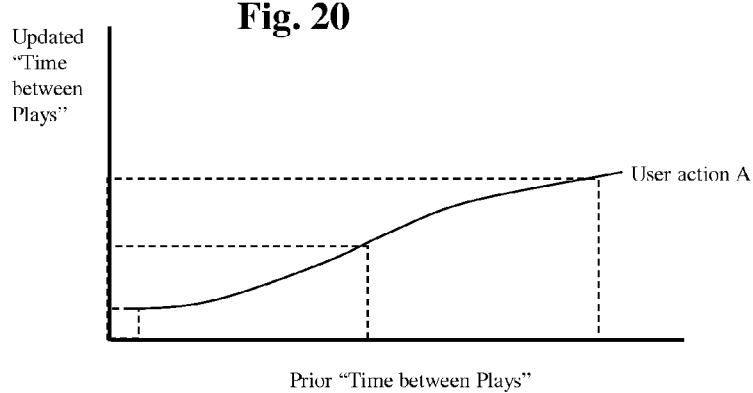
FIG. 20 shows examples of relationships of "updated time between playbacks" versus the "prior time between plays" and "user action".
Figure 21:
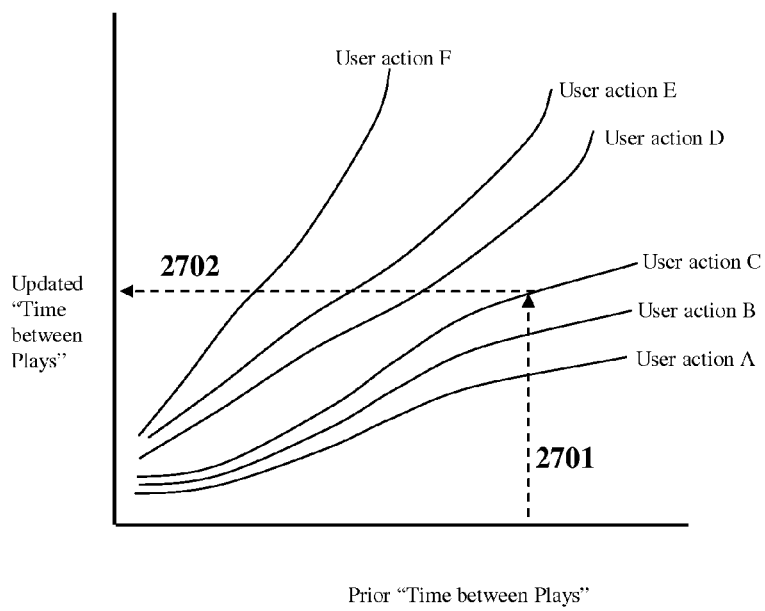
FIG. 21 shows examples of relationships of "updated time between playbacks" versus the "prior time between plays" and "user action".

Updating the "Time Between Playbacks" of a Composition, Directly from User Actions:

In other alternative embodiments, the updated "time between playbacks" of a specific composition, may be updated/determined by using a relationship to adjust the prior "time between playbacks" based on a new action(s) by the user [e.g., new user action(s)]. FIGS. 20, 21, and 11 show examples of these relationships.

FIG. 21, shows a family of relationships (e.g., curves) that may be defined for different user action(s). Each relationship (e.g., curve) may be unique for each user action or unique for each different type/category of user action. For example in FIG. 21, if a user-action-C occurs for a composition, then the prior "time between plays" value (2701) may be updated to a new value (2702) by using the relationship (e.g., curve) for user-action-C. If a different user-action had occurred then a different relationship (e.g., curve) may be used.

The relationship shown in FIG. 20 shows an example of a relationship where user-action-A indicates a positive/likeable user interest in the specific composition. Note that for this relationship that the each of the prior "times between plays" will be updated to a shorter time between plays, so that the user will then experience this composition more frequently.

The user-action-F curve in FIG. 21 is an example of a relationship where user-action-F indicates a negative/dis-like user interest in the specific composition. Note that for this relationship that the each of the prior "times between plays" will be updated to a longer time between plays, so that the user will then experience this composition less frequently.

FIG. 11 shows an alternative example where the relationship may be defined by using a look-up table. In this example, user-action-j indicates a positive/likeable user interest in the specific composition. Note that for this relationship that the each of the prior "times between plays" will be updated to a shorter time between plays, so that the user will then experience this composition more frequently.

FIGS. 26a and 26b show another alternative embodiment for updating the value for time between playbacks of a specific composition, following the occurrence of a user-action associated with that specific composition. As shown in the example in FIG. 26b, if the user-action is to "forwards past (skips-past) composition within 2 seconds of experiencing a composition" (an indicator of dis-like), the prior value for the "time between playbacks" for that composition is increased by 10×, so the user will experience that composition less frequently.

Note that a user may make erroneous/accidental or unintended user actions (e.g., control actions). In addition, the system may misinterpret the user's meaning/intent of any single control action. Hence, it may be desirable that the magnitude of the adjustment to the "time between playbacks" for a composition will not be excessively adjusted by a single user action by itself. Therefore, in some embodiments, the amount of adjustment to the "time between playbacks" due to new user action, may also depend on the extent that the newer user action is consistent with previous user action(s) for that composition. That is if a newer control action is consistent with prior user action(s) then the user's intent may be more confirmed, and hence the magnitude of the adjustment may be increased/larger. Alternatively, if a newer control action is inconsistent with prior user action(s) then the user's intent may be less certain, and hence the magnitude of the adjustment may be reduced.

FIG. 26c shows an example of an (optional) embodiment were the amount of adjustment to the "time between playbacks" may be dependent on the number of consistent or inconsistent that previously occurred for a composition. Assume that "user action t" is a dislike indicator (e.g., indicates the user dislikes the composition). As shown in FIG. 26c, the greater the number of prior "dislike" user actions, the more the "time between playbacks" is increased by a newer dislike user action. Alternatively, a greater the number of prior "like" user actions, the less the "time between playbacks" is increased by a newer "dislike" user action.

FIG. 26d shows an example of another (optional) embodiment, where the amount of adjustment for a user action may depend on both the newer user action, as well as what specific prior user action(s) occurred.

Determining "Time Between Playbacks" of a Composition, by Using a "Play-Count":

A target or desired "time between playbacks" of a composition may also be determined as a relationship/function of the "number of times heard". In some embodiments, the time between playbacks of a given composition may be determined by using relationships(s) to user's rating/preference and/or the number of times the composition was heard by the user.

Figure 7I:
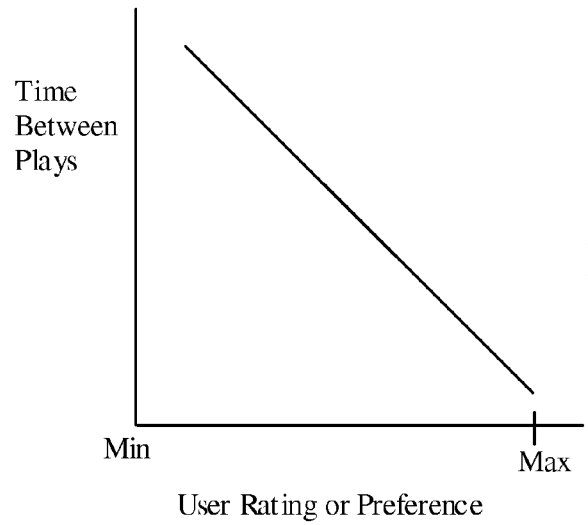
FIG. 7i illustrates an example of a linear relationship of "time between plays" versus "user rating or preference".
Figure 7J:
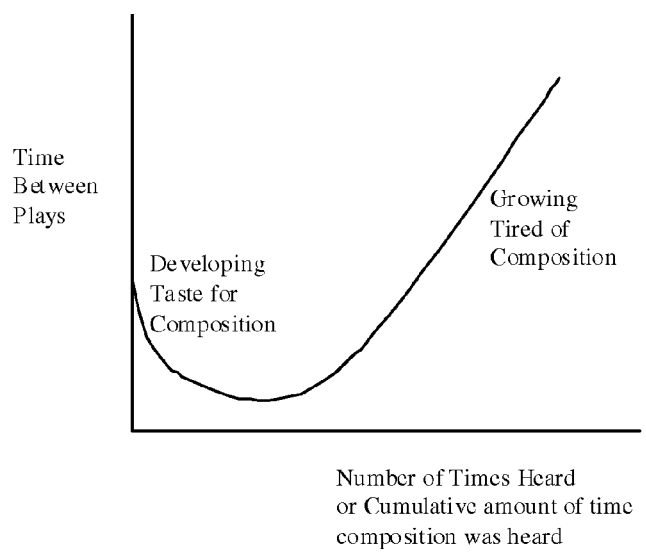
FIG. 7j illustrates an example of a non-linear relationship of "time between plays" versus versus the "number of times heard (play-count)".

FIGS. 7b and 7j show examples of how the "time between playbacks" ("time between plays") may be varied based upon (e.g., as a function of) the number of times a composition has been heard by the user. The number of times a composition has been heard by the user may sometimes be referred to as "play-count" by those skilled in the art.

FIG. 7b shows example curves of "time between plays" versus "number of times heard" and the psychological "complexity of the composition". When a composition is new to the user (and the user has indicated positive feedback) the time between plays is shorter. Eventually, as user likeability decreases with familiarity, the time between plays is increased. The user may tire of compositions with a lower psychological "complexity" more quickly than those with a greater psychological "complexity". The likeability functions may be constructed based on aggregate user feedback of users that are considered similar to the user.

In some embodiments, it may be useful to carefully distinguish between several different "play-count" parameters such as: a) the number of times initiated; b) the number of times played completely; c) the number of times played partially; d) the number of times initiated by user action; e) the number of times initiated without user action due to a shuffle/random-playback mode) 0 the number of times initiated as part of a playlist g) the number of times initiated by a customized (to the user) music selector. Another alternative/additional parameter to "play count" (with similar distinguishable cases) is the "cumulative playback time" that the specific composition has been heard by the user (i.e., =sum of all the playback times for the user for that composition). Note that, the relationship(s)/function(s) may differ for these different definitions of play-count.

Using a Combination of Methods to Determine a "Time Between Playbacks":

In some embodiments, a combination of the above methods may be utilized to determining a "time between playbacks" of a composition.

For example, the magnitude of a rating determined by using user actions (method above), may be further adjusted by an additional amount that is determined by utilizing a relationship (method above) that defines the "time between playbacks" versus "play-count" (e.g., number of times heard or amount heard). In this way, the magnitude of a rating of a composition for a user may be adjusted as additional playbacks occur, even if no user actions have occurred that are associated with that composition.

In some embodiments, the method which is estimated to be more accurate or which is based on more user actions or more data; may be chosen for use. In other embodiments, a combination of the multiple methods may be averaged or mathematically combined (e.g., values from the 2 closest methods may be averaged) to determine a "time between playbacks".

Figure 23:
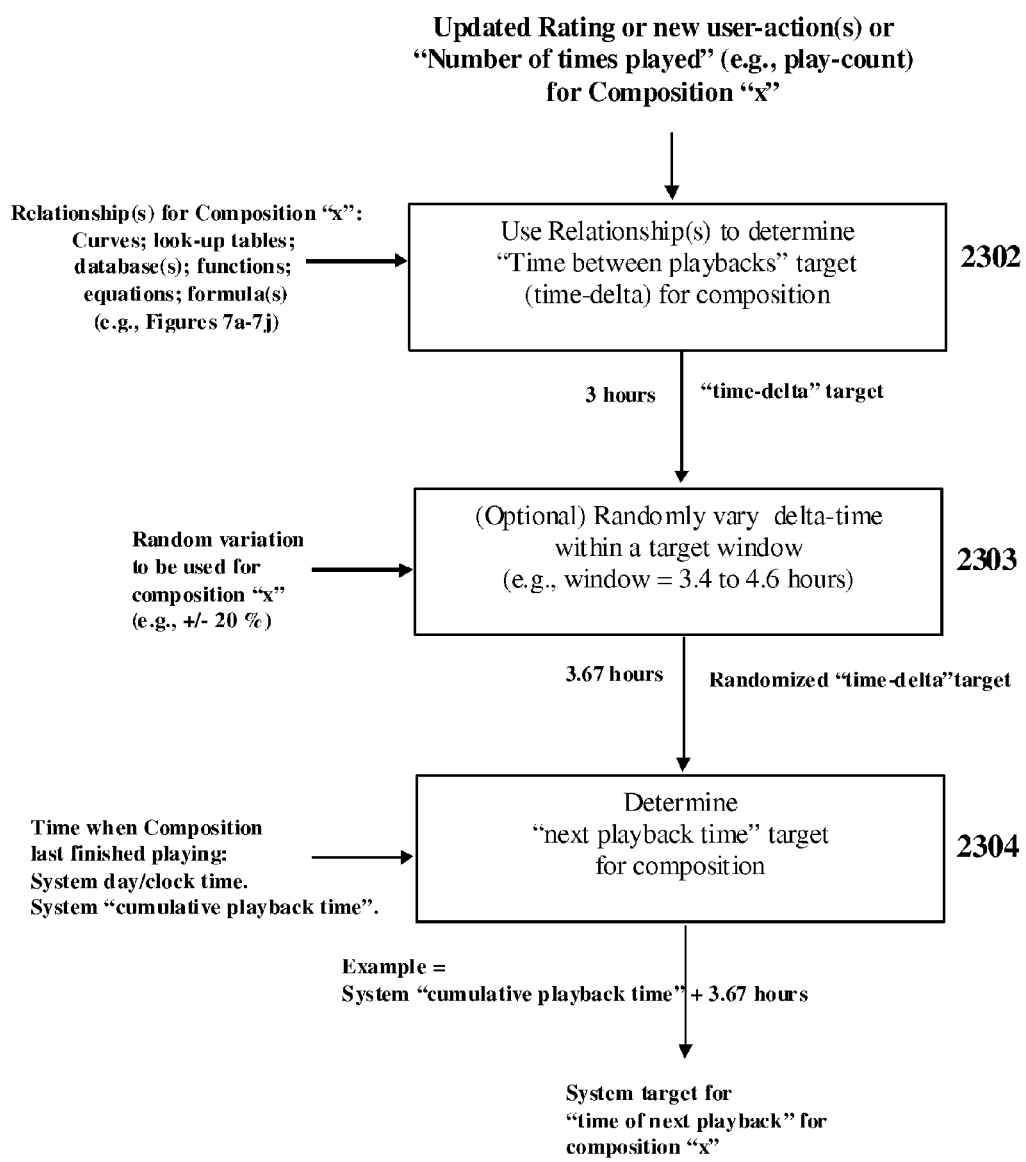
FIG. 23 shows one embodiment of a flow chart for determining when a particular composition will be played for the user again
Figure 27A:
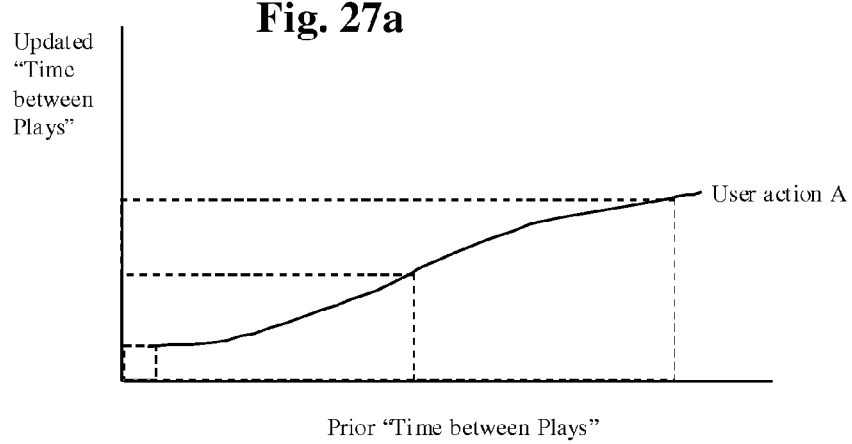
FIG. 27a-27b shows examples of relationships of "updated time between playbacks" versus the "prior time between plays" and "user action".
Figure 27B:
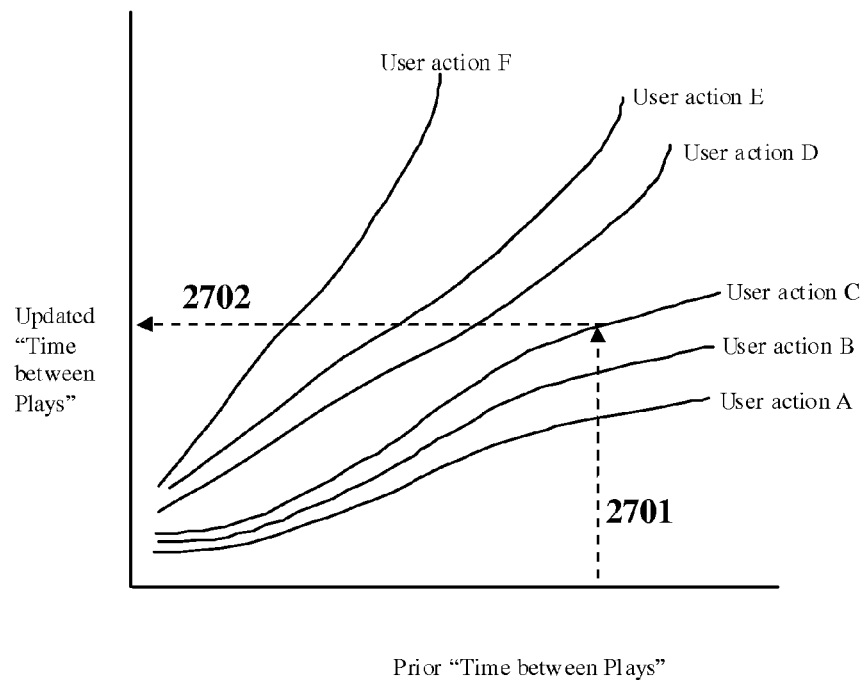

Determining when a Composition Will be Played Again:

FIG. 23 shows one embodiment of a flow chart for determining when a particular composition will be played for the user again, by using an updated value of the user's rating/preference; or new user action(s); or the updated "play-count".

Note that in general several different definitions of time may be used and there may several different definitions of the "time between playbacks" ("time between plays") of a composition (e.g., when that composition is played again for the user). Depending on the embodiment/situation, the time between plays may be the "elapsed calendar time since last playback" or the "playback-time of all other compositions since the composition was played".

In some embodiments, the "time between plays" may refer to a "delta playback time" (during which other compositions are played) until the composition will be played again. The value for the "delta playback time" may be determined by using a relationship(s) [such as FIGS. 7a-7j; FIGS. 11, 20 21 24-26; or any of their mathematical equivalents]. An example is shown in FIG. 23 at element 2302. For example, for a composition for which the user has a fairly high positive rating/preference (e.g., fairly high likeability), the composition may be replayed again for the user after 3 hours (e.g., ="delta playback time") of other compositions have been played for the user. In this case, a running "cumulative playback time" (sum of the playback time of all compositions) may be maintained by the system. A target "next playback time" for a composition may be calculated by: adding the "delta playback time" value to the "cumulative playback time" value at the time the composition finished its last playback. An example using the "cumulative playback time" is shown in FIG. 23, element 2304.

In some other embodiments, the "time between plays" may be determined by the "calendar time" or "clock time" that has elapsed since the last time the specific composition was played. For example, for a composition for which the user has a fairly low positive rating/preference (e.g., fairly low likeability), the composition may be replayed again for the user after 6 months (e.g., ="delta real-time") of real-time calendar/clock time has elapsed. In this case, a "real-time" may be maintained by the system (which advances 1 second for each 1 second of actual real-time). A target "next playback in real-time" for a composition may be calculated by: adding the "delta real-time" value to the "real-time" value at the time the composition finished its last playback.

Note that in some embodiments, a combination of these two methods of establishing a target time between playbacks of a composition may be used. For example, for higher rated/preferred compositions the "time between plays" may utilize a "delta playback time" (e.g., based on the amount of time that other compositions have played). While, for lower rated/preferred compositions the "time between plays" may utilize a "calendar time" or "clock time" (e.g., based on the amount of real-time that has elapsed since the last time the specific composition was played). A break-point threshold value of preference/rating may be established that determines which of these two relationships to use for each value of the user rating/preference.

Note that the time between playbacks (plays) of each given composition, may be used as approximate target values. The system will automatically attempt to schedule the playback of a composition. But the target time will not be exactly achievable for various reasons. Example of needed adjustments from the targeted values include: the user may not be using a user-device (e.g., off) at a certain time; or the user may have manually requested that some composition be played at that time; or multiple compositions may be targeting the same/overlapping time periods. The system scheduler will need to adjust the scheduled playback times when these cases occur. The resolution of these scheduling conflicts may introduce a variation in playback by the system that may be useful in reducing system repeatability/predictability that might become noticeable to some users.

In an optional embodiment, the target playback time may be additionally varied around the target playback time, in-order to further reduce excessive repeatability in the system. In one embodiment, the target playback time is randomly varied within a target window or a defined amount about the target playback time. This may be useful for compositions have a high user rating/preference and there is a shorter time between playbacks; where a repeating/similar time between playbacks of a particular composition may be more noticeable to the user. In one embodiment, the target time may be randomly varied by a defined amount about the target or randomly varied within a window about the target. In one embodiment, a plus or minus percent-variation (e.g., 20%) may be used around the target. This variation may be defined by parameter(s) whose value may differ for an individual composition, group of compositions, or context. For example, instead of using the exact "delta playback time" of 3 hours as defined by the relationship (e.g., curve/function); a value in the target window/range of 2.4 hours (−20%) and 3.6 hours (+20%) is randomly chosen to establish the next target. An example of varying the "delta playback time" around a target value is shown in FIG. 23 at element 2303.

Alternative Embodiments of the Relationship(s)

Note that these relationships may be defined uniquely for each composition; may be common for a set of compositions; and/or may be common for all compositions of a user. For example, a unique relationship (e.g., such as FIGS. 7a-7j, 11, 20, 21, 24-26) may be uniquely defined/used for one composition. Alternatively, a common relationship may be used for all compositions that are in a certain group of compositions. Or, a common relationship may be used for all compositions. Or a combination of these.

Depending on the embodiment, the relationship(s) may be non-linear (as shown in FIG. 7d), or linear (as shown in FIG. 7i). Depending on the embodiment, the relationship(s) may be monotonic (e.g., FIG. 7d) or non-monotonic (as shown in FIG. 7j). Depending on the embodiment, the relationship(s) may be continuous or non-continuous.

In some embodiments, a unique relationship (e.g., curve or function) may be optimized and/or used for each composition. In some embodiments, one relationship (e.g., curve or function) may be shared and/or used for a plurality of different compositions. For example, a plurality of compositions of a similar complexity or a plurality of compositions of a common type/genre; may use the same relationship (e.g., curve or function). In some embodiments, the relationships (e.g., curves or functions) may be optimized/customized for each composition used by each individual user. Or various combinations of these may be used.

Note that these relationships may be defined uniquely for each composition; may be common for a set of compositions; and/or may be common for all compositions of a user. For example, a unique relationship (e.g., such as FIGS. 7a-7j) may be used for one composition. Alternatively, a common relationship may be used for all compositions that are in a certain group of compositions. Or, a common relationship may be used for all compositions. Or a combination of these.

Although curves are showed in FIGS. 7a-7j for ease of illustration, actual implementations may utilize any equivalent mathematical method including: lookup tables; linear or non-linear equations; polynomials; digital differential analyzers (DDA); database(s); mathematical functions [e.g., $f(x)=\ldots$]; formula(s) or any other equivalent mathematical relationships known by those skilled in the art.

For example, the values of a curve, may be defined by a table/database with separate columns for X-axis (e.g., number of times heard) and Y-axis (e.g., time between playbacks) discrete values. Using the X-value (e.g., number of times heard), the corresponding Y-value (e.g., time between playbacks) may be determined by looking-up its corresponding value in the table. Non-discrete cases [e.g., magnitude of a user's rating expressed as a real number; say 0.572] may be handled by using the closest value available in the table or by interpolating between the closest available values in the table.

In some embodiments, the values, coefficients, and/or parameters used in these mathematical relationship(s) may be determined by fitting to the data, in-order to define a relationship within an acceptable error. For example, the order and the constants of an nth-order polynomial may be selected to fit a set of target data within a desired margin of error. Alternatively, the equivalent of a polynomial equation may be accomplished by using a digital differential analyzer (DDA).

Depending on the embodiment, a unique relationship (e.g., curve or function) may be optimized and/or used for each composition. In other embodiments, a relationship (e.g., curve or function) may be shared and/or used for a plurality of different compositions. Depending on the embodiment, the relationships (e.g., curves or functions) may also be optimized/customized for each individual user and/or each composition for each individual user. The values, coefficients, and/or parameters of relationships may be determined by fitting to the data in-order to define a relationship within an acceptable error.

Using Aggregate Data to from Many Users to Determine the Relationship(s)/Parameters:

The relationships (e.g., curves) that are used for a specific composition; may be automatically determined by using the aggregate feedback/user-actions to the specific composition from other users that are considered similar to the user.

For example, FIG. 7a (or its mathematical equivalents) may be automatically generated by using the aggregate ratings of many other users ("similar" to the user) as those ratings varied with play-count. As a simple example, the rating values of the other similar users may be averaged at each incremental value of the play-count, to determine the relationships shown in FIG. 7a.

The system performance/user-experience may be improved over time. One measure of performance/user-experience is the number of actions that user(s) took, because the system is not automatically satisfying/adopted-to the user. Another measure of performance/user-experience; is the number of user-actions that are dislike indicators, which indicate the number of compositions automatically provided to the user which the user did not like/enjoy. One objective is to minimize the need for the user to take action(s) to enjoy the adoptive personalized entertainment.

In general, any/all of the relationships/values/parameters may be automatically improved over time, by testing new relationships/values/parameters with a sample of users and then observing the whether the actual performance/user-experience is improved, relative to the old relationships/values/parameters.

In some embodiments, experts may determine the new relationships/values/parameters to be tested with a subset of users by manually analyzing the aggregate experience/feedback from multiple users. In other embodiments, the system may automatically determine the new relationships/values/parameters to be tested with a subset of users; by automatically analyzing the aggregate experience/feedback from multiple users.

With continuing test sampling to a subset of users and comparing the resulting performance/user-experience against the results with the previously used relationships/values/parameters, the adaption/customization of the system may be continually improved over time.

Figure 6:
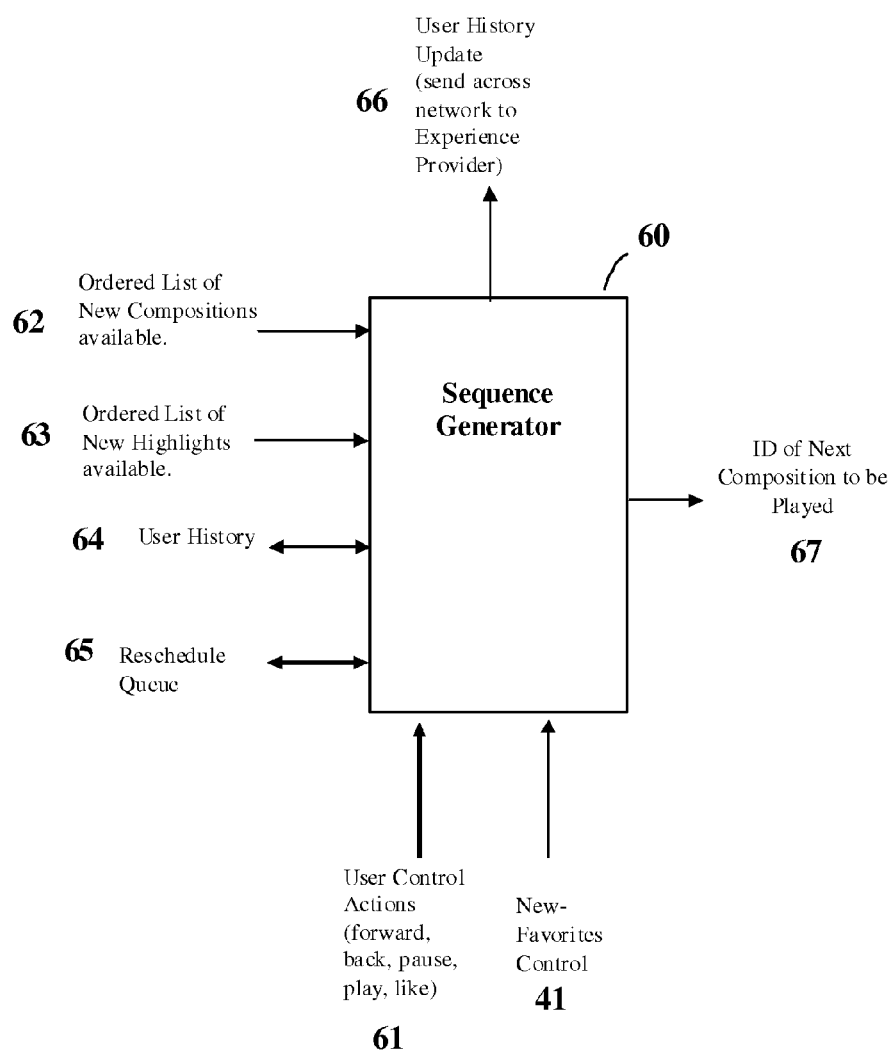
FIG. 6 illustrates the functional flow of a Real-time Sequence Generator.

Composition Sequence Generation:

FIG. 6 is a functional diagram for one embodiment of a real-time sequence generator 60. The sequence generator may operate in real-time, in-order to immediately respond to user control actions 61 such as "forward", "back", "pause", "play". The sequence generator is able to automatically transition between immediately responding to user control actions and automatically generating a customized sequence of compositions (entertainment program) for the user.

The sequence generator may automatically enter the customized program mode whenever all prior user control requests have been completed and the user is not currently providing control actions to affect the composition sequence. For example, if the user manually requests that certain song(s) be played, then those songs are played and after the user's manual requests have been completed; the sequence generator may automatically begin playing an automatically generated sequence of compositions that is customized for the user.

When in the customized program mode, a primary determinate for the "ID of the next composition to be played" 67 is the position (setting) of the "Favorites-New" control 41. When in the favorites position, compositions are chosen based on the likeability ratings of compositions based in the "user's history" 64.

In some embodiments, if the user's list of favorites is short, then compositions and highlights that are new to the user may be interspersed along with the user's favorites to provide sufficient composition variety and to allow automatic expansion of the user's list of favorites and/or the user's collection.

In some embodiments, a re-schedule queue 65 may be used to hold the ID of each composition that is targeted for playback and its corresponding next targeted playback time. The compositions may be ordered by their next targeted playback time. The re-schedule queue may be implemented by a "linked list". A link list may allow a composition to be easily added into any location (e.g., targeted playback time) in the queue (e.g., between two compositions already in the queue); by only changing one link in and adding one new link to, the linked list. Other methods known to those skilled in the art may also be used. As noted elsewhere in this specification, depending on the embodiment, the time between plays may be the "elapsed calendar time since last playback" or the "playback-time of all other compositions since the composition was played".

In some embodiments, a re-schedule queue 65 may be used to hold the user's favorites ordered by their next playback time. When a composition has finished playback (or been forwarded-past/terminated), the user's rating and/or "number of times played" (for that composition) may be automatically updated by using the relationship (e.g., FIG. 7a-7j) for that composition. Based on the updated value(s), the "time between playbacks" may be determined. The newly determined value for "time between playbacks" may be added to the "current cumulative playtime" to determine a targeted future "cumulative playtime" for that composition. Similarly, the newly determined value for "calendar time between playbacks" may be added to the "current calendar time" to determine the future "calendar playback time" for that composition.

An ordered list of the locally available new compositions 62 and an ordered list of the locally available highlights 63 may be used to determine the order they are presented to the user or interspersed with the user's favorites. When the sequence generator has decided to playback a new composition or highlight, the next one on these lists may be played. The selection of the compositions on these lists and their order on these lists may be determined as described in the section entitled "Selection of New Compositions and Highlights". Only compositions for which the user has usage-rights and that are immediately available locally may be included on this list. Some composition-providers may allow a certain number of free plays for a user in the hopes that the composition will become a user favorite and be purchased and added to the user's collection.

The sequence generator 60 maintains a record of the "user history" 64 locally which is updated with all the user's control actions and the history of composition playback. When scheduled and when network connectivity is available, the sequence generator 60 may provide "user history updates" 66 back to the experience-provider. The update may only include new [and may exclude previously forwarded] user history information.

An example of the "user history" 64 data elements is shown in FIG. 5. Shown at the top of each column in FIG. 5, are parameters that may be captured for each composition the user has heard. The parameters maintained for each composition may include the following: 1) A unique "composition number (Comp #) used to identify each composition. 2) The user's usage-rights token for each composition. 3) Whether the composition is available locally. 4) The user's current enjoyment rating. 5) The user's peak enjoyment rating. 6) The number of times the composition was heard. 7) The play history including the date/time when the composition was last heard. 8) The target time between playbacks. 9) The user feedback history representing the positive and negative user control actions related to the composition. 10) The likeability curves, equations or functions that apply to the composition which may be identified by a pointer, filename or other identifier.

In some embodiments, the sequence generator 60 may be implemented as a plug-in software module, so that continually improved versions may be created by the experience-providers or sequence generator providers.

Using "Highlight" Segments to Introduce New Compositions:

In some embodiments, highlights (i.e., composition samples) may also be (optionally) included in the customized entertainment sequence. The use of "highlights" may allow the user to more quickly discover pleasing compositions that are "new" to the user. "New" to the user means compositions that the user has not yet heard or is not yet sufficiently familiar with. This would include compositions that have been available for many years but the specific user has not yet experienced. It also includes those compositions that have been recently released but the specific user a limited familiarity with. A composition that was released years or decades ago may be considered as "new" to the user. Highlights may be interspersed with full compositions in the customized entertainment sequence. New highlights are custom selected for each user based upon the probable likeability (enjoyment) as estimated from the user's history and/or profile and/or credit/payment history.

Each highlight (i.e., highlight snippet/segment or composition sample) may comprise highly compelling portion(s)/part(s)/subset(s) of a composition. In some embodiments, the most compelling are those portion(s)/part(s)/subset(s) of a composition that user(s) and/or "new" user(s) will quickly appreciate/feel/sense as being emotionally satisfying; interesting; desirable; and/or uplifting. In some embodiments, compelling may relate to the ability to influence/cause users to purchase the usage-rights for a "new" composition and/or to add the "new" composition to the user's collection.

For more embodiments, the duration of each "highlight" may be different and optimized for each composition. Alternatively, in some other embodiments, the duration of the "highlights" may be standardized. For example, in some embodiments, each highlight may be an approximately 10 to 20 second long sound segment comprised of the more highly compelling portion(s)/part(s)/subset(s) of a composition. If an embodiment uses highlights with durations of 10-20 seconds [and assuming a typical composition-duration of 3 to 5 minutes], then the use of highlights may increase the user's discovery of new music by a factor of about 10 to 20 times or more.

The most compelling part(s) of a composition may be manually pre-selected by artist(s), expert(s), focus group(s), and/or based on aggregate user feedback. For example, a plurality of possible "highlights" may be created. For example, the different "highlight" possibilities may be played to focus group(s) of users, and then collecting/measuring how compelling the users found each of the highlight possibilities. In this way, the more compelling "highlight" can be determined. In some embodiments, such testing/measuring, may also be done for different demographic/interest/etc groups.

In another embodiment, a plurality of possible "highlights" may be tested using the aggregate feedback of a plurality of different groups of randomly selected users. In one embodiment, each "highlight" possibility may be sample tested with a separate group of randomly selected users. For example, highlight1 is tested with group1; highlight2 is tested with group2; highlight3 is tested with group3; etc. The "highlight" that had the largest/most positive response with a group, may then be chosen as the most compelling "highlight" of those tested and may then be used for all users in the future.

The highlight (sound segment) may utilize storage and/or playback format(s) that are similar to any other composition (only they are of shorter length).

A highlight may be free for a limited or unlimited number of plays by a user. In some embodiments, the experience provider may obtain marketing usage-rights for a highlight or composition in-order to introduce and market the composition to a user. Such marketing usage-rights may be for a limited number of plays or limited amount of usage time or have other limits imposed on user usage.

The user-device may include an audio or visual indicator to aid the user in distinguishing between a highlight and a full composition. Such indicators may be located before, within, and/or after: the highlight and/or composition.

Highlights (and new compositions) may be interspersed with user favorites based upon user indication(s) of the amount of their interest in "new" compositions. For example, the user may indicate their desire for "new" compositions by manually entering/adjusting a setting at a user-device, via an interactive display or other type control input. For example, highlights (and new compositions) may be interspersed with user favorites based upon the "favorites-new" control (slider) 41 setting of FIG. 4. Highlights may be interspersed more frequently; the closer the "favorites-new" control 41 is to the "new" position.

In one embodiment, when the slider 41 is in an extreme newness position (uppermost position), the user-device 22 will enter the highlights-mode where the user may hear a sequence of composition highlights so that the user is exposed to a larger number of compositions in a shorter period of time. The highlights-mode allows each user to discover new pleasing music and to expand their collection of compositions at a higher rate.

Typical user control actions may be captured as user history (feedback) while each highlight is being played. This may include skipping ("Forward") when the user dislikes the highlight (indicating negative feedback) or jumping backward ("Back") if the user wishes to hear the highlight again (indicating positive feedback) or activating (pressing) the "like" control (indicating positive feedback). In some embodiments, while the highlight is playing, the user may activate (press) the "Play" control to immediately hear the full composition (also indicating positive feedback). After the full composition has finished (and the user has not provided other control actions), the "highlights" mode may resume playing other highlights.

When the user indicates sufficient positive feedback, while a highlight is playing, the composition may be added to the user's list of favorites or potential favorites. When the user indicates sufficient negative feedback while a highlight is playing (such as forwarding past it), that highlight (and "similar type" highlights) may be less likely to be presented to the user. If the user does not provide any feedback or a weak feedback, while a highlight is playing, that highlight may be presented to the user for re-consideration (and user feedback) at a later time.

Since the user might activate a control in error, the user ratings of a composition should not be excessively affected by a single user control action. Rather the user ratings for a composition may be gradually changed based upon feedback from multiple exposures to the composition over a period of time. For example, it may take several playbacks of a composition over a extensive period of time, in which a "Forward" (skip) was consistently activated early during the composition playback (and there was no other positive feedback), in-order for the user's rating of that composition to become so negative that it would not be presented to the user again.

When the user's list of favorites is too small to generate a sequence with an acceptable time between replays of the user's favorites, the sequence generator may intersperse more new compositions and/or highlights between the user favorites. In this manner, a user's list or collection of favorites may be naturally expanded, when required, without requiring any special user actions to search for and locate the new compositions.

When the sequence generator is in the favorites mode and the user appears to be disliking and forwarding over much of the music, the user-device 22 may recommend that the user move toward the "new" position on the "Favorites-New" slider 41. Alternatively, the slider 41 may be automatically moved toward the new position so the user will be exposed to more new compositions that are likely to be pleasing to the user. In addition, an increased number of new highlights may be automatically interspersed by the sequence generator.

The user-device 22 may include a mechanism for the user to approve the acquisition or purchase of a new composition(s) or the usage-rights for a new composition(s). For example, the user-device display may display information about the new composition such as its purchase price and purchase terms while the composition or its highlight is playing. Or such information may be communicated to the user by audio prior to or following the playback of the composition or highlight. A sale or bargain price may be offered to the user. To confirm a purchase, the user may take control action such as activating a certain control or perhaps speaking a certain word or phrase. Of course, some purchase plans may not require approval of each purchase.

Figure 8:
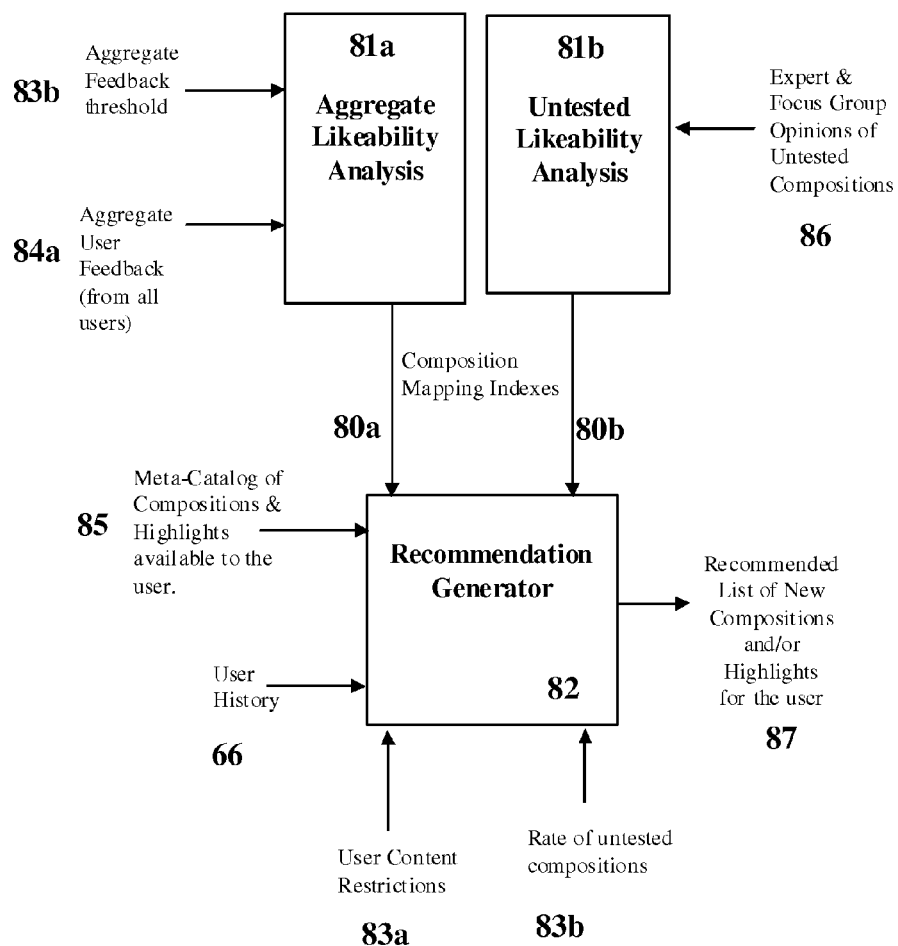
FIG. 8 illustrates a process for recommending new compositions and new highlights for a user.

Selection of New Compositions and Highlights:

A process for generating a "recommended list of new compositions and/or highlights for the user" 87 which is customized for each user is shown in FIG. 8. The recommendation generator 82 for new compositions and highlights may utilize the user's history 66 and common likeability indexes (composition mapping indexes) 80*a* & 80*b*, in-order to provide a customized experience for each user. The "recommendation list" 87 for each user may also be dependent on the "Meta-catalog of compositions and highlights available to the user" 85. The meta-catalog available to a given user may not include all the compositions available in the world. The meta-catalog 85 available to a user may be limited due to considerations that may include: the user's subscription plan or user purchase limitations or limitations imposed by a particular experience-provider.

A common likeability index may contain a mapping of "if liked composition(s)" then "also liked compositions". An example of simple one-to-one likeability index of compositions (i.e., composition mapping index 80) is shown in FIG. 9. For each "if liked composition #" shown in column 1 a list of "also liked composition Ws" are listed in column 2. For example, if composition 854108 is liked then compositions 883491, 103293, and 527177 will probably also be liked. This mapping may be determined by some combination of experts, focus groups, or by an analysis of the aggregate feedback of all users. If the aggregate feedback of all users is employed, then the index may keep track of additional parameters such as "# Users mapped", "# users liking both" and "% users liking both". The aggregate "likeability" mapping analysis may be based on either "current likeability" or "peak likeability" values for the composition.

An example of a more complex many-to-one likeability index (mapping) of compositions is shown in FIG. 10. For each group of "n" (=3 in FIG. 10) "if liked composition #" shown in columns 1 to 3, a list of "also liked composition Ws" are listed in column 4. For example, if compositions 854108, 883491 and 107389 are liked, then compositions 230845, 632952 and 428503 will probably also be liked. To reduce searching, the indexes may be maintained in numerical order and/or with numerical cross-references.

When a new composition is first released it may be considered to be "untested" since no aggregate user history is available. "Expert and focus group opinions" 86 may be used to perform an initial "untested likeability analysis" 81*b*. Based on the initial index (mapping) 80*b*, the new composition may be sampled (possibly as highlights) to a limited number of users in-order to obtain "aggregate user feedback" 84*a* from enough users to perform a "common likeability index analysis" 81*a* and create an aggregate composition mapping index 80*a*. Once the "aggregate likeability analysis" 81*a* is based upon a sufficient amount of "aggregate user feedback" 84*a* (i.e., exceeds an "aggregate feedback threshold" 83*b*), the aggregate index (mapping) 80*a* may then replace the initial expert generated likeability index 80*b*. In this way, untested new compositions are not widely distributed to new users until an initial aggregate feedback establishes their likeability with a smaller number of users. In this manner, a greater variety of new compositions may be each initially tested with a small subset of all users without burdening any one user with many untested compositions. Alternatively, "cutting edge" users may be offered the option of subscribing or activating a special "untested" mode and to be exposed to a greater number of untested compositions. A "rate of untested compositions" parameter 83*b* may be used to control each user's desired amount of exposure to "untested" compositions and/or highlights.

A list of recommended new highlights and/or compositions for each user may be generated in advance at the experience-provider's network location. The list is ranked and ordered based on compositions that are most likely to be pleasing to the user. Depending on the rankings and quantity of highlights previously downloaded and still unused at the user-device, some or all of the highlights in the revised highlight list are downloaded into the user-device 22 so they are immediately available if requested by user action. The full composition may also be down loaded at the same time as the highlight so it is immediately available if the user requests the full composition be played upon hearing the highlight.

Another optional enhancement, is to additionally constrain the recommended new compositions and highlights based on "user content restrictions" 83*a*. Each composition may be pre-tagged by restriction categories, by the content providers or content rating providers. Restriction categories may be based on factors such as the user's age, language, violence, sex content, etc. The content restrictions are settable by either the user or the user's guardian (through password protection), in-order to prevent the recommendation and playback of highlights/compositions from undesired categories.

Inserting "New" or Marketed Compositions and/or Highlights into Playlists:

Those skilled in the art will realize that a sequence of compositions may also be generated by system that is able to operate on a playlist. Generally, a playlist is a group of compositions that a user can designate for playback. When a playlist is activated for playback, the compositions in the playlist are played back in sequence. One example of a playlist is a list of compositions that a user has manually selected (e.g., "my favorite dance songs"). Another example of playlists are the "smart playlists" available in later versions of the Apple iPod. Smart playlists are also described in U.S. Pat. No. 6,941,324 (by Plastina, et al of issue date Sep. 6, 2005), which is incorporated herein by reference.

One disadvantage of smart playlists is that they can only utilize/select from compositions that are already in a user's collection or for which the user already owns/has-purchased usage-rights for. Hence, smart playlists are not able to market "new" compositions (that are not already in a user's collection or for which the user does not already own usage-rights for).

In some embodiments, for each playlist, the user may optionally input/select a value that defines the fraction of marketed compositions that will be automatically inserted into a playlist. For example, for each playlist, the user may optionally input/select a value for the desired "percent marketed compositions to automatically insert into playlist". For example, the user may select between 0% and 100% marketed compositions. For example, if the user where to input a value of 50%, then about half the compositions played will be either marketed compositions and/or highlights of marketed compositions. For some embodiments, a starting/default value may be defined and used for all playlists, unless the user inputs another value for a particular playlist. In some embodiments, the "factory" starting/default value, may be set to zero percent (or any other value).

As described elsewhere in this specification, "new" or marketed compositions may be automatically custom selected for user based upon the user's profile; feedback; usage history; credit; and/or payment history. In addition, as described elsewhere in this specification, the marketed compositions may also be selected for their similarity or matching (e.g., likeability indexes) to other compositions that are already in a user's specific playlist.

As described elsewhere in this specification, an experience-provider may obtain, for the user, limited/marketing usage-rights for the marketed compositions, prior to allowing the marketed compositions to be played as part of a playlist. In some embodiments, the user marketed percentage setting may not be satisfied if enough usage-rights for marketed compositions, cannot be obtained because of a user's bad credit/payment history.

In some embodiments, new playlist "filtering" parameters may be added into smart playlist systems. Examples of these new parameters include: "marketed composition"; "new composition"; "count of number of marketed plays"; "number of marketed playbacks remaining"; "marketed highlight";

"new highlight"; etc. As with other smart-playlist parameters (as in U.S. Pat. No. 6,941,324 by Plastina), the smart playlist system may associate a value for each of these parameters with each composition. The user may then define a smart playlist that filters out compositions that satisfy the filtering values the user defined. For example, the user may define a playlist that filters/selects "marketed compositions" or "highlights"; that also have "count of number of marketed plays" of 2 or greater. For this example, a playlist may be automatically generated that includes all the compositions that satisfy the parameters that the user has defined.

"Share" Mode:

Another optional enhancement is the "share" mode/capability. This allows one user to share a share list of composition(s) with a second user. The first user identifies the user ID where the share list of composition identifier(s) is to be sent to. The share list is forwarded across a network such as the internet to the second user's profile. If the second user accepts the share list from the first user, those compositions which are "new to the user", may be added to the second user's recommended new compositions and highlights list 87. Later, highlights or the full compositions are presented to the second user. Those highlights or compositions then receiving favorable feedback are then added to second user's favorites list (user history).

In an alternative embodiment, the share list is transferred directly between user-devices via electromagnetic or sound waves (for example, RF or IR transmission such as Bluetooth) with or without the use of a network. The second user-device 22 then automatically forwards the share list to their experience-provider 26 for possible incorporation into the second user's "recommended new compositions and highlights list" 87.

User Channels, Moods and/or Categories:

The user-device 22 may optionally allow the user to create a plurality of uniquely defined channels, each for a different user mood, activity, event or category of music. For example, the user may desire a dinner music channel, dance music channel, commuting channel, romantic channel, etc. As with a normal radio, at power-on the user-device 22 may start playing at the last channel the user was at.

In one embodiment, each channel may be defined to be handled by a different experience-provider. For example, the user may select experience-provider1 for their rock music channel while selecting experience-provider2 for both a romantic channel and a classic music channel. The user may be able to instantly switch between experience-providers by simply switching channels via a change channel control.

The user's channels may be accessed via the "My" channels control 43a shown in FIG. 4. In one embodiment, the favorite (most used) user channel starts playing when the "My" channels control is activated (pushed). The remaining user channels are ordered from most used to least used and are reached using the channel "up" 43c and "down" 43d controls. The list may be wrapped around so pressing "up" 43c when at "most used" channel will wrap to the "least used" channel. Pressing "down" 43d at the "least used" channel may wrap to the "most used" channel. If the user has only defined one channel, then the "up" and "down" controls wrap on the single channel and hence do not cause a channel change. As shown in FIG. 4, the display 40 may indicate the name of the current user channel playing and how many other user channels are available. The display may include a channel slider 44 to indicate where the channel is relative to the user's favorite channel (based on the user's history of channel activity and feedback). A slider 44 position at the top may be used to indicate the user's most favorite channel. A slider 44 position at the bottom may be used to indicate the user's least favorite channel. The size of the slider relative to the slider range may be used to provide an indication of the size of a channel relative to the total number of user channels. For example, if there are 5 user channels then the size of the slider is displayed as one fifth of the slider range.

The user may begin the creation of a new user channel by activating the "Create" channel control 43b. The user now has access to a plurality of "starting" channels (possibly 100's) via the channel "up" 43c and "down" 43d controls. Each of these channels may be provided by a different experience-provider.

In one embodiment, each "starting" channel may be playing "highlights" representing a different mood or category of music. The ordering of the "highlights" channels may be based on the user's history (and the aggregate experience of similar users), so that the most likely pleasing "highlight" channels for each user, require the fewest pushes of the channel "up" 43c and "down" 43d controls. The user provides feedback about each channel by the amount of time spent at a channel. The user also provides feedback on each "highlight" while it is playing via the "forward" 42c, "back" 42f, "like" 42g and "play" 42d controls. All the feedback history is retained for use the next time the "create channel" mode is entered. Once the user has generated a threshold amount of positive feedback on a "highlight" channel, a new user channel may be automatically added to the user's channel list. Until the user has provided a second higher threshold of feedback, the new channel may tend to provide a larger number of highlights in-order to allow the user to more quickly tune the channel to the user's preferences.

As another optional capability, the user would be able to define a playback by artist, album, title, time period, musical category, etc or search a catalog based on such parameters.

Methods for Deleting, Splitting and Merging Channels May be Incorporated into the User-Device.

Different "starting" channels may be created by the same or by different experience-providers but all channels may utilize a single, common collection of user usage-rights tokens.

Acquiring Usage-Rights for a User:

In one embodiment, the usage-rights may be issued by the composition-providers 23 and then stored in the usage-rights repository 24 so the usage-rights may be used by all experience-providers 26.

Figure 14:
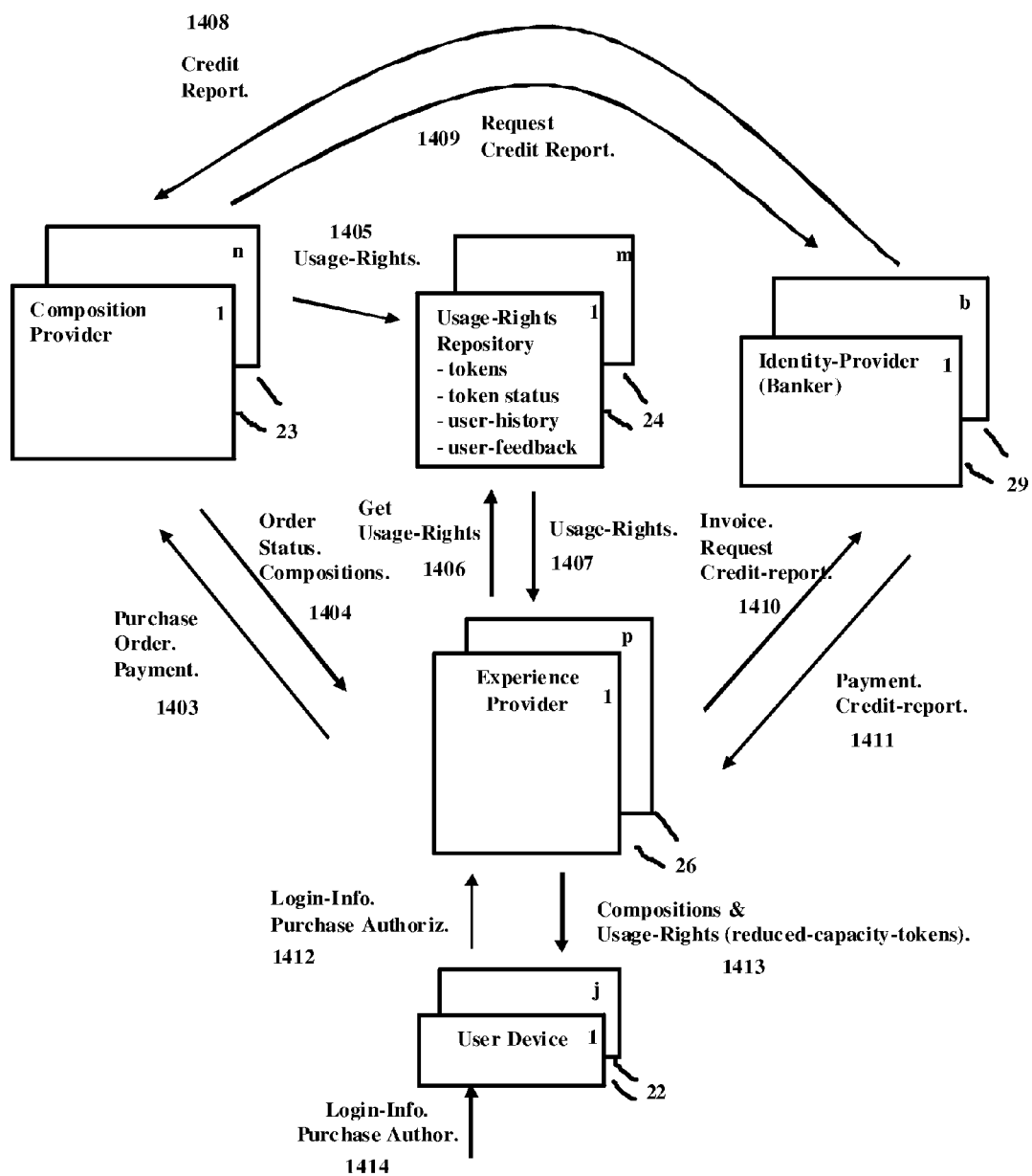
FIG. 14 shows an example of the acquisition of usage-rights for a user.

FIG. 14 shows an example of the acquisition of usage-rights for a user. An experience-provider 26 may handle the acquisition of the usage-rights on the user's behalf. Login-Info at the user-device is used to determine that a specific user is active at the user-device and has authorized the acquisition 1414 of usage-rights for a composition. The acquisition request is communicated 1412 to the experience-provider and validated. The experience-provider 26 may submit a "purchase-order and payment" 1403 to a composition-provider 23. The composition-provider 23 may optionally request a credit-report 1409 from the identity-provider (banker) and receive back 1408 a credit report on the user's account. If acceptable, the composition-provider 23 creates and places 1405 a copy of the user's new usage-rights for the composition in the usage-rights repository 24. The composition-provider 23 may communicate 1404 order status/completion to the experience-provider 26. If the experience-provider does not yet have a copy, the composition-provider 23 may also forward 1404 a copy of the composition to the experience-provider. The experience-provider 26 may now "get" 1406 the new usage-rights from the usage-rights repository 24. The usage-rights repository 24 then forwards 1407 a copy of the new usage-rights to the experience-provider 26. The experience-provider 26 may now package and forward 1413 the composition (in the format needed by the user-device) and the corresponding usage-rights (e.g., a reduced-capacity-token) to the user-device. The new composition is now available for use at the user-device. From time to time, the experience-provider 26 may invoice and request a credit-report 1410 from the identity-provider (e.g., banker) and receive back 1411 payments and credit-reports for the user's account.

The experience-provider 26 may also request free highlights or free samples from a composition-provider 23 on the user's behalf. If the composition-provider 23 determines that the user's credit-report is acceptable, the composition-provider 23 may then issue a token for highlights or samples into the usage-rights database. The tokens for highlights or samples may be for only a limited number of plays, and may be set for each user based on history of the username and/or the credit report.

In some embodiments, duplicate purchases of usage-rights (e.g., by different experience-providers) may be detected in the usage-rights repository so duplicate tokens may be revoked and credited back to the user's account. The user is relieved of any concern with accidentally purchasing a composition the user already owns, since any such occurrence is automatically detected and the payment is automatically credited back to the user's account.

Contents of a Usage-Rights Token:

The tokens may be defined so that they may be easily transferred across the network and shared by multiple experience-providers or other providers. An individual token may be defined as a separate entity such as an object or data structure or file. Each token's contents may also be stored as a record in a database.

Figure 13:
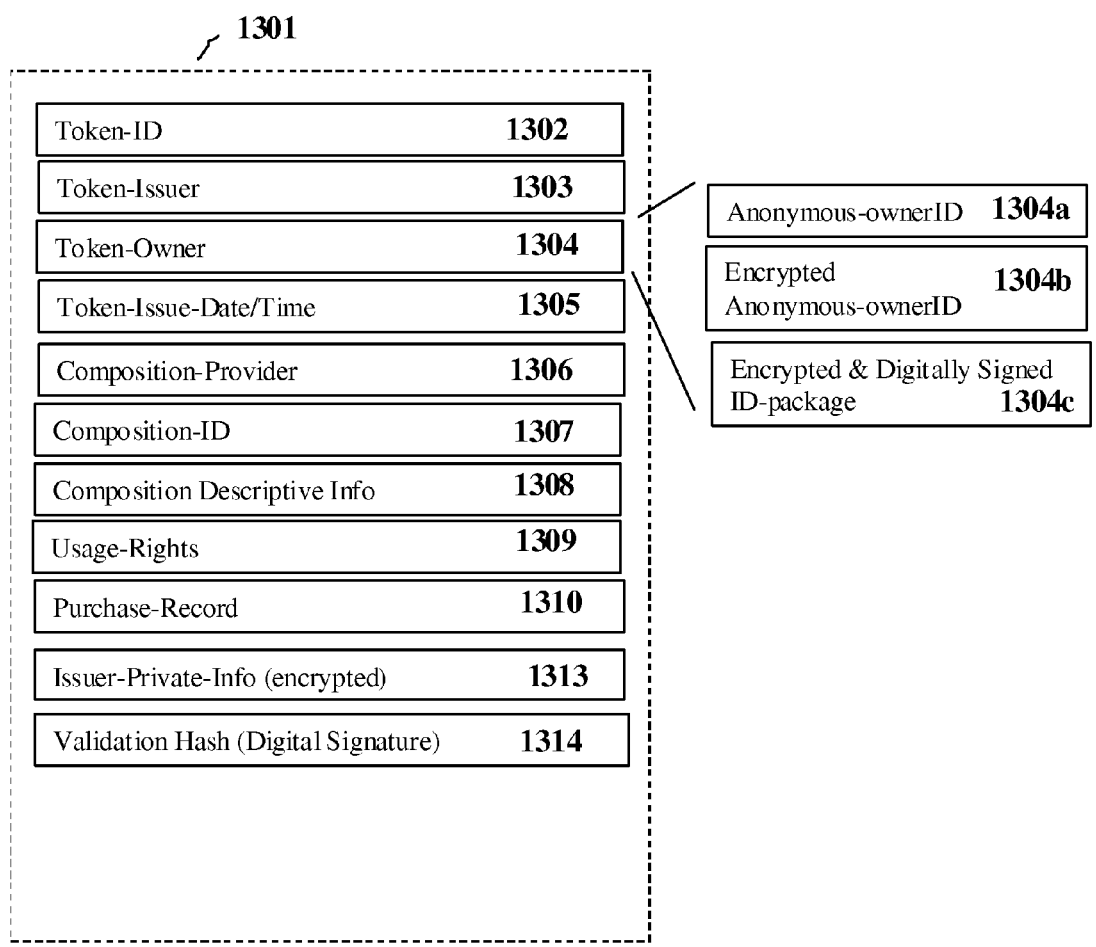
FIG. 13 illustrates an example of the contents of a usage-rights token (ownership token).

FIG. 13 illustrates one detailed embodiment of the contents of a usage-rights definition 1301 (i.e., usage-rights token or ownership token).

The owner of the token may be defined by a token-owner 1304 definition in the token 1301. Each token 1301 may be defined for exclusive use by a specific user (e.g., an individual) or a set of specific users (e.g., a family).

The token-owner 1304 may indicate the actual identity of the owner or may refer to the owner in a unique but anonymous manner.

In some embodiments, the token contents are defined to maintain ownership confidentiality and privacy, so the actual owner's identity may be not be determined by either: inspection of the token 1301 by itself or by the experience-providers (and other providers) by using the token 1301 in combination with other information the experience-providers may have.

In one embodiment, the ownership of the token may be defined by an anonymous-ownerID 1304a from which the actual user may not be directly determined. An identity-provider 29 (e.g., banker) may maintain a confidential mapping between the anonymous-ownerID and the actual owner's identity. In-order to maintain user privacy and identity, the other providers may be prevented from accessing this mapping and the identity-provider 29 may be prevented from accessing the tokens and usage-rights repository 24.

In some embodiments, the ownership of the token may be defined by an encrypted-anonymous-ownerID 1304b. Public key encryption (e.g., a private-public key pair) may be used so that the identity-provider 29 encrypts the anonymous-ownerID with a private key. The authorized providers may validate (but not decrypt) the encrypted-anonymous-ownerID by using the public key. Digital signatures may also be used. The actual owner's identity may not be determined from either the anonymous-ownerID or the encrypted-anonymous-ownerID.

In some embodiments, the ownership of the token may be hidden within an encrypted and digitally signed package 1304c that may only be decrypted by the identity-provider. Public key encryption (e.g., public-private key pair) may be used where the token issuer encrypts the anonymous-ownerID with a private key and the encrypted username may be validated (but not decrypted) by other authorized providers by using the public key. Or a combination of encryption and digital signatures may be used.

In addition, the identity-provider 29 may maintain a secure private database 1506 that maps the Login-Info to: the anonymous-ownerID 1304a; and/or encrypted-anonymous-ownerID 1304b; and/or the encrypted and digitally signed package 1304c. The identity-provider 29 may maintain another secure private database 1504 that maps the anonymous-ownerID and is not accessible by any other providers.

The anonymous-ownerID 1304 may include a reference to the identity-provider 29 that issued the anonymous-ownerID. The token may also include a link; hyperlink; pointer; or universal resource locator (URL) to a network 27 location where the identity-provider 29 may validate the existence of the anonymous-ownerID and the status of its associated account.

The token-owner 1304 may also be defined using a combination of the above methods and/or other user identification methods known by those skilled in the art.

Each token issued may have a unique token-ID 1302.

Each token may also include the token-issuer 1303. The token-issuer 1303 information may include a link; hyperlink; pointer; or universal resource locator (URL) to a network location where the token may be validated by the token issuer.

Each token may also include the issue-date/time 1305 and composition-provider information 1306. Each token may also define a composition-ID 1307. Each version of a composition may have a unique composition-ID 1307 assigned to it. For example, the studio and each different concert version of the same song by the same artist may have a different composition-ID.

The token 1301 may also include composition description information 1308 such as the composition-name, artist, artist version, composition release and performance dates, etc.

The token 1301 may also include the definition of the owner's usage-rights 1309 (ownership-rights) such as the TimePeriodValid; Number of Plays Allowed; fee per play; an unlimited plays until date; end-date; number of copies allowed; allowed type of user-devices; execution-rights; etc.

In some embodiment, tokens may authorize playback with all existing formats and all (networked) user-devices. Sales of usage-rights may increase when users are more confident of the compatibility and the future usability of their purchased compositions.

In one embodiment, tokens may authorize playback of the composition with future formats and future user-devices, perhaps with a small one-time additional fee. This may eliminate user concerns that their purchases of usage-rights may be worthless if the technology evolves or changes in the future.

The token may also so include a token purchase record 1310. The user's purchase record may include information such as Date & Time token Purchased; Purchase Order ID; whether upgraded from a prior token-ID(s); Amount Paid; Cumulative Amount Paid; Form of Payment; etc.

The token may also include an encrypted information area 1313 where the token-issuer may encrypt and digitally sign private information that the token-issuer alone may use to validate the token as being valid and uncompromised. Multiple levels/schemes of encrypted, hidden, coded information may be used to maintain token integrity even if some levels or schemes become compromised. The token issuer may also maintain a separate secure and private database of issued tokens that may be used to validate tokens.

One or more digital signatures 1314 may be used to allow detection of unauthorized changes to a token or sub-sections of a token. The signature may be derived from a hash function such that the value of the signature is related to all the signed data and the alteration of any signed data will result in a different signature value. Public-Private key signatures [e.g., public key encryption (PKI) methods] may be used. The signature may be generated with a private key that only the token creator knows. Any experience-provider 26 or other authorized provider (or user-device) may then use the corresponding public key to validate that the token has not been altered since it was issued.

The contents & structure of the token may be defined by an industry standard or standards defined by the experience-providers and/or composition-providers. Portions of the token may be defined using a mark-up language such as the Extensible Markup Language (XML) with a schema definition that defines each element.

In some embodiments, the token may be formatted, reformatted, repackaged, encrypted and digitally signed in different ways depending on where and how the token is being used on the network. For example, in one embodiment a tokens in the usage-rights repository may be stored as a record in a (relational) database. The format and/or contents of the usage-rights tokens stored in the usage-rights repository may differ from the reduced-capacity-tokens that are distributed to a user-device. Also in some cases, the format of certain reduced-capacity-tokens may need to be compatible with the digital rights management scheme that is proprietary to a user-device.

There are many alternative implementations that are functionally equivalent. Many alternative embodiments are possible within the scope of the claims.

Identity-Provider and the Anonymous-ownerID:

To protect user privacy, it is desirable that a user's usage-rights library and play-history not be associated with an actual person. This may be accomplished by the creation of an anonymous-ownerID used to define the ownership of usage-rights (tokens). The experience-providers, usage-rights repository and composition-providers may manage and use the usage-rights and play-history for each anonymous-ownerID without any knowledge of who the actual person is.

An anonymous-ownerID may be created by an identity-provider 29 that is independent from the other providers (e.g., experience-providers, usage-rights repository and composition-providers). In one embodiment, the anonymous-ownerID may include additional information that identifies the identity-provider 29 that manages the anonymous-ownerID account. To maintain user privacy, the identity-providers 29 are not allowed access to any of the databases of the other providers (experience-providers, usage-rights repository and composition-providers).

Figure 15:
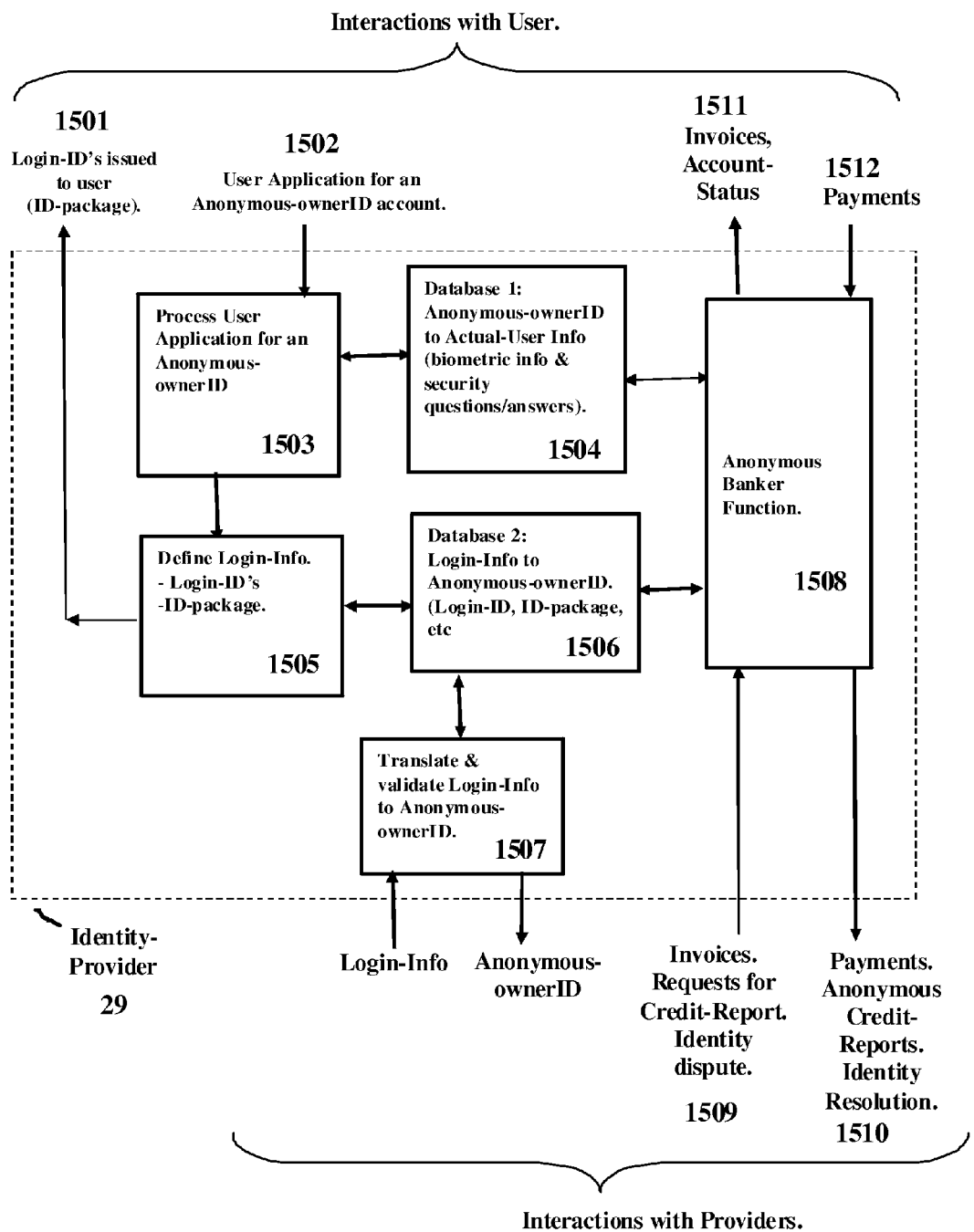
FIG. 15 shows an embodiment of an identity-provider creating an anonymous-ownerID and login-Info; and providing banker functions.

FIG. 15 shows an example of the creation of an anonymous-ownerID and login-Info by an identity-provider. The user submits a "user application for an anonymous-ownerID account" 1502 to an identity-provider 29 that is independent from the providers (e.g., experience-providers, usage-rights repository and composition-providers). In one embodiment, the user may provide information that actually identifies the user such as user name, address, and contact information. The user may also provide biometric identification information. The user may also provide information that is used to unambiguously identify the user in the case of a future identity theft such as one or more secret security questions and answers.

The identity-provider 29 may "process the user application for an anonymous-ownerID" 1503. A globally unique anonymous-ownerID is assigned to the user by the identity-provider 29 and stored in a secure database 1504 along with the submitted application information. In some embodiments, the anonymous-ownerID is not provided to the user.

The identity-provider 29 then "defines login-Info" 1505 that the user may use to uniquely identity themselves to user-devices. The login-info may include multiple ways that the user may identify themselves to a user-device. Each user-device 22 may be capable of recognizing some subset of the login-info in-order to uniquely identify the presence of the user at the user-device. This mapping of login-info to anonymous-ownerID may be maintained by the identity-provider 29 in a second secret database 1506.

The "login-ID's (and other login-Info) may be issued to the user" 1501 which define the various ways the user may login at user-devices. Multiple login-ID's may be issued to the user. Which types of biometric methods (finger print scan, face recognition, iris scan, etc) that various user-devices may utilize, may be defined to the user.

The identity-provider 29 may provide to authorized providers (e.g., experience-providers) the "translation of login-info to an anonymous-ownerID" 1507 and the validation of the login-info and the account status for the corresponding anonymous-ownerID.

The identity-provider 29 may also provide an "anonymous banker function" 1508 for the account of the anonymous-ownerID. The providers may submit to the banker "invoices, requests for credit-reports and identity disputes" 1509 related to an anonymous-ownerID and receive back "payments, anonymous credit-reports and identity resolution status" 1510. The banker may use the databases 1504 and 1506 to perform anonymous billing for the account of the anonymous-ownerID. The banker may submit "invoices and status" 1511 to the user and receive payments 1512 from the user.

The identity-provider 29 may also resolve issues related to identity theft or compromises of an owners account by using the other information in the owners application (e.g., security questions or more extensive biometric info).

The compromise of a login-ID or other login-info may be corrected by issuing new login-ID or login-info while revoking the compromised ones. The database 1506 login-info may be remapped to the new anonymous-ownerID.

The compromise of an anonymous-ownerID may be corrected by revoking the compromised anonymous-ownerID and the associated tokens, while issuing a new anonymous-ownerID and the associated replacement tokens. The databases 1504 and 1506 login-info may be remapped to the new anonymous-ownerID.

The compromise of the actual user identity due to public association with an anonymous-ownerID may be recovered by the issuing a new anonymous-ownerID and associated tokens while revoking the older versions, as above.

Usage-Rights Repository:

In one embodiment, the composition-providers or usage-rights repository (i.e., usage-rights authority) may provide a guarantee to users that their usage-rights tokens will be secured in perpetuity (i.e., at least for the life of the usage-rights tokens and the user and their heirs). This type guarantee will assure users that all their purchases (acquired usage-rights tokens) will be available automatically from the repository without requiring any user involvement, management or action by the user. When a user purchases the usage-rights (ownership-rights) for a composition, they may be confident that their usage-rights will be automatically usable through all experience-providers and by most (or all) user-devices without requiring any user actions.

To provide additional user confidence in the guarantee, the usage-rights repository (i.e., usage-rights authority) may be industry wide funded and may maintain an endowment large enough to fund the usage-rights repository in perpetuity. The usage-rights authority may charge the composition-providers a small fee (which includes endowment funding) for each entry they make into the database. Since the costs of maintaining a token in the repository are expected to decrease over time due to continuous technology improvements, an endowment funded model may be utilized to support token availability in perpetuity.

A separate repository may be provided by each composition-provider 23 or a common repository(s) may be shared by a group of composition-providers or a common repository may be used by all composition-providers.

The usage-rights repository(s) may be implemented using a database including a relational database. The token-owner and tokenID may be used as common data keys across the relational database. The usage-rights repository may also be implemented as web server; with the experience-providers, composition-providers, etc interacting as clients (in a client-server model). Those experienced in the art will realize that other alternatives may also be used.

Many copies of a repository may be distributed across multiple computers connected to the network 27 or Internet so that access may be provided by multiple network paths and multiple physically isolated repository locations in case of failures or heavy traffic loads. The repositories may be maintained concurrent by using mirroring or other methods for keeping multiple copies synchronized across a network. In addition, the repositories may also be backed up and/or archived periodically [including to other media] across the network(s) preferably at different physical locations from the repositories.

Each composition-provider 23 may also maintain a secure version of the usage-rights data that is not accessible by any of the other entities. If the repository accessible data is damaged or corrupted, the repository may be rebuilt using the secured non-accessible version. All the composition-provider databases may be backed up frequently to multiple secure locations distributed at different physical locations across the network 27 or internet.

Only authorized composition-providers may be allowed to write or update the usage-rights repository. In one embodiment, each composition-provider 23 may only add new entries or update the usage-rights entries they have created. A composition-provider 23 may be prevented from accessing the entries of other composition-providers. The usage-rights authority may maintain a private database of authorized composition-providers that are allowed to access the usage-rights repository. Composition-provider 23 access may be controlled by unique private composition-provider-ID and a password.

In one embodiment, all usage-rights tokens in the repository (or repositories) are read accessible by all authorized experience-providers. The usage-rights authority may maintain a private database of authorized experience-providers that are allowed to read the usage-rights database. Experience-provider 26 access may be controlled by unique private experience-provider-ID and a password.

The usage-rights repository may not be accessible to certain providers (e.g., identity-providers) or to the general public over the internet.

In some embodiments, the usage-rights repository(s) may also maintain the status of each token. The token-status indicates whether a token is valid or invalid. A token may become invalid because of a token upgrade, token compromise, identity-theft, identity-compromise, etc.

In-order to provide greater database integrity, the database may be constructed so previously entered records may not be deleted or changed but earlier entries may be updated by the addition of a more current database entry. Database records may include one or more changeable parameter(s) which may point-to or indicate a newer record exists. A log of all database record changes and accesses may also be maintained so problems may be traced back to their source.

To facilitate rapid access to a given token-owner's usage-rights, a lookup table (database) may be used to translate from a token-owner (& perhaps compositionID) to the network 27 addresses of one or more computers (or storage devices) where the specific physical location(s) where the token-owner usage-rights are stored. Such lookup may be redundantly distributed at different physical locations across the network. An implementation similar to that used for the Internet's Domain Name Servers (DNS) may be utilized. Those skilled in the art will recognize that many other alternative implementations are possible.

User Feedback and Play-History:

User play history is a record of the user's interaction/feedback about each composition the user has experience. This record may include usage date/time; experience-provider; % of composition played; how the playback was initiated; and other similar information. The users play history may be used by an experience-provider 26 to automatically create a customized personalized sequence of old and new compositions that will be pleasing to each user.

In some embodiments, the play history may include a usage-history of each token. In other embodiments, the play-history may be an aggregate history for each user where the play-history of upgraded tokens and re-issued tokens for the same composition are combined together.

The user-history may be maintained in a database by either the user, by the usage-rights repository or by the experience-provider(s) or other provider. In one embodiment, user's play-history may be stored in the usage-rights repository with access provided to all experience-providers.

The contents & structure of the play-history may be defined by an industry standard or standards defined by the experience-providers and other providers. Portions of the play-history may be defined using a mark-up language such as the Extensible Markup Language (XML) with a schema definition that defines each element.

FIG. 16 shows an example of the contents of a user's play history for a composition (for a unique user). The play-history may include an anonymous-ownerID 1304; the composition-ID 1603; and a record-of-play 1604 for each time the user experienced the composition. The play-history may also include a parameter that points to the last record 1605. The play-history may also include parameters that summarize the user's experience with the composition such as "number of times played" 1606 and "average % played" 1607. The play-history may also include one or more validation hashes (digital signatures) 1608.

FIG. 17 shows an example of the contents of a "record-of-play "n" 1604. The record-of-play may include the "date & time played" 1702; the "experience-provider coordinating the playback" 1703; the % played 1704; the "usage-rights token-ID used" 1705; likeability indicators 1707; and "how initiated" 1707. The "how initiated" may indicate whether it was automatically chosen without user input or how the user specifically requested the composition to be played (library search or using "back" control or other ways). The record-ofplay may also include "reporting status" 1708 to indicate whether the record-of-play has already been reported to the next higher play-history collection point. The record-of-play may also include one or more validation hashes (digital signatures) 1709.

Figure 18:
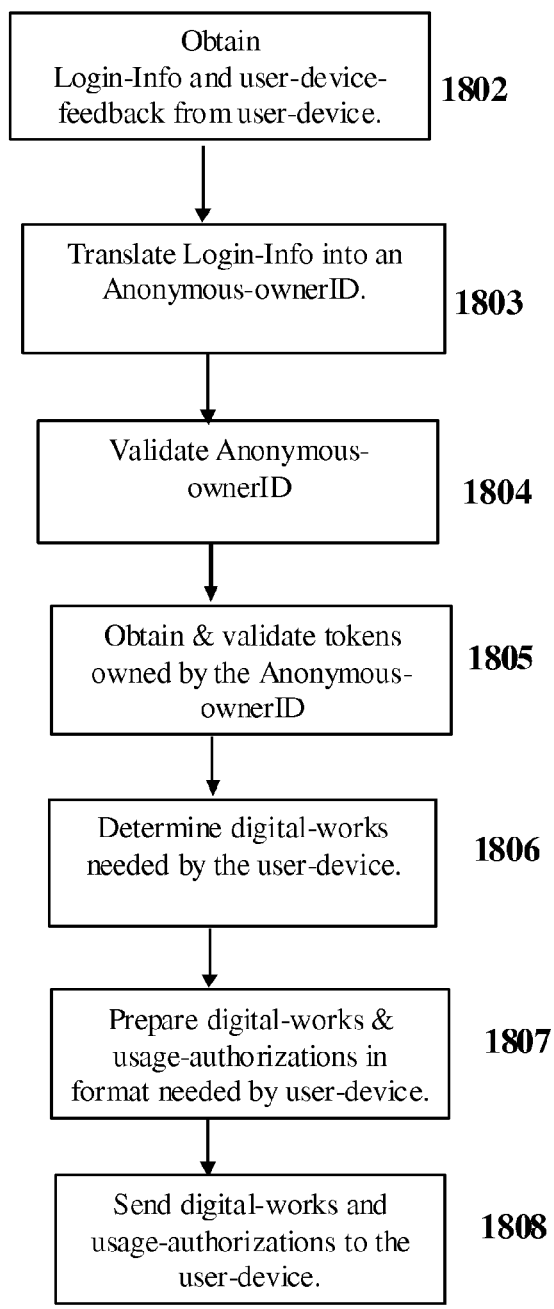
FIG. 18 illustrates an embodiment for distributing digital-works to a user-device.
Figure 19:
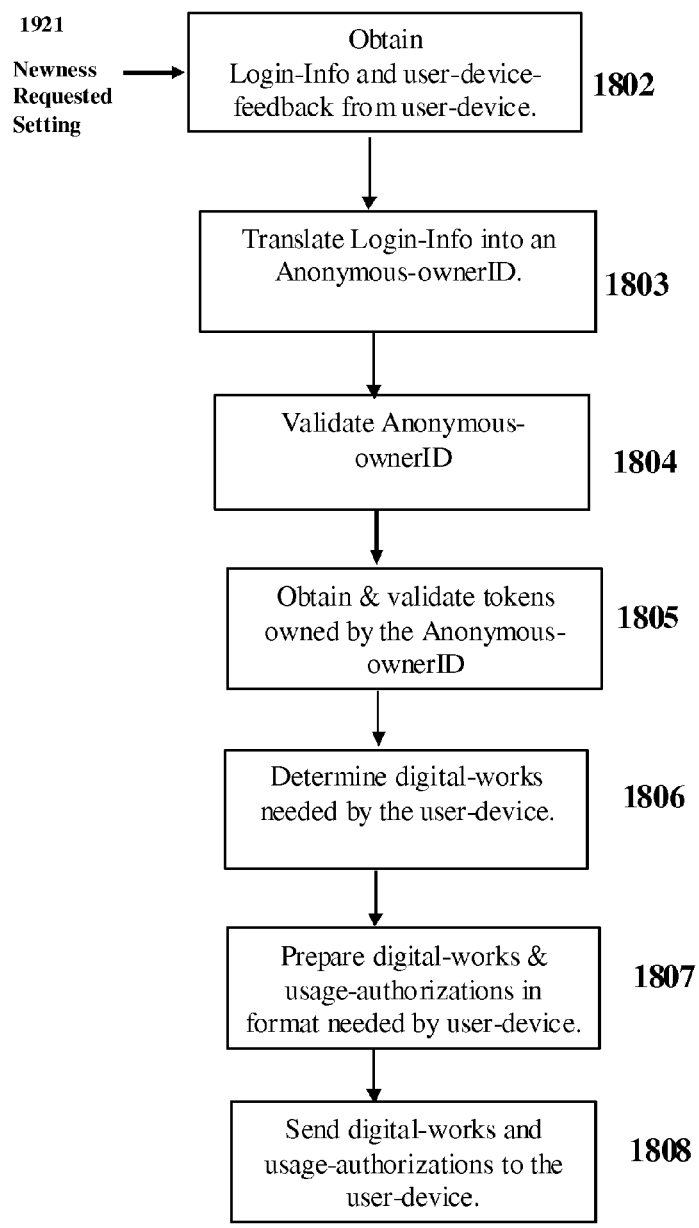
FIG. 19 illustrates an embodiment for distributing digital-works to a user-device.

Distribution of Digital-Works to User-Devices:

FIG. 18 illustrates one embodiment for distributing digital-works to a user-device. In some embodiments, a subset of these steps may be used. In some embodiments, the steps may be performed in a different order.

The first step in FIG. 18 is to "Obtain Login-Info and user-device-feedback information from the user-device" 1802. When a user is active at a user-device, the user-device 22 may capture Login-Info in-order to identify the specific user. The user-device-feedback represents prior usage-history and user-feedback since the last time the user-device-feedback was successfully transferred. This information may be sent from the user-device 22 across the network 27 to the experience-provider 26.

Since a given user-device 22 may be compatible with a limited number of digital-work formats, the user-device 22 may also forward its device-type to the experience-provider 26 so the experience-provider will know the particular formats that the user-device requires.

The Login-Info may include entry of the user's Login-Name/password; a spoken user codeword (such as a Login-Name/password); user voice recognition; user-biometrics (e.g., face recognition, fingerprint recognition, iris scan recognition); a User Radio Frequency ID (RFID) Tag identification device; a user-ID device or any other method of uniquely identifying a user. In-order to protect against the actual identity of the user, biometric information may be limited to a portion of the full biometric data or a processed summary of the biometric data. Combinations of these identification methods may be used to reduce the false-positive and false-negative identification error rates.

In some embodiments, the user may be uniquely identified from the Login-Info but the actual identity of the user may not be obtained from the Login-Info.

The next step is to "Translate the Login-Info into an Anonymous-ownerID" 1803. In one embodiment, the Anonymous-ownerID may correspond to the token-owner parameter(s) 1304 of the usage-rights token definitions for which that user has rights to utilize.

In one embodiment, the Login-Info to Anonymous-ownerID translation may be performed by an identity-provider 29 which maintains a mapping of Login-Info to Anonymous-ownerID's. Only authorized providers may be allowed to request a Login-Info to Anonymous-ownerID translation.

The Login-Info may also be validated against the experience-provider's database of Login-Info that previously occurred.

The next step is to "Validate the Anonymous-ownerID" 1804. The identity-provider 29 may maintain status on the validity of the Anonymous-ownerID. The status may indicate whether there is compromise of a user's identity (e.g., identity theft) or unusual suspect activity in the user account. The identity-provider 29 may also maintain an anonymous credit report about the Anonymous-ownerID that may be used to assess the trustworthiness and reliability of the user.

The experience-providers may also "validate the Anonymous-ownerID" 1804 by monitoring for indications of piracy, identity theft or stolen user-devices 22. This may include examining the user-history for unusual activities such as a) the simultaneous use of multiple user-devices at different physical locations; b) unusual or excessive non-reporting back of user-history from user-devices; c) errors or corruption of formats and digital signatures; d) an excessively large number of user-devices.

Once the Anonymous-ownerID of the user has been determined and validated, the experience-provider 26 may "obtain and validate all the tokens owned by the anonymous-ownerID" 1805 from the usage-rights repository. The validity of each token may be validated using token-status that may also be maintained in the usage-rights repository. Bogus tokens may be detected and excluded during validation. Token status may also be used to revoke a token that has been compromised or revoked/re-issued.

The next step is to "Determine digital-works needed by the user-device" 1806. These may be digital-works related to the current context of the user-device 22 such as digital-works that the user has requested; or digital-works in the user's library; or digital-works in a user's playlist; or a sequence of digital-works defined specially for the user. In one embodiment, the determination of possibly needed digital-works may be based upon the user's playback-history and/or the user's feedback-history.

The next step is to "Prepare digital-works and usage-authorizations in format needed by the user-device" 1807.

Each user-device 22 may provide information (e.g., model & serial number) that allows the experience-provider 26 to determine the specific formats required by each user-device. A user-device 22 status may also indicate which digital-works and validated usage-rights are already available at the user-device.

In some embodiments, the highest quality format that is compatible with the user-device (where the user is currently at) may be automatically determined by using the user-device information and then automatically downloaded to the user-device. In some embodiments, the need for and the download may occur in anticipation of being needed in the future at the user-device.

In some embodiments, the highest quality format which is compatible with the user-device (where the user is currently at) and that is available to send to the user-device; may be automatically determined by using the user-device information and then automatically downloaded to the user-device. In some embodiments, the need for and the download may occur in anticipation of being needed in the future at the user-device.

In some embodiments, the full usage-rights (usage-rights token) is not transferred to the user-device 22 but is gradually released to the individual user-devices by using a limited usage-authorization (e.g., reduced-capacity-token). A reduced-capacity-token (i.e. authorization to use the digital-work) may have less than the full definition of usage-rights and may typically expire before the full usage-rights expire. The reduced-capacity-tokens may be periodically re-issued or updated when feedback from a user-device 22 confirms that the usage-rights are being properly used. In this manner, the usage-rights are gradually metered out to the various user user-devices; as long as the activity (e.g., feedback) of the user-device 22 is considered normal.

In some embodiments, a downloaded digital-work may be enabled for playback at a user-device 22 by a reduced-capacity-token that is usable only by a specific user or set of specific users; on the specific user-device 22 and only for a limited authorized-time or limited number of playbacks. The authorized-time may be hours to several days and/or for a limited number of plays. To continue playing the digital-work, the user-device 22 must provide feedback to the experience-provider 26 across the network 27 and receive back an updated reduced-capacity-token from the experience-provider. Otherwise, the reduced-capacity-token may expire before the user's full usage-rights have expired.

The reduced-capacity-token may allow the digital-work to be played on the user-device for only a limited time period (for example, for only an hour or a day or a few weeks). The user-device 22 may periodically interact with the experience-provider 26 across the network 27 to feedback user-history and to receive an extension of the time period. If the user-device 22 does not connect back to the experience-provider, the digital-works will expire after the usage-authorization time period. The time period may be set for each user based on estimated user trustworthiness factors such as the user's anonymous credit report and/or the historical experience with a user. For example, the time period may be set long for a reliable customer with an extensive positive history. If a user-device 22 is prevented from reporting back the user-history or is lost or stolen, the digital-works in the user-device will expire after the time period but the full usage-rights held in the usage-rights repository are not compromised or affected.

In some embodiments, a user-device 22 is not authorized to create copies that can be transferred to other user-devices. Since the user's collection is automatically backed-up via the network repository and since each user-device 22 is able to acquire any needed digital-works automatically across the network, there is no longer a need for users to make copies themselves so reduced-capacity-tokens may typically be defined to not allow copies to be created at user-devices.

A special case occurs with user-devices that do not have a real-time network connection capability or are never within reach of a real-time network connection. For this case, a portable user-device 22 may be used to act as a "transportation delayed" network connection. The reduced-capacity-tokens in the portable user-device are immediately disabled upon their transfer to an un-networked user-device. When the user finishes with the un-networked user-device, the user-history and usage-rights are then transferred from the un-networked user-device back to the portable user-device. When the portable user-device re-establishes a real-time network connection, the user-history (including that of the un-networked user-device) is feedback to the usage-rights repository. To handle this special case, digital-works and their corresponding reduced-capacity-tokens are allowed to be transferred between user-devices as long as no copying occurs (i.e., user-devices are not allowed to create additional copies).

The next step is to "Send the digital-works and usage-authorization (e.g., reduced-capacity-token) to the user-device" 1808. In some embodiments, digital-works and their corresponding usage-authorization (e.g., reduced-capacity-tokens) may be automatically distributed across the network 27 by the experience-provider 26 in the appropriate format for the user-device as needed or in anticipation of being needed.

Once a compatible version of the digital-work and the corresponding usage-authorization (e.g., reduced-capacity-token) are at the user-device, the user-device 22 may use an unexpired usage-authorization to access (e.g., decrypt) and use the digital-work whenever the user is active at the user-device.

Network Strategies:

It is expected that each user will have multiple user-devices that need to be updated such that any changes to the user's history and user's collection (i.e., the user's library of compositions) is automatically made available, in a timely manner, to all the other user-devices where the user is active. For example, any changes made in the automobile on the way home may be immediately available, in the ideal, to user-devices in the user's home.

In one embodiment, each user-device 22 would be capable of establishing two way communication in-order to interact with the experience-provider 26 over a wireless or wired connection to a network such as the internet.

When the user-device 22 has sufficient storage, the user's favorites may be stored locally and the general network strategy is to download the most likely needed compositions and highlights well in advance of actual need by the user-device. Having storage in each user-device 22 is more accommodating to poor quality, intermittent, or missing network connections.

When a local user-device 22 has sufficient local storage, the network interface may be managed to minimize communication costs. For example, the largest downloads and uploads may be scheduled during those times (of the day or night or week) when the communication costs are lower. For example, downloads of new compositions and highlights may occur, automatically without user action, in the middle of the night and then stored within each user-device 22 for possible use during the following days. More information may be downloaded than is typically expected to be needed, just so it will be available if needed. Since the typical user's tastes change slowly over a period of days, the locally stored compositions and highlights will be fairly up-to-date; but an automatically generated sequence of compositions may be less then ideal when switching between user-devices (e.g., car to house), since the most recent user history would not be exchanged until later that night. If desired, the less data intensive user history/feedback may be communicated more frequently, while the more data intensive downloads are restricted to lower cost communication times.

Another alternative is to broadcast and/or multicast the data intensive information (compositions and highlights) to multiple users simultaneously over the network. Prior to the broadcast or multicast, each user-device 22 receives an update on what new compositions and highlights that user needs. The user-devices then monitor the broadcast or multicast, and save the appropriate data the user is expected to need.

User-devices may also network directly with each other and/or over a network to pass update information.

In one embodiment, where networked access is not available in remote locations, the update to the remote user-devices may be handled by a portable user-device carried from a networked area into the remote area. The portable user-device then networks with the remote user-devices to update them. Similarly, after leaving the remote area and re-establishing a network connection. The portable user-device may update the repository with the user feedback that occurred in the remote area. In this case, the user-devices may directly interact to share information when they are within communication range with each other. Such direct communication may be accomplished by IR or RF means such as WiFi or Bluetooth.

Some embodiments may (optionally) employ/utilize streaming over a network connection such as the internet. With streaming, the personalized sequence is generated at the experience-provider's location on the network 27 (e.g., internet server) and forwarded, wired and/or wirelessly, to the user-device as a stream of packets. The user-device may be simplified since it only need convert the packets into the entertainment sequence (e.g., sound sequence) and send the user's feedback back across the network 27 to the experience-provider. Streaming may reduce the needed amount of local storage and local processing in the user-device. In some embodiments, a small local memory (such as a FIFO or double buffer) is used in the local user-device to provide a continuous sound stream on the output side, despite fluctuations in the receipt and processing of packets across the network connection. A possible disadvantage of streaming is that a virtually continuous interactive network connection at an effective bandwidth must be available. Another possible major disadvantage is that the network connection must have an acceptably low interactive latency so the experience-provider's streaming source may quickly adjust to the user's feedback and control inputs (such as the "Forward" and "Back" controls). The need for a higher quality network connection to be continuously available may make streaming a less desirable alternative for some embodiments.

Implementation of the Inter-Provider Network:

In some embodiments, the information transfers across the network 27 between the providers (experience-providers, composition-providers, usage-rights-repositories, and/or bankers) may provide good security and privacy along with a good Quality-of-Service (such as high availability & low latency).

The physical network layer may be a combination of optical fiber, wired and wireless (EM, RF, IR, optical) networks. The network 27 architecture may be configured using elements such as add-drop multiplexers (electrical and optical), routers, switches, gateways, bridges, and firewalls. Network availability may be improved by providing redundant network paths, redundant servers (at different physical locations) and robust network architectures such as mesh networks. Existing internet infrastructures may be used but security and quality of service issues should be considered.

Quality-of-Service (QoS) parameters such as latency may be improved by the use of Multi-Protocol Label Switching (MPLS) or Generalized Multi-Protocol Label Switching (GMPLS) which may route messages through pre-defined un-congested network paths thereby reducing queuing delays, timeouts and re-transmissions. Forward error correction may allow correction of transmission errors at the receiver and reduce delays from re-transmissions.

To improve security, the network routers and firewalls at the entry to each of the provider locations may be configured to only accept traffic from authorized IP addresses. Virtual private networks (VPN's) may also be used across the network 27 or Internet to provide an additional level of privacy between the sender and receiver.

An even higher level of security and service may be provided with a dedicated network 27 between the experience-providers, composition-providers, usage-rights-repositories, and bankers that is completely separate from the Internet. Isolation may be accomplished using dense wavelength division multiplexing (DWDM) optical networks where separate DWDM channels (light frequencies) and routers are dedicated to the inter-provider network and not shared with internet traffic or traffic from any other networks. Such a separate network may be isolated from Internet problems such as excessive traffic or denial of service attacks. As an example, Broadwing Communications offers a Converged Services Network infrastructure based on Multiprotocol Label Switching (MPLS) that will enable both Layer 2 and Layer 3 Virtual Private Network (VPN) that is separate from the Internet.

Those skilled in the art will realize that there are many models of distributed processing and communication that may be used to implement the disclosed concepts. These include the client-server and peer-to-peer models. In the various embodiments, different functions may be implemented by using a combination of these different models.

Those skilled in the art will realize there are many network and information transfer protocols that may be used in a hierarchical manner in the network. The protocols may be configured or layered in terms of the 7 layer ISO/OSI network model or other protocol layer models (e.g., Internet or Darpa) to meet requirements for security and quality of service (QoS) such as latency, lost packets or messages, error detection, control, message/packet retransmission, etc. Examples of protocols include Sonet, Frame, Asynchronous Transfer Mode (ATM), Internet Protocol (IP), Transfer Control Protocol (TCP), User Datagram Protocol (UDP), Ethernet, File Transfer Protocol (FTP), and Hyper Text Transfer Protocol (HTTP). Examples of secure transfer protocols include Hyper Text Transfer Protocol Secure (HTTPS), Secure-HTTP (S-HTTP), and Secure Sockets Layer (SSL).

In some embodiments, remote procedure calls (RPC) may be used for communication between the providers; or between the user and the providers. For example, a first provider acting as a client, may construct a request as an extensible markup language (XML) message and send it across the network 27 using hypertext transfer protocol (HTTP) to a server at a second provider. The server at the second provider may then process the XML message and then send an XML formatted message back across the network 27 using HTTP to the client application at the first provider.

Those skilled in the art will realize there are many alternative approaches such as the simple object access protocol (SOAP); the common object request broker architecture (CORBA); and others.

Information transfers may be encrypted and digitally signed. Encryption prevents the information from being read or used by those without a decryption key. Digital signatures may be used to allow the detection of any addition, removal or alteration of the information after it was created, for example during later transit or storage.

There are many methods of encryption and digital signatures known to those skilled in the art. In one embodiment, public key encryption may be used, where there are pair of keys consisting of a public key available to all information senders and a private key known to only to the receiver. The information sender encrypts the information using a known public key of the recipient. Only the recipient is able to decrypt the information using a private key known only to the recipient. The information encrypted with the public key may not be decrypted using the public key. Determining the private key from the public key and the encrypted message, in-order to decrypt the message, requires an impossibly large amount of computation.

In the case of digital signatures, a public-private key pair may be used. The message sender uses a private key known only to the sender to compute a signature whose unique value depends on all the information in the message. The digital signature is generated using a one way hash function. The receiver may verify that the message hasn't been altered since creation, by obtaining a known value after computing the received message & signature with the sender's public key. If the message or signature was altered in any way after creation, the known expected result is not obtained. Examples of hash functions include MD5 (128 bit) and SHA-1 (160 bit).

Certificate authority or authorities may also be used to control the issuance and validation of digital certificates so that a sender may validate that the public keys are truly those of the intended recipient before encrypting & signing a message. For an additional layer of protection, access to these public keys and certificates may be limited to authorized entities in-order to prevent access to inter-provider communication methods by the general Internet public.

The RSA algorithm, which is widely used on the Internet, is one example of public key encryption. Those skilled in the art will recognize there are many other alternatives to encryption and digital signing (digital signatures) that may also be used.

Alternatively, a private key(s) may be used for both the encryption by a sender and decryption by a recipient. Those skilled in the art recognize that the distribution of the private keys may be accomplished via in-person meetings, in-person telephone call-back exchange protocols or other methods that do not rely on the same digital network. Alternatively, private key exchange between authorized entities, may be accomplished across a digital network by numerous approaches such as the Diffie-Hellman Key Agreement Method (IETF RFC 2631) [along with source authentication by the prior exchange of digital signatures to defeat a man-in-the-middle attack].

Only authorized provider entities with a known entityID (and password) may be allowed to send information transfers. EntityID's and passwords may be initially established between entities using other methods where the identities may be established by personal meeting or other encryption methods discussed above. Each authorized entity may be restricted to certain types of information transfers or transactions.

Networking Between User-Devices and Providers:

A major consideration for the network 27 between the experience-providers and the user-devices is a wide area of coverage. In the ideal, all user-devices may be able to connect to the network automatically either wirelessly or wired, no matter where a user-device 22 is currently at. In some embodiments, this ideal network access may not be practical and/or cost effective for some geographic locations. In one embodiment, each user-device 22 will typically be able to access the network 27 from time to time in-order to be periodically validated by the experience-provider 26 by feeding back user-history, receiving additional compositions and to extend the usage-right time period for compositions stored in the user-device. Depending on the embodiment, network access may range from being essentially continuous to only occurring periodically once every few minutes; hours; day(s); or week(s).

For security and performance reasons, the network 27 between the users (user-devices) and the providers may be different from the network 27 used between the various providers (experience-providers, composition-providers, usage-rights-repositories, and/or bankers).

In one embodiment, a public network such as the Internet may be used for communications between the providers and the user-devices, because of its widely available access. Alternatively, a separate network, different from the Internet, may be used between the providers and the user-devices. Or a combination of public and private networks (for example: cell phone network; WiFi; and/or WiMax networks) may be utilized. For example, it may be desirable for user-devices to access a user's private home network (e.g., WiFi) in-order to connect to the experience-provider 26 via the Internet.

Any combination of the network architectures, configurations and protocols discussed elsewhere may be used to secure information transfers between the experience-providers 26 and the user-devices 22.

Business Models:

The disclosed concepts enable many different schemes for generating revenue and/or royalties for the experience-providers, network providers, composition-providers, composition creators and artistic performers. The schemes include:

Fee for each composition each time it is played.
One time fee for unlimited play of a composition by the user.
A fee per minute or hour of experience provided to the user.
A flat fee per month independent of the actual user usage.
Advertisement supported, where the user may listen to and possibly interact to a certain amount of ad time per a predefined amount of non-ad user time.
A certain number of free plays followed by some fee for play.
Number of user-devices.
Number of user-devices simultaneously active.
Amount of data transferred across the network.
Various combinations of the above.

The experience-providers may simultaneously manage each of these billing schemes for different groups of users, so the billing scheme may be customized for each user. The history of the aggregate usage for each composition may also be used to determine royalties for the composition creators, composition owners and other service providers.

The composition-providers may offer various purchase plans. The experience-provider 26 may mediate to acquire the best price for the user based on expected user needs.

In some embodiments, the composition-providers may price usage-rights so that the cost of gradually expanding the usage-rights to full-rights, is the same as if the full-rights we purchased initially. By always guaranteeing the best price and eliminating user concerns about pricing, sales may be increased.

The experience-provider 26 does not need to store an individual library of compositions for each user. The actual compositions may be stored in a common library that is shared by all users and accessed based upon a user profile maintained for each user. The amount of access bandwidth provided for each composition may be adjusted to match aggregate user demand. For example, a currently popular composition that is being downloaded by many users may be made available from many servers across the network 27 in-order to meet the demand. While a less popular composition may be made available from significantly fewer servers on the network.

As an optional enhancement, the user may be allowed to use the "forward" control to skip any offensive or unwanted advertisement (ad). Alternative ads are then presented to the user until the required user ad time is satisfied. When the user wants additional information about the product in an ad, the user activates (presses) the "like" control. Additional information is then presented. The user may also activate the "back" control to hear an ad again in-order to repeat needed information such as a phone number or address. The user's account is credited for the additional ad time heard. The user's use of the "forward" and "back" controls during ads may be used to more closely target future ads to the user.

Various encryption schemes may be utilized in-order to protect from piracy or user attempts to interfere with the collection of billing information.

Initial System Customization to the User:

To more efficiently perform customization of the system for each user, a large display with an interactive user interface may be utilized across a network 27 during the initial user customization process. The user may answer forms on the user's interests, hobbies, categories or products of interest, etc.

This may include the establishment of methods for confirming the user's identity at the start of future user-device sessions. This may include capturing sound to be used for voice recognition of the user's name or other specific words, biometrics measurements of the user such as fingerprint on the start control, or camera imaging of the user's face.

The user may also indicate initial preferences for advertisement categories. In this mode, the user may be presented with different product categories and product types for which the user may use the "Like" control to indicate relative interest in.

The user may also wish to customize of the type and frequency of news, weather, traffic, etc based on the day of week, time of day, location of user, etc.

The initial preferences the user provides are only the starting point. User feedback, indicated by normal user control actions, is utilized to continuously adopt the entertainment sequence more uniquely for each individual user.

User History Timeline:

In another optional extension, the actual timeline of a user's history of feedback and favorites may be made available to the user via an interactive interface and display. As an example, the user would be able to review what was listened to at any earlier time period or time interval, for example a particular day, week or month during the college years. Such a history review mode or capability may not be needed for most types of user-devices.

User Provided Compositions:

In another optional extension, the user would have the capability of providing compositions and highlights to the system. This is useful in cases where the user may have created their own compositions or acquired them locally or where the experience-provider 26 does not have access to certain compositions.

Hardware and Software Embodiments:

FIG. 3 shows one embodiment of a user-device. In some embodiments, the user-device may be made portable; mobile; and/or wearable.

A user-device may include a digital processor 30 and local storage memory 33. The digital processor 30 incorporates and executes the processing program to process the composition data. The memory 33 may hold composition data; software (program) code; and working storage.

The digital processor 30 may be implemented with any digital processing hardware such as Digital processors, Central Processing Units (CPU), Digital Signal Processors (DSP), state machines, controllers, micro-controllers, Integrated Circuits (IC's), Custom Integrated Circuits, Application Specific Integrated Circuits (ASIC's), Programmable Logic Devices (PLD's), Complex Programmable Logic Devices (CPLD's), Field Programmable Gate Arrays (FPGA's), Electronic Re-Programmable Gate-Arrays/Circuitry and any other type of digital logic circuitry/memory.

If the processor is comprised of programmable-circuitry [e.g., electronically re-configurable gate-array/circuitry], the processing program (or portions of the processing program) may be incorporated into the downloadable digital logic configuration of the gate array(s).

In some embodiments, the digital processor may comprise a plurality of processors in a multi-processing arrangement which may execute the sequences of instructions contained in memory 33.

The memory 33 may be implemented using random access memory (e.g., DRAM, SRAM), registers, register files, flip-flops, integrated circuit storage elements, and storage media such as disc, or even some combination of these. The memory 33 may include a non-volatile memory to store boot-up data and other data locally. The memory 33 may optionally include a hard drive or other mass storage device. Software code; processing programs; firmware; hardware configuration data; composition data and other data may be stored in the memory 31.

The user-device may optionally include a media drive to allow both composition data and processing programs to be read from media.

The user-device may optionally include a network interface 31 to allow access to the Internet, other networks or mobile type networks. This would allow composition data and the processing programs/software/firmware to be downloaded across the Internet or other network(s).

Additional Approaches:

In some embodiments, hard-wired circuitry and/or programmable-circuitry may be used in place of or in combination with software instructions. Thus, embodiments may include any combination of hardware circuitry and software/firmware.

The processor software, machine-language executable instructions, machine-interpretable instructions, firmware, and/or the configuration-data base of electronically-configurable-circuitry: may be stored on/in one or more computer-readable medium/media, and/or one or more digital storage memories.

Depending on the embodiment, the computer-readable medium may include: nonvolatile media, volatile media, and transmission media. Nonvolatile media include, for example, optical or magnetic disks, such as media drive 105. Volatile media include dynamic memory (e.g., DRAM). Transmission media include coaxial cables, copper wire, and fiber optics, including the wires that comprise an interface/communications bus. Transmission media can also take the form of acoustic or light waves, such as those generated during radio frequency (RF) and infrared (IR) data communications.

In some embodiments, the computer-readable media may include: floppy disk, a flexible disk, hard disk, magnetic tape, any other type of magnetic medium; Compact Disk (CD), CD-ROM, CD-RAM, CD-R, CD-RW, DVD, DVD+-R, DVD+-RW, DVD-RAM, and any other type of optical medium; punch cards, paper tape, any other physical medium with patterns of holes; RAM, DRAM, SRAM, PROM, EPROM, EEPROM, Flash-memory, FLASH EPROM, and any other type of memory chip/cartridge; or any other type of storage or memory from which a processor/computer can obtain its digital contents.

More Applications and Uses:

In order to more clearly illustrate functionality, portions of the preceding discussion were oriented toward a user-device 22 with a manually controlled interface. But, more generally, any type of user interface may be used, including a voice controlled user interface.

In order to more clearly illustrate functionality, portions of the foregoing discussion were described in terms of music and/or music videos. But, more generally, may be implemented to generate any type of personalized entertainment experience that is customized for each user. The entertainment experience that is personalized for each user may be comprised of a sequence of any type of entertainment compositions including music, music videos, short films, movies, video programs, audio versions of books, talks, speeches, voice content, lectures, etc.

Additional Embodiments

One embodiment may be described by the following:
An apparatus-implemented method of distributing a digital-work to a plurality of user-devices that use different formats, the method comprising:
storing a definition of usage-rights for said digital-work in one or more memories; wherein said definition of usage-rights authorizes a plurality of different formats of a digital-work for use by a user, at a plurality of different user-devices; wherein one user-device uses a different format from another user-device;

determining when the user who is authorized to utilize said usage-rights is present at one of the user-devices;

selecting, automatically by a processor, a format of the digital-work, from a plurality of available formats, which is most appropriate for the user-device where the user is present;

sending onto a network to said user-device: the selected format of said digital-work that is compatible with said user-device and an authorization to utilize the selected format of the digital-work; and whereby said digital-work is automatically available at any of a plurality of user-devices that said authorized user is present at.

The above embodiment may be further enhanced by the addition of one or more of the following elements or features, either individually or combined together:

wherein the authorization sent to the user-device expires, before the definition of usage-rights expires.

wherein the authorization, sent to the user-device, expires after a time period that is less than the definition of usage-rights.

wherein the authorization sent to the user-device, expires after an amount of usage, that is less than the definition of usage-rights.

wherein the authorization sent to the user-device, expires after a number of times used, that is less than the definition of usage-rights.

wherein the authorization sent to the user-device expires, unless the authorization sent to the user-device is renewed from time to time.

wherein the authorization sent to the user-device, expires after a time period, unless appropriate feedback on the usage of the digital-work has been sent by the user-device.

wherein the selected format and authorization are sent to the user-device in anticipation of future use, by the user, of the digital-work at a user-device.

wherein, based on a history and/or context of the user, the selected format and the authorization is sent to said user-device before being needed or requested by the user.

wherein after determining the user is present at the user-device:

determining that a digital-work, for which the user has usage-rights, is expected to be used in the future by the user at the user-device;

determining if the digital-work and authorization is already available, for use by the user at the user-device; and if the selected format and/or authorization is not already available at the user-device, automatically without needing user action or initiation, sending the selected format and/or the authorization to the user-device before being needed by the user at the user-device.

wherein: after determining the user is present at the user-device:

determining, automatically without needing user initiation or action, that a digital-work for which the user has usage-rights, is not configured for use by the user at the user-device; and sending the selected format and/or the authorization for use by the user, to the user-device before being needed by the user at the user-device.

further comprising: when a network connection is not available to the user-device, maintaining the ability of the user to use the digital-work at the user-device, by utilizing the digital-work and the authorization that was previously sent to the user-device.

wherein the user is able to use the digital-work and the authorization that was previously received at the user-device, during times when a network connection is not available to the user-device.

wherein, after the digital-work and authorization have been received at the user-device, the user is able to utilize the digital-work at the user-device during times when the network connection is not available.

wherein the actual identity of the user remains unknown to experience-providers, digital-work providers and usage-rights repositories.

wherein the definition of usage-rights for the digital-work is stored at one or more locations on the network; and wherein the definition of usage-rights is accessed, across the network, by a plurality of different experience-providers.

wherein a version indicator or characteristics of the user-device, are sent across the network to a experience-provider, automatically without needing user action or initiation; and wherein the format of the digital-work and the authorization, that is most appropriate for the user-device, is sent across the network to the user-device.

further comprising: using said authorization to enable, the selected format of the digital-work, to be used at said user-device.

wherein said selecting occurs without the user doing the selecting.

wherein information received from the user-device, is used in said selecting of the most appropriate format for the user-device.

wherein the definition of usage-rights includes a right to use formats that already exist and formats that are developed or released in the future.

wherein the digital-work is an audio or video composition and the selected format is an audio format or a video format.

wherein the digital-work is an image or display composition and the selected format is an image format or a display format.

wherein the digital-work is an entertainment composition and the selected format is a playback format.

further comprising:

selecting a most appropriate format for a second user-device which is different from the format selected for a first user-device; and sending onto a network to the second user-device, the format and authorization which was most appropriate for the second user-device.

wherein the most appropriate format is the highest quality format that is compatible with the user-device.

wherein the most appropriate format is the highest quality format that is: available to send to the user-device and is compatible with the user-device.

One embodiment may be described by the following:

Apparatus for distributing a digital-work to a plurality of user-devices that use different formats, the apparatus comprising:

one or more memories that store a definition of usage-rights for said digital-work; wherein said definition of usage-rights authorizes a plurality of different formats of a digital-work for use by a user, at a plurality of different user-devices; wherein one user-device uses a different format from another user-device;

one or more processors to:
  determine when the user who is authorized to utilize said usage-rights is present at one of the user-devices; and
  automatically select a format of the digital-work, from a plurality of available formats, which is most appropriate for the user-device where the user is present;
at least one network interface to send onto a network to said user-device: the selected format of said digital-work that is compatible with said user-device and an authorization to utilize the selected format of said digital-work; and
whereby said digital-work is automatically available at any of a plurality of user-devices that said authorized user is present at.

The above embodiment may be further enhanced by the addition of one or more of the following elements or features, either individually or combined together:

wherein the authorization sent to the user-device expires, before the definition of usage-rights expires.
wherein the authorization, sent to the user-device expires after a time period that is less than the definition of usage-rights.
wherein the authorization sent to the user-device, expires after an amount of usage, that is less than the definition of usage-rights.
wherein the authorization sent to the user-device, expires after a number of times used, that is less than the definition of usage-rights.
wherein the authorization sent to the user-device expires, unless the authorization sent to the user-device is renewed from time to time.
wherein the authorization sent to the user-device, expires after a time period, unless appropriate feedback on the usage of the digital-work has been sent by the user-device.
wherein the selected format and authorization are sent to the user-device in anticipation of future use, by the user, of the digital-work at a user-device.
wherein, based on a history and/or context of the user, the selected format and the authorization is sent to said user-device before being needed or requested by the user.
wherein after determining the user is present at the user-device:
  determining that a digital-work, for which the user has usage-rights, is expected to be used in the future by the user at the user-device;
  determining if the digital-work and authorization is already available, for use by the user at the user-device; and
  if the selected format and/or authorization is not already available at the user-device, automatically without needing user action or initiation, sending the selected format and/or the authorization to the user-device before being needed by the user at the user-device.
wherein: after determining the user is present at the user-device:
  determining, automatically without needing user initiation or action, that a digital-work for which the user has usage-rights, is not configured for use by the user at the user-device; and
  sending the selected format and/or the authorization for use by the user, to the user-device before being needed by the user at the user-device.
wherein the user is able to use the digital-work and the authorization that was previously received at the user-device, during times when a network connection is not available to the user-device.
wherein, after the digital-work and authorization have been received at the user-device, the user is able to utilize the digital-work at the user-device during times when the network connection is not available.
wherein the actual identity of the user remains unknown to experience-providers, digital-work providers and usage-rights repositories.
wherein the definition of usage-rights for the digital-work is stored at one or more locations on the network; and wherein the definition of usage-rights is accessed, across the network, by a plurality of different experience-providers.
wherein a version indicator or characteristics of the user-device, are sent across the network to a experience-provider, automatically without needing user action or initiation; and wherein the format of the digital-work and the authorization, that is most appropriate for the user-device, is sent across the network to the user-device.
wherein said selecting occurs without the user doing the selecting.
wherein information received from the user-device, is used in said selecting of the most appropriate format for the user-device.
wherein the definition of usage-rights includes a right to use formats that already exist and formats that are developed or released in the future.
wherein the digital-work is an audio or video composition and the selected format is an audio format or a video format.
wherein the digital-work is an image or display composition and the selected format is an image format or a display format.
wherein the digital-work is an entertainment composition and the selected format is a playback format.
wherein the most appropriate format is the highest quality format that is compatible with the user-device.
wherein the most appropriate format is the highest quality format that is: available to send to the user-device and is compatible with the user-device.

One embodiment may be described by the following:
One or more computer-readable memories or storage media, not including carrier-waves, having computer-readable instructions thereon which, when executed by one or more processing devices, implement a method of distributing a digital-work to a plurality of user-devices that use different formats, the method comprising:
  storing a definition of usage-rights for said digital-work in one or more memories; wherein said definition of usage-rights authorizes a plurality of different formats of a digital-work for use by a user, at a plurality of different user-devices; wherein one user-device uses a different format from another user-device;
  determining when a user who is authorized to utilize said usage-rights is present at one of the user-devices;
  selecting, automatically by a processor, a format of the digital-work, from a plurality of available formats, which is most appropriate for the user-device where the user is present;
  sending onto a network to said user-device: the selected format of said digital-work that is compatible with said user-device and an authorization to utilize the selected format of the digital-work; and whereby said digital-work is automatically available at any of a plurality of user-devices that said authorized user is present at.

The above embodiment may be further enhanced by the addition of one or more of the following elements or features, either individually or combined together:

wherein the authorization sent to the user-device expires, before the definition of usage-rights expires.

wherein the authorization, sent to the user-device, expires after a time period that is less than the definition of usage-rights.

wherein the authorization sent to the user-device, expires after an amount of usage, that is less than the definition of usage-rights.

wherein the authorization sent to the user-device, expires after a number of times used, that is less than the definition of usage-rights.

wherein the authorization sent to the user-device expires, unless the authorization sent to the user-device is renewed from time to time.

wherein the authorization sent to the user-device, expires after a time period, unless appropriate feedback on the usage of the digital-work has been sent by the user-device.

wherein the selected format and authorization are sent to the user-device in anticipation of future use, by the user, of the digital-work at a user-device.

wherein, based on a history and/or context of the user, the selected format and the authorization is sent to said user-device before being needed or requested by the user.

wherein after determining the user is present at the user-device:
  determining that a digital-work, for which the user has usage-rights, is expected to be used in the future by the user at the user-device;
  determining if the digital-work and authorization is already available, for use by the user at the user-device; and
  if the selected format and/or authorization is not already available at the user-device, automatically without needing user action or initiation, sending the selected format and/or the authorization to the user-device before being needed by the user at the user-device.

wherein: after determining the user is present at the user-device:
  determining, automatically without needing user initiation or action, that a digital-work for which the user has usage-rights, is not configured for use by the user at the user-device; and
  sending the selected format and/or the authorization for use by the user, to the user-device before being needed by the user at the user-device.

further comprising: when a network connection is not available to the user-device, maintaining the ability of the user to use the digital-work at the user-device, by utilizing the digital-work and the authorization that was previously sent to the user-device.

wherein the user is able to use the digital-work and the authorization that was previously received at the user-device, during times when a network connection is not available to the user-device.

wherein, after the digital-work and authorization have been received at the user-device, the user is able to utilize the digital-work at the user-device during times when the network connection is not available.

wherein the actual identity of the user remains unknown to experience-providers, digital-work providers and usage-rights repositories.

wherein the definition of usage-rights for the digital-work is stored at one or more locations on the network; and wherein the definition of usage-rights is accessed, across the network, by a plurality of different experience-providers.

wherein a version indicator or characteristics of the user-device, are sent across the network to a experience-provider, automatically without needing user action or initiation; and wherein the format of the digital-work and the authorization, that is most appropriate for the user-device, is sent across the network to the user-device.

further comprising: using said authorization to enable, the selected format of the digital-work, to be used at said user-device.

wherein said selecting occurs without the user doing the selecting.

wherein information received from the user-device, is used in said selecting of the most appropriate format for the user-device.

wherein the definition of usage-rights includes a right to use formats that already exist and formats that are developed or released in the future.

wherein the digital-work is an audio or video composition and the selected format is an audio format or a video format.

wherein the digital-work is an image or display composition and the selected format is an image format or a display format.

wherein the digital-work is an entertainment composition and the selected format is a playback format.

further comprising:
  selecting a most appropriate format for a second user-device which is different from the format selected for a first user-device; and
  sending onto a network to the second user-device, the format and authorization which was most appropriate for the second user-device.

wherein the most appropriate format is the highest quality format that is compatible with the user-device.

wherein the most appropriate format is the highest quality format that is: available to send to the user-device and is compatible with the user-device.

More Additional Embodiments

One embodiment may be described by the following:
An apparatus-implemented method for personalized music or entertainment, the method comprising:
  capturing, at a user-device, details of control actions by a user on pieces or compositions;
  storing in one or more memories, a plurality of ratings associated with the user; wherein a rating, indicating a magnitude of preference of the user, is associated with a piece or composition; wherein the magnitude of the rating for the associated piece or composition was determined by using at least some of the details of said control actions by the user on the associated piece or composition; and
  automatically selecting at least one piece or composition for playback, by using a relationship that defines a time between playbacks of the selected piece or composition, which varies with the magnitude of said rating of the user for the selected piece or composition.

Another embodiment may be described by the following:

An apparatus-implemented method for personalized music or entertainment, the method comprising:
  capturing, at a user-device, details of control actions by a user on pieces or compositions; wherein said details include a number of times a piece or composition was heard by the user;
  storing in one or more memories, a plurality of ratings associated with the user; wherein a rating, indicating a magnitude of preference of the user, is associated with a piece or composition; wherein the magnitude of the rating for the associated piece or composition was determined by using at least some of the details of said control actions by the user on the associated piece or composition; and
  automatically selecting at least one piece or composition for playback, by using a relationship that defines a time between playbacks of the selected piece or composition which varies with: the magnitude of said rating of the user for the selected piece or composition, or the number of times the selected piece or composition was heard by the user.

Another embodiment may be described by the following:

Apparatus for personalized music or entertainment, said apparatus comprising:
  means for capturing at a user-device, details of user actions by a user;
  one or more memories that store, a plurality of ratings associated with the user; wherein a rating, indicating a magnitude of preference of the user, is associated with a piece or composition; wherein the magnitude of the rating for the associated piece or composition was determined by using at least some of the details of said user actions by the user on the associated piece or composition; and
  a processor that automatically selects at least one piece or composition for playback, by using a relationship that defines a time between playbacks of the selected piece or composition which varies with the magnitude of said rating of the user for the selected piece or composition.

Another embodiment may be described by the following:

One or more computer-readable memories or media, not including carrier-waves, having computer-readable instructions thereon which, when executed by one or more processing devices, implement a method of:
  capturing, at a user-device, details of control actions by a user on pieces or compositions; wherein said details include a number of times a piece or composition was heard by the user;
  storing in one or more memories, a plurality of ratings associated with the user; wherein a rating, indicating a magnitude of preference of the user, is associated with a piece or composition; wherein the magnitude of the rating for the associated piece or composition was determined by using at least some of the details of said control actions by the user on the associated piece or composition; and
  automatically selecting at least one piece or composition for playback, by using a relationship that defines a time between playbacks of the selected piece or composition which varies with: the magnitude of said rating of the user for the selected piece or composition, or the number of times the selected piece or composition was heard by the user.

Any of above four embodiments may be further enhanced by the addition of one or more of the following elements or features, either individually or combined together:
  further comprising: automatically initiating the playback of said selected piece or composition for said user.
  wherein said relationship defines a plurality of different values for the time between playbacks.
  wherein said relationship is defined by a curve.
  wherein said relationship is defined by a lookup table or database.
  wherein said relationship is defined by an equation or a mathematical function.
  wherein said relationship is non-linear.
  wherein said relationship is monotonic.
  wherein said relationship is not monotonic.
  wherein the more favorable a rating for a piece or composition, the time between playbacks of the piece or composition is shorter.
  wherein, when a said user's rating for an a said piece or composition is below a defined level of preference, the said piece or composition is not selected again until at least a defined amount of time has elapsed from a prior playback of the said piece or composition.
  wherein when a user's rating for a said piece or composition is below a defined level of preference, that piece or composition is not selected.
  wherein said control actions are user actions that affect a playback of a piece or composition during its playback.
  wherein said control actions are user actions to repeat or replay, a piece or composition that previously played; and wherein a said user's rating is adjusted to a higher preference, by a said user control action or actions to repeat or replay, the piece or composition.
  wherein said control actions are user actions to find, select or designate, a particular piece or composition for playback; and wherein a said user's rating is adjusted to a higher preference, by a user control action that finds, selects or designates the piece or composition for playback.
  wherein said control actions are user actions to search or find a specific piece or composition; wherein a said user's rating is adjusted to a higher preference, by a said user control actions to search or find the specific piece or composition.
  wherein said control actions are user actions to skip or forward-past an ending portion of a currently playing piece or composition; and wherein a said user's rating is adjusted to a lower preference, by a user control action or actions that skip or forward-past, the ending portion of the piece or composition that is currently playing.
  wherein said control actions are user actions to stop a currently playing piece or composition; and initiate playback of another piece or composition; wherein a said user's rating associated with the playing piece or composition is adjusted to a lower preference, by a user control action or actions that stop the piece or composition that is playing; and initiate playback of another piece or composition.
  wherein said control actions are user actions to cause a piece or composition that has finished playing, to start playing again; wherein a said user's rating is adjusted to a higher preference, by a said user control action or actions to start playing again.
  wherein the sooner said user takes control action, to stop a currently playing piece or composition, in-order to experience another piece or composition; the more the rating for the stopped piece or composition, is adjusted to a lower preference.

wherein the sooner the user takes control action to avoid a piece or composition that is playing, the more the rating, for the avoided piece or composition, is adjusted toward a lower preference.

wherein, once a piece or composition has played for at least a recognition-time, the sooner a control action to avoid the piece or composition, the more the rating, for the avoided piece or composition, is adjusted toward a lower preference.

further comprising: playing a sequence of said selected pieces or compositions, when there are no user control actions available to be applied or satisfied.

further comprising: automatically playing by a user-device, a sequence of pieces or compositions; wherein the pieces or compositions were custom selected for said user by using the ratings associated with the user.

wherein the rating for a specific piece or composition is determined by using a plurality of control actions that occurred on a plurality of different occasions, and were applied by the user on the specific piece or composition.

wherein a rating for a specific piece or composition is determined using a plurality of individual said user control actions that occurred on a plurality of different occasions and/or at different user-devices; wherein said control actions were applied to the specific piece or composition.

wherein the magnitude of the rating for a piece or composition is increased by some control actions, and the magnitude of the rating for a piece or composition is decreased by other control actions.

wherein some user control actions cause the rating to be adjusted to a higher magnitude, and other user control actions cause the rating to be adjusted to a lower magnitude.

further comprising: adjusting the magnitude of a said user's rating to a more favorable preference due to control actions that occurred on a first occasion; and adjusting the magnitude of a said user's rating to a less favorable preference due to control actions that occurred on a second occasion.

wherein a rating is stored in one or more memories until a magnitude of the rating is updated by control actions that are more recent.

wherein a said user's rating is updated by adjusting the magnitude of a prior rating, toward a higher or lower preference, based on the details of a newer user control action that was applied to the piece or composition.

further comprising:
storing, in a memory or memories, the details about individual control actions, for a plurality of control actions on a said piece or composition, that occurred on different occasions and/or at different user devices;
processing, in order of control action occurrence, a plurality of said stored details about control actions, to determine the magnitude of the rating for the piece or composition.

further comprising:
storing, in a memory or memories, the details about individual control actions, for a plurality of control actions on a said piece or composition, that occurred on different occasions and/or at different user devices;
processing, in order of control action occurrence, a plurality of said stored details about control actions to determine the magnitude of the rating for the piece or composition; wherein the user's rating is adjusted toward a more favorable magnitude by some control actions; and wherein the rating is adjusted to a less favorable magnitude by other control actions.

Not Limited to Detailed Illustrations:

To satisfy the requirements for enablement, this disclosure may contain one or more embodiments which illustrate a particular detailed implementation and use. A detailed illustration often requires choosing only one of a plurality of equivalent detail approaches to show. When terms such as "shall", "should", "is", "are" appear, they should only be interpreted as limitations/requirements for the purpose of maintaining compatibility/consistency between the elements/parameters of the particular detailed illustration. Such terms should not be interpreted as limitations or requirements on the scope of the general concepts as disclosed in their entirety.

For example, if element "A", in a detailed embodiment, is shown as having a certain detailed configuration, then mating element "B" in that detailed example may need to have corresponding limitations in-order to be compatible/interoperable with the detailed element "A". Such limitations on element "B" for compatibility within a detailed illustration do not define limitations on element "B" within all the possible embodiments that fall within the scope of the claims. If another embodiment had been chosen for illustration purposes, element "A" may have a very different detailed configuration and the requirements on element "B" for compatible/interoperable with the element "A" may be very different.

In general, the detailed implementations for the elements in the illustrated embodiments may have many alternate implementations that accomplish the same functional result/objective and are within the scope of the claims.

What is claimed is:

1. An apparatus-implemented method for personalized music or entertainment, the method comprising:
    capturing, at a user-device or user-devices, details of user actions by a user on a composition;
    determining, with a processor or processors, a target time between playbacks of the composition by using a relationship or relationships wherein the target time between playbacks of the composition dependently varies with said details of user actions by the user;
    selecting, by a processor or processors, the composition for playback, at least partially based upon said target time between playbacks of the composition.

2. The method of claim 1, further comprising: initiating, with a processor or processors, a playback of the selected composition for said user.

3. The method of claim 1, further comprising: automatically playing by the user-device or another user-device, a sequence of compositions; wherein the compositions were custom selected for said user by using said user actions.

4. The method of claim 1, wherein said relationship is defined by a curve, lookup table, database, equation, polynomial, digital differential analyzer, mathematical function or formula.

5. The method of claim 1, wherein said relationship is non-linear.

6. The method of claim 1, wherein said relationship is not monotonic.

7. The method of claim 1, wherein the relationship defines an updated target time between playbacks that is dependent on a prior value of the time between playbacks and a newer control action.

8. The method of claim 1, wherein the relationship defines an updated target time between playbacks, that is dependent on a prior value of the time between playbacks and a newer control action; wherein the updated time between playbacks is a scaled amount of the prior value of the time between playbacks.

9. The method of claim 1, wherein the relationship defines an updated target time between playbacks, that is dependent on a prior value of the time between playbacks and a newer control action; wherein the updated time between playbacks also depends on details of a one or more control actions that occurred prior to the newer control action.

10. The method of claim 1, wherein said relationship defines the time between playbacks that is dependent on a rating of the user; wherein the rating is at least partially determined by said user actions.

11. The method of claim 1, wherein said relationship defines the time between playbacks that is dependent on a rating of the user that is at least partially determined by said user actions; wherein the time between playbacks of the composition varies inversely with the rating of the composition.

12. The method of claim 1, wherein said relationship defines the time between playbacks that is dependent on a rating of the user that is at least partially determined by said user actions; wherein an updated value of the rating is determined by adjusting a prior rating by an amount determined by a newer control action.

13. The method of claim 1, wherein said relationship defines the time between playbacks that is dependent on a rating of the user that is at least partially determined by said user actions; wherein an updated value of the rating is determined by adjusting a prior rating by an amount determined by a newer control action, and one or more control actions that occurred prior to the newer control action.

14. The method of claim 1, wherein said relationship defines the time between playbacks that is dependent on a rating of the user that is at least partially dependent on a play-count or an amount of usage by the user.

15. The method of claim 1, wherein said relationship defines the time between playbacks that is dependent on a play-count of the user.

16. The method of claim 1, wherein said relationship or relationships of the time between playbacks is at least partially dependent on a rating of the user that is determined by a plurality of control actions by the user; wherein a magnitude of the rating for the composition is increased by some control actions, and the magnitude of the rating for the composition is decreased by other control actions.

17. The method of claim 1, wherein said relationship or relationships of the time between playbacks is at least partially dependent on a rating of the user that is determined by said user actions; wherein some user actions cause the rating to be adjusted to a higher magnitude, and other user actions cause the rating to be adjusted to a lower magnitude.

18. The method of claim 1, wherein said relationship or relationships of the time between playbacks is at least partially dependent on a rating of the user that is determined by said user actions; wherein a magnitude of the rating is adjusted to a more favorable preference by control actions that occurred on a first occasion; and the magnitude of the rating is adjusted to a less favorable preference by control actions that occurred on a second occasion.

19. The method of claim 1, wherein said user actions are processed in their order of occurrence; wherein the time between playbacks is increased by some user actions; and wherein the time between playbacks is decreased by other user actions.

20. The method of claim 1, further comprising:
  storing, in a memory or memories, the details about individual user actions, for a plurality of user actions on the composition, that occurred on different occasions and/or at different user devices;
  processing, in order of user action occurrence, a plurality of said stored details about user actions, to determine the time between playbacks of the composition; wherein the time between playbacks is increased by some user actions; and wherein the time between playbacks is decreased by other user actions.

21. The method of claim 1, wherein said relationship includes a plurality of different values for the time between playbacks.

22. The method of claim 1, wherein said selecting is based upon a targeted playback time that is based upon said target time between playbacks of the composition.

23. The method of claim 1, wherein a prior target time between playbacks is increased or decreased, based upon one or a plurality, of said user actions.

24. Apparatus for personalized music or entertainment, said apparatus comprising:
  memory or memories that capture at a user-device or user-devices, details of user actions by a user on a composition;
  a processor that automatically determines a target time between playbacks of the composition, by using a relationship wherein the time between playbacks of the composition dependently varies with said details of user actions by the user; and automatically selects the composition for playback, at least partially based upon said target time between playbacks of the composition.

25. The apparatus of claim 24, wherein said selecting is based upon a targeted playback time that is based upon said target time between playbacks of the composition.

26. The apparatus of claim 24, wherein a prior target time between playbacks is increased or decreased, based upon one or a plurality, of said user actions.

27. The apparatus of claim 24, wherein said processor or another processor, automatically initiates a playback of the selected composition for said user.

28. The apparatus of claim 24, wherein said relationship is defined by a curve, lookup table, database, equation, polynomial, digital differential analyzer, mathematical function or formula.

29. The apparatus of claim 24, wherein said relationship is non-linear.

30. The apparatus of claim 24, wherein said relationship is not monotonic.

31. The apparatus of claim 24, wherein the relationship defines an updated target time between playbacks that is dependent on a prior value of the time between playbacks and a newer control action.

32. The apparatus of claim 24, wherein said relationship defines the time between playbacks that is dependent on a rating of the user; wherein the rating is at least partially determined by said user actions.

33. The apparatus of claim 24, wherein said relationship defines the time between playbacks that is dependent on a rating of the user that is at least partially determined by said user actions; wherein an updated value of the rating is determined by adjusting a prior rating by an amount determined by a newer control action.

34. The apparatus of claim 24, wherein said relationship defines the time between playbacks that is dependent on a rating of the user that is at least partially dependent on a play-count or an amount of usage by the user.

35. The apparatus of claim 24, wherein said relationship or relationships of the time between playbacks is at least partially dependent on a rating of the user that is determined by said user actions; wherein some user actions cause the rating to be adjusted to a higher amount, and other user actions cause the rating to be adjusted to a lower amount.

36. The apparatus of claim 24, wherein said relationship or relationships of the time between playbacks is at least partially dependent on a rating of the user that is determined by said user actions; wherein a magnitude of the rating is adjusted to a more favorable preference by control actions that occurred on a first occasion; and the magnitude of the rating is adjusted to a less favorable preference by control actions that occurred on a second occasion.

37. The apparatus of claim 24, wherein said user actions are processed in their order of occurrence; wherein the time between playbacks is increased by some user actions; and wherein the time between playbacks is decreased by other user actions.

38. One or more computer-readable memories or media, not including carrier-waves, having computer-readable instructions thereon which, when executed by one or more processing devices, implement a method of:

capturing, at a user-device or user-devices, details of user actions by a user on a composition;

automatically determining a target time between playbacks of the composition by using a relationship or relationships wherein the target time between playbacks of the composition dependently varies with said details of user actions by the user;

automatically selecting the composition for playback at least partially based upon said target time between playbacks of the composition.

* * * * *